United States Patent [19]

Bahn

[11] Patent Number: 5,432,420
[45] Date of Patent: Jul. 11, 1995

[54] RELUCTANCE-TYPE MOTOR AND A DC MOTOR CAPABLE OF PERFORMING REGENERATIVE BRAKING

[75] Inventor: Itsuki Bahn, Tokyo, Japan

[73] Assignee: Kabushikigaisha Sekogiken, Tokyo, Japan

[21] Appl. No.: 196,261

[22] PCT Filed: Apr. 22, 1993

[86] PCT No.: PCT/JP93/00521
§ 371 Date: Feb. 15, 1994
§ 102(e) Date: Feb. 15, 1994

[87] PCT Pub. No.: WO94/00909
PCT Pub. Date: Jan. 6, 1994

[30] Foreign Application Priority Data

Jun. 29, 1992 [JP] Japan ................................. 4-209374
Oct. 29, 1992 [JP] Japan ................................. 4-330862

[51] Int. Cl.⁶ .......................... H02P 6/10; H02P 7/05
[52] U.S. Cl. ................................. 318/701; 318/254; 318/376
[58] Field of Search ............... 318/701, 138, 254, 685, 318/696, 375, 376; 310/68 B, 106

[56] References Cited

U.S. PATENT DOCUMENTS

| | | | |
|---|---|---|---|
| 5,097,191 | 3/1992 | Bahn | 318/701 |
| 5,111,091 | 5/1992 | Bahn | 310/68 B |
| 5,138,244 | 8/1992 | Bahn | 318/701 |
| 5,168,190 | 12/1992 | Bahn | 310/166 |
| 5,194,795 | 3/1993 | Bahn et al. | 318/685 |
| 5,214,365 | 5/1993 | Bahn | 318/701 |
| 5,231,342 | 7/1993 | Bahn | 318/696 |
| 5,260,635 | 11/1993 | Bahn | 318/701 |
| 5,264,772 | 11/1993 | Bahn | 318/701 |
| 5,274,287 | 12/1993 | Bahn | 310/68 B |
| 5,278,482 | 1/1994 | Bahn | 318/701 |
| 5,319,297 | 6/1994 | Bahn | 318/701 |
| 5,341,076 | 8/1994 | Bahn | 318/254 |
| 5,355,069 | 11/1994 | Bahn | 318/701 |

FOREIGN PATENT DOCUMENTS

| | | |
|---|---|---|
| 444198 | 9/1991 | European Pat. Off. . |
| 3-98489 | 4/1991 | Japan . |
| 7901133 | 12/1979 | WIPO . |

Primary Examiner—Bentsu Ro
Attorney, Agent, or Firm—Staas & Halsey

[57] ABSTRACT

A reluctance type motor and a brushless DC motor having large torque and good efficiency in a high-speed region.

When one exciting coil or armature coil is deactivated, magnetic energy stored in the magnetic core is prevented from returning to the electric power source side by means of a back-flow preventing diode. The magnetic energy is charged in a small-capacitance capacitor so as to hold it at a high voltage, thereby causing exciting current to decrease steeply. After a predetermined time has elapsed, a next exciting or armature coil is activated. In this case, the high voltage charged in the capacitor is applied, so that the exciting current builds up sharply. Since the building-up and the trailing-off of the exciting current of the exciting coil can be made sharp, not only the rotational speed can be increased up to several 10 thousands rpm but regenerative braking can be made available by switching the motor rotating in the normal mode into the reverse rotation mode so as to generate adequate reverse torque through the chopper circuit.

4 Claims, 24 Drawing Sheets

RELUCTANCE-TYPE MOTOR AND A DC MOTOR CAPABLE OF PERFORMING REGENERATIVE BRAKING

TECHNICAL FIELD

The present invention relates to a reluctance type motor and a DC motor which are used as a driving source for an electric motor car requiring a regenerative braking.

BACKGROUND ART

When a reluctance type motor is used as a driving source for an electric motor car, a regenerative braking is generally required. Although a brushless DC motor be used for the same purpose, the application by a conventional method would be too costly because of the complexity of the composition.

As the reluctance type motor has no magnet rotor, it has been considered that the regenerative braking by power generation is impossible, no relevant prior art has been established. The same can be said as to DC motors too.

The applicant of the present invention has already proposed Unexamined Japanese Patent Application No. 1-31433 and Unexamined Japanese Patent Application No. 1-188367, although the technologies disclosed in these applications differ from each other.

In the case of a reluctance type motor, an extraordinary large inductance of the exciting coil will cause a slow building-up of exciting current at an initial stage of the current supply period and a slow trailing-edge at a terminating stage of the current supply period. The former will cause a drop of output torque, and the latter occurrence of a counter torque.

If the voltage of electric power source is raised order to make building-up of armature current sharp in the initial stage of the current supply period, this will cause the current to increase acutely in a region above the magnetic saturation point, which entails vibrations and electric noises in the motor. Since the above-described building-up section of the armature current corresponds to a section where the torque is small, it a problem that only disadvantages will be amplified.

Thus, it has been a problem that a high-speed rotation (i.e. several tens of thousands rpm) cannot be realized due to above-described torque reduction and counter torque. Even if the rotational speed is reduced down to a generally utilized speed region (i.e. several thousands rpm), still there is a problem that the torque reduction and the counter torque will remain unremoved to cause the fall of the motor's operating efficiency. If a means to be adopted for increasing the output torque is to raise the voltage of the electric power source, this requires the voltage to be raised to a level such as 1000 volts or more, which is unpractical.

Brushless DC motor will also be encountered with the similar problems in the case of a motor generating a large output.

As the reluctance type motor has a rotor with no magnet, no power generation is expected during rotation. Accordingly, obtaining electromagnetic braking is impossible. That is, neither the electromagnetic function nor regenerative braking function are available Thus, it has been a problem for the reluctance type motors that they have not been able to be readily applicable to the drive sources of servomotors or electric-powered vehicles.

As the exciting coil has a large inductance, the activation/deactivation of the exciting coil is controlled using two switching elements to be respectively inserted at respective ends of the exciting coil. The problem of these switching elements is that they are expensive, since they are required to have a large capacity in order to control large current.

The reluctance type motor has a rotor with a larger number of salient poles and a larger capacity, so that not only a larger amount of magnetic energy is stored into and discharged from the magnetic poles and salient, poles but the magnetic energy is stored and discharged at a greater frequency during each rotation of the motor. It would be, therefore, a problem of the reluctance type motor that its rotational speed is relatively low despite its advantage of being capable of producing a large output torque. The brushless DC motors will be encountered with the similar problems in the case of a motor generating a large output.

Thus, the present invention has an object to provide a reluctance-type motor and a brushless DC motor having high torque and high efficiency in a high-speed region.

DISCLOSURE OF INVENTION

A first aspect of the present invention provides a plural-phase reluctance type motor with a fixed armature and a magnetic rotor comprising:

a plurality of salient poles of equal width disposed on an outer surface of the magnetic rotor at regular intervals of the same angle;

2n pieces (n: a positive integer not less than 3) of magnetic poles protruding from an inner peripheral surface of the fixed armature, symmetrically disposed magnetic poles being in-phase, said magnetic poles, wound with exciting coil, confronting said salient poles over slight gap by being disposed at regular intervals with 120- through 180-degree circumferential width in terms of electric angle;

plural-phase exciting coils wound round said magnetic poles;

a position detecting device for detecting rotational positions of said salient poles to generate plural-phase position detecting signals;

one first switching element connected to one end of each exciting coil;

a DC electric power source supplying electric power to a serial joint unit consisting of said first switching element and said each exciting coil;

a current supply control circuit whereby said first switching element connected to each of said corresponding plural-phase exciting coil is activated in response to and for the duration of said plural-phase position detecting signal to activate said exciting coil for obtaining output torque;

a first electric circuit for transferring magnetic energy stored in the exciting coil through a diode into a small-capacitance capacitor for storage from a negative terminal of the exciting coil so that exciting current of said exciting coil can be reduced quickly when said first switching element is turned off at a terminal end of said position detecting signal;

a second electric circuit for discharging electrostatic energy stored in said small-capacitance capacitor into said exciting coil, through a semiconductor switching element activated together with said first switching element, from a positive terminal of said exciting coil so that exciting current can be built up quickly when said exciting coil is again activated by said first switching element in response to said position detecting signal after said magnetic rotor rotates a predetermined angle;

a switching device for switching the motor between normal and reverse rotations by turning on said first switching element in response to said plural-phase position detecting signal;

a detecting circuit for generating a detection electric signal when exciting current of said exciting coil exceeds a predetermined value;

a chopper circuit fop turning off said first switching element in response to said detection electric signal and turning on this first switching element after a predetermined time has elapsed so as to maintain exciting current at a predetermined value;

an electric closed circuit defined by a route comprising the negative terminal of said exciting coil → said diode → second switching element → positive terminal of the electric power source → negative terminal of the electric power source → diode inversely connected to said exciting coil → the positive terminal of said exciting coil;

a third electric circuit for activating said second switching element for the duration corresponding to the duration through which said exciting coil of each phase is activated.

a fourth electric circuit, whereby, when the motor rotating in the normal direction is switched into the reverse rotation mode, chopper-controlled current is made to build up quickly by applying a sum of the voltage of the DC electric power source and an electromotive force due to reduction of magnetic flux intersecting the exciting coil, and the current of said power source is made to decrease slowly for braking by means of the regenerative braking that causes the current to be recovered through said second switching element to the positive terminal of the DC electric power source by applying a voltage as the sum of the electromotive force due to reduction of magnetic flux intersecting the exciting coil and an electromotive force due to discharge of magnetic energy stored in said exciting coil;

A second aspect of the present invention provides a DC motor in a three-phase half-wave current supply mode reluctance type motor, comprising:

a plurality of salient poles of equal width disposed on an outer surface of the magnetic rotor at regular intervals of the same angle;

6n pieces (n: a positive integer) of magnetic poles protruding from an inner peripheral surface of a fixed armature, symmetrically disposed magnetic poles being in-phase, said magnetic poles, wound with an exciting coil, confronting said salient poles over slight gap and being disposed at regular intervals and with a 120- or 180-degree circumferential width in terms of electric angle;

No.1-, No.2- and No.3-phase exciting coils wound round said magnetic poles;

a position detecting device including a plurality of position detecting elements for detecting rotational positions of said salient poles and generating rectangular waveform No.1-phase position detecting signals having the same width of 120-degree electric angle and a phase difference of 360-degree electric angle therebetween, and rectangular waveform No.2- and No.3-phase position detecting signals having the same width and phase difference as the No.1-phase position detecting signals but being successively delayed one another from the No.1-phase position detecting signals by 120-degree electric angle;

a switching element connected to both ends of each exciting coil;

a diode inversely connected to a serial joint unit of said switching element and corresponding exciting coil;

first, second and third current supply control circuits for turning on said switching elements connected to both ends of the exciting coils in response to said No.1-, No.2- and No.3-phase position detecting signals in order to supply current to said No.1-, No.2- and No.3-phase exciting coils through first, second and third back-flow preventing diodes, which are respectively connected to the DC electric power source in the forward direction, in order to rotate the motor in the normal direction, or turning on said switching elements connected to both ends of said exciting coils in response to said No.1-, No.2- and No.3-phase position detecting signals, which are for generating reverse rotation torque, to supply current to said No.1-, No.2- and No.3-phase exciting coils in order to rotate the motor in the reverse direction;

first, second and third capacitors having small capacitances for storing magnetic energies discharged from said No.1-, No.2- and No.3-phase exciting coils through said diodes having one end connected to the negative voltage side of said exciting coil respectively in order to quickly reduce exciting current when said No.1-, No.2- and No.3-phase exciting coils are deactivated at the terminal ends of said position detecting signals;

a first electric circuit for supplying high-voltage electrostatic energy, which has been charged in the first, second and third capacitors, to the next activated exciting coils together with the voltage of said DC electric power source in order to make exciting current build up quickly;

a chopper circuit for deactivating said exciting coil when its exciting current exceeds a predetermined value and activating said exciting coil again when the exciting current decreases to a predetermined value;

first, second and third semiconductor switching elements connected in parallel with current supply circuits of said first, second and third diodes so that respective current supply directions become opposite to those of said current supply circuits;

a second electric circuit for activating said first, second and third semiconductor switching elements for the duration of said No.1-, No.2- and No.3-phase position detecting signals, respectively;

a third electric circuit, whereby, when the motor rotating in the normal direction is switched into the reverse Potation mode, chopper-controlled current is made to build up quickly by applying a voltage as a sum of the voltage of the DC electric power source and an electromotive force due to reduction of magnetic flux intersecting the exciting coil, and the current is made to decrease slowly by regenerative braking to recover the current through said first, second and third semiconductor switching elements to the positive terminal of the DC electric power source by applying a voltage as a sum of the electromotive force due to reduction of magnetic flux intersecting the exciting coil and an electromotive force due to discharge of magnetic energy stored in said exciting coil; and a means for fixing said position detecting elements on the fixed armature side so that said exciting coils wound round said magnetic poles can be activated at a predetermined angle within an electric angle of approximately 30 degrees from the point at which said salient poles begin confronting said magnetic poles.

A third aspect of the present invention provides a DC motor in a three-phase full-wave current supply mode reluctance type motor, comprising:

- a plurality of salient poles of equal width disposed on an outer surface of the magnetic rotor at regular intervals of the same angle;
- 12n pieces (n: a positive integer) of magnetic poles protruding from an inner peripheral surface of a fixed armature, symmetrically disposed magnetic poles being in-phase, said magnetic poles, wound with exciting coil, confronting said salient poles over slight gap and being disposed at regular intervals with a 120- or 180-degree circumferential width in terms of electric angle;
- No.1-, No.2- and No.3-phase exciting coils wound round said magnetic poles;
- a position detecting device including a plurality of position detecting elements for detecting rotational positions of said salient poles and generating rectangular waveform No.1-phase position detecting signals having the same width of 120-degree electric angle and a phase difference of 360-degree electric angle therebetween, and rectangular waveform No.2- and No.3-phase position detecting signals having the same width and phase difference as the No.1-phase position detecting signals but being successively delayed one another from the No.1-phase position detecting signals by 120-degree electric angle, as well as generating a rectangular waveform No.1-phase position detecting signals having the same width and same phase difference as the No.1-phase position detecting signals but being delayed from said No.1-phase position detecting signals by 180-degree electric angle, and rectangular waveform No.2- and No.3-phase position detecting signals having the same width and the phase difference as the No.1-phase position detecting signals but being successively delayed one another from the No.1-phase position detecting signals by 120-degree electric angle;
- a switching element connected to both ends of each exciting coil, where a pair of the exciting coils of No.1-phase half-wave current supply mode are referred to as No.1- and No.1-exciting coils, while pairs of exciting coils of No.2-phase and No.3-phase half-wave current supply mode are referred to as No.2- and No.2-exciting coils and No.3- and No.3-exciting coils respectively;
- a diode inversely connected to a serial joint unit of said switching element and corresponding exciting coil;
- a first electric circuit for turning on the switching elements connected with both ends of said No.1-, No.2- and No.3-exciting coils wound round said magnetic poles of the fixed armature for the duration of said No.1-, No.2- and No.3-phase position detecting signals and turning on the switching elements connected with both ends of said No.1-, No.2- and No.3-exciting coils wound round other magnetic poles of the fixed armature for the duration of said No.1-, No.2- and No.3-phase position detecting signals in order to rotate the motor in the normal direction, or turning on the switching elements connected with both ends of said No.1-, No.2- and No.3-exciting coils for the duration of said No.1-, No.2- and No.3-phase position detecting signals and further turning on the switching elements connected with both ends of said No.1-, No.2- and No.3-exciting coils for the duration of said No.1-, No.2- and No.3-phase position detecting signals in order to rotate the motor in the reverse direction;
- first, second and third current supply control circuits for turning on said switching elements connected to both ends of the exciting coils in order to supply current to said No.1-, No.1-exciting coils, No.2-, No.2-exciting coils, and No.3-, No.3-exciting coils through first, second and third back-flow preventing diodes respectively connected to the DC electric power source in the forward direction;
- first, second and third capacitors having small capacitances for storing magnetic energies discharged from said No.1-, No.1-exciting coils, No.2-, No.2-exciting coils, and No.3-, No.3-exciting coils through diodes having one end connected to the negative voltage side of said exciting coil, respectively, in order to quickly reduce exciting current when said No.1-, No.1-exciting coils, No.2-, No.2-exciting coils, and No.3-, No.3-exciting coils are deactivated at the terminal ends of said position detecting signals;
- a second electric circuit for supplying high-voltage electrostatic energy charged in the first, second and third capacitors to the next activated exciting coils together with the voltage of said DC electric power source in order to make exciting current build up quickly;
- a chopper circuit for deactivating each of said No.1-, No.1-, No.2, No.2-, No.3-, and No.3-exciting coils when its exciting current exceeds a predetermined value and activating said exciting coil again when the exciting current decreases to a predetermined value;
- first, second and third semiconductor switching elements connected in parallel with current supply circuits for said first, second and third diodes so that respective current supply directions become opposite to those of said current supply circuits;
- a third electric circuit for activating said first, second and third semiconductor switching elements for the duration of said No.1-, No.1-phase position detecting signals, No.2-, No.2-phase position detecting signals, and No.3-, No.3-phase position detecting signals, respectively;
- a fourth electric circuit, whereby, when the motor rotating in the normal direction is switched into the reverse rotation mode, chopper-controlled current is made to build up quickly by applying a voltage as the sum of the voltage of the DC electric power source and an electromotive force due to reduction of magnetic flux intersecting the exciting coil, and the current is made to decrease slowly by regenerative braking for recovering the current through said first, second and third semiconductor switching elements to the positive terminal of the DC electric power source by applying a voltage as the sum of the electromotive force due to reduction of magnetic flux intersecting the exciting coil and an electromotive force due to discharge of magnetic energy stored in said exciting coil;

a means for fixing said position detecting elements on the fixed armature side so that said exciting coils wound round said magnetic poles can be activated at a predetermined angle within an electric angle of approximately 30 degrees from the point at which said salient poles begin confronting said magnetic poles.

Furthermore, a fourth aspect of the present invention provides a three-phase full-wave current supply mode DC motor including a fixed armature and a magnet rotor, comprising:

No.1-, No.2- and No.3-phase armature coils wound round magnetic poles of the fixed armature, where the armature coil is referred to as No.1-phase armature when in No.1-phase normal-direction current supply mode, while as No.1-phase armature coil when in No.1-phase reverse-direction current supply mode, and as No.2-phase and No.3-phase armature coils when in No.2-phase and No.3-phase normal-direction current supply mode, while as No.2-phase and No.3-phase armature coils when in No.2-phase and No.3-phase reverse-direction current supply mode;

a position detecting device including a plurality of position detecting elements for detecting rotational positions of N- and S-poles of said magnet rotor and generating rectangular waveform No.1-phase position detecting signals having the same width of 120-degree electric angle and a phase difference of 360-degree electric angle therebetween, rectangular waveform No.2- and No.3-phase position detecting signals being successively delayed one another from the No.1-phase position detecting signals by 120-degree electric angle, rectangular-waveform No.1-phase position detecting signals having the same width and phase difference as the No.1-phase position detecting signals but being delayed from said No.1-phase position detecting signals by 120-degree electric angle, and rectangular waveform No.2- and No.3-phase position detecting signals being successively delayed one another from the No.1-phase position detecting signals by 120-degree electric angle;

6 switching elements connected with both ends of each of said No.1-, No.1-, No.2-, No.2-, No.3-, No.3-armature coil;

diodes inversely connected to serial joint units each consisting of said switching element and its corresponding armature coil;

first, second and third current supply control circuits for turning on said switching elements connected to both ends of said No.1-, No.2-, No.3-, No.1-, No.2- and No.3-armature coils in response to corresponding No.1-, No.2-, No.3-, No.1-, No.2- and No.3-phase position detecting signals, so as to supply current through first, second, - - - sixth backflow preventing diodes respectively connected to the DC electric power source in the forward direction for rotating the motor in the normal direction, or for turning on said switching elements connected to both ends of said No.1-, No.2-, No.3-, No.1-, No.2- and No.3-armature coils in response to No.1-, No.2-, No.3-, No.1-, No.2- and No.3-phase position detecting signals for generating reverse rotation torque so as to rotate the motor in the reverse direction;

first, second, - - -, sixth capacitors having small capacitances for storing magnetic energies discharged from said No.1-, No.2-, No.3-, No.1-, No.2- and No.3-armature coils through diodes having one end being connected to the negative voltage side of said armature coil, respectively, so as to quickly reduce armature current when said No.1-, No.2-, No.3-, No.1-, No.2- and No.3-armature coils are deactivated at the terminal ends of said position detecting signals;

a first electric circuit for supplying high-voltage electrostatic energy charged in the first, second, - - -, sixth capacitors to the next activated armature coils together with the voltage of said DC electric power source, so as to make armature current build up quickly;

a chopper circuit for deactivating each of said No.1-, No.2-, No.3-, No.1-, No.2- and No.3-armature coils when its armature current exceeds a predetermined value and activating said armature coil when the armature current decreases to a predetermined value;

first semiconductor switching element being connected, through a diode, from each of negative terminals of said No.1-, No.1-armature coils to the positive terminal of the DC electric power source;

second and third semiconductor switching elements being connected through a diode from each of negative terminals of said No.2-, No.2-, No.3- and No.3-armature coils to the positive terminal of the DC electric power source;

a second electric circuit for activating said first, second and third semiconductor switching elements for the predetermined duration of said No.1-, No.1-phase position detecting signals, No.2-, No.2-phase position detecting signals, and No.3-, No.3-phase position detecting signals, respectively;

a third electric circuit, whereby, when the motor rotating in the normal direction is switched into the reverse rotation mode, chopper-controlled current is made to build up quickly by applying a sum of the voltage of the DC electric power source and an electromotive force due to reduction of magnetic flux intersecting the armature coil, as well as for slowly decreasing the current by regenerative braking in order to recover the current through said first, second and third semiconductor switching elements to the positive terminal of the DC electric power source by applying a voltage as the sum of the electromotive force due to reduction of magnetic flux intersecting the armature coil and an electromotive force due to discharge of magnetic energy stored in said armature coil; and a means for fixing said position detecting elements on the fixed armature side so that maximum torque can be obtained when said armature coils are activated by 120-degree electric angle.

In accordance with the present invention the exciting coil is activated by a single switching element provided on a positive or a negative voltage side, and exciting coils are activated for the duration of position detecting signals; when the exciting coil is deactivated at terminal ends of the position detecting signal, magnetic energy stored in the exciting coil is discharged into a small-capacitance capacitor to charge it to a high voltage.

Accordingly, a time required for extinguishing magnetic energy becomes so short that no counter torque is generated. In response to the next position detecting signal arriving after a predetermined time has elapsed, current supply to the exciting coil is initiated. In this case, a voltage value supplied to the exciting coil becomes a summation of the charged voltage of said capacitor and the electric power source voltage, so that building-up of armature current becomes sharp. Thus, occurrence of torque reduction is prevented. As can be understood from the foregoing explanation, disadvantage of the reluctance type motor, that is, not being able to rotate in a high speed region can be removed. Since expensive switching element needed is only one, the above-described problem is solved. The above advantages are also available in the case of a brushless DC motor having a large output.

As the chopper circuit is working when the motor rotating in a normal direction is changed into a reverse rotation mode, a voltage applied to the exciting coil becomes equal to a summation of the DC electric power source voltage and counter electromotive force. Thus, the exciting current builds up sharply. When the current increases to a predetermined value, the exciting current is terminated to slow down the reduction of magnetic energy stored in the exciting coil. In this section, electric power is returned to the electric power source for regeneration by the function of a transistor connected in parallel to the back-flow preventing diode. Hence, the function of regenerative braking is available. Thus, the above problem is solved. With above-described means, an electric circuit can be simplified in the case of a regenerative braking function of a brushless DC motor.

As explained in the foregoing description, according to the present invention, the magnetic energy stored in this exciting coil is converted into the electrostatic energy of the capacitor when one exciting coil or armature coil is deactivated, and, the electrostatic energy is then converted into the magnetic energy of an exciting or armature coil to be next activated. Thus, by changing the capacitance of the capacitor, building-up and trailing-off of the armature current can be controlled at a desired speed. Thus, a motor of good efficiency in a high-speed region can be obtained.

It is also possible to obtain a motor of less ripple torque.

As the activation of each exciting coil can be controlled by only one power element, the current supply control circuit can be simplified, and an overall cost of the current supply control circuit can be reduced.

The chopper circuit not only capable of maintaining the exciting current at a predetermined value but capable of making available the regenerative or electromagnetic braking.

Consequently, it becomes possible to obtain a DC motor capable of performing regenerative braking, as well as capable of controlling braking torque freely.

BEST MODE FOR CARRYING OUT THE INVENTION

Figure 1:
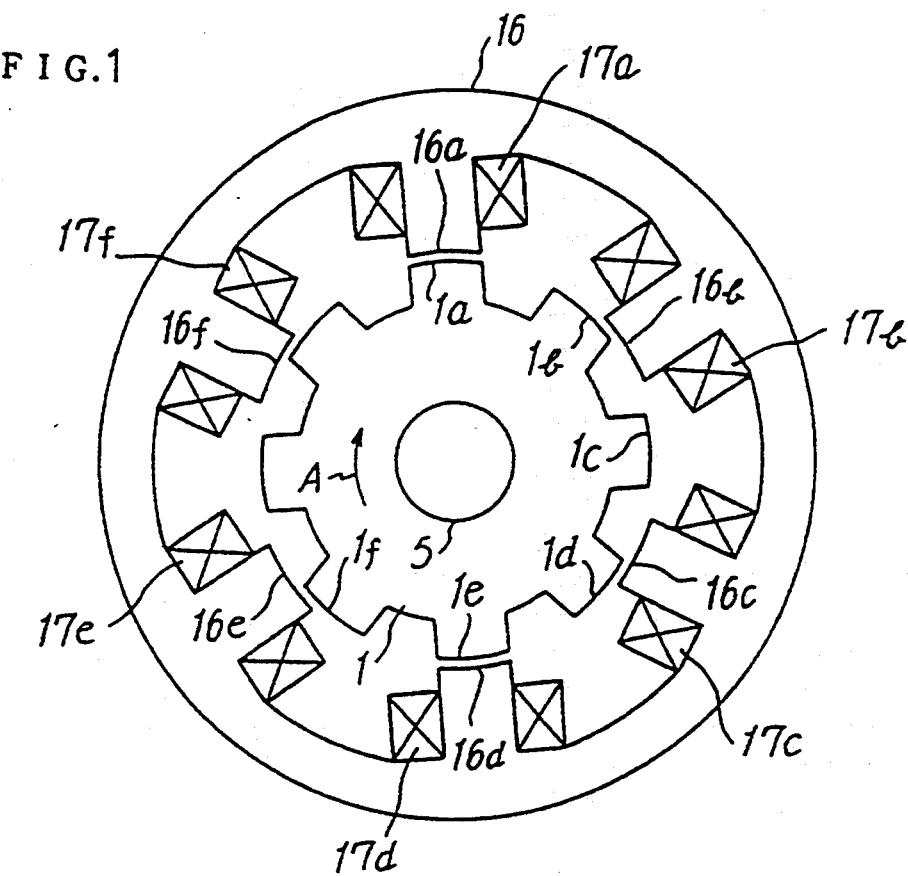
FIG. 1 is a plane view showing a three-phase half-wave reluctance type motor in accordance with the present invention.

With reference to FIG. 1 and the following drawings, preferred embodiments of the present invention will be explained. The same reference numerals in respective drawings denote the like components and thus will not be explained duplicately. In the following explanation, all the angles are expressed in terms of an electric angle.

An explained first of all is a constitution of a three-phase half-wave reluctance type motor embodying the present invention. FIG. 1 is a plane view showing a fixed armature and a rotor. In FIG. 1, a reference numeral 1 represents a rotor which is equipped with a plurality of salient poles 1a, 1b, - - - having the same width of 180 degrees and mutually spaced at regular intervals of 360 degrees.

The rotor 1 is made from a well-known laminated silicon steel sheets. Reference numeral 5 denotes a rotational shaft. A fixed armature 16 is provided with magnetic poles 16a, 16b, 16c, 16d, 16e and 16f, having the same width of 180 degrees and mutually spaced at regular intervals. The salient pole and the magnetic pole are formed to have the same 180-degree width. The number of the salient poles is eight, and the number of the magnetic poles is six. The armature 16 is made in the same manner as the rotor 1. The magnetic poles 16a, 6b, - - - are wound with exciting coils 17a, 17b, - - - .

Figure 3:
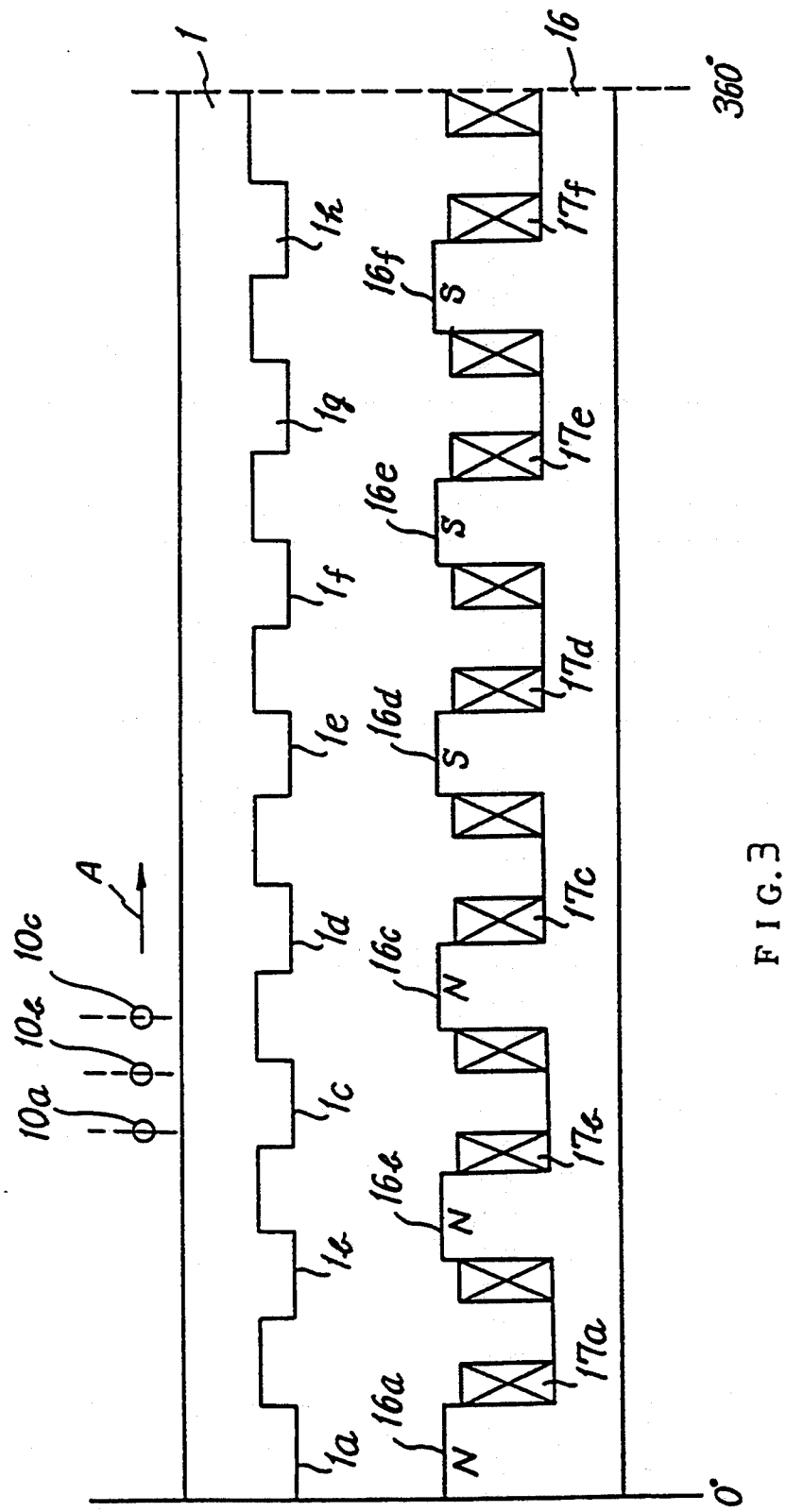
FIG. 3 is a development showing magnetic poles and salient poles of the motor shown in FIG. 1.

FIG. 3 is a development of the magnetic poles and the rotor of FIG. 1. In FIG. 3, a circular ring portion 6 and magnetic poles 16a, 16b, - - - constitute the fixed armature being fixed on an outer casing (not shown). The portion 16 is a core serving as a magnetic path.

The exciting coils 17a, 17d are connected in series or in parallel with each other, and this joint unit is referred to as an exciting coil 32a. The exciting coils 7b, 17e, as well as the exciting coils 17c, 17f, are also connected similarly, and these joint units are referred to as an exciting coil 32b and an exciting coil 32c, respectively.

When the exciting coil 32b is activated, the salient poles 1b, if are magnetically attracted to cause the rotor 1 to rotate in a direction of an arrow A. When the rotor 1 rotates 120 degrees, the exciting coil 32b is deactivated, and the exciting coil 32c is activated. When the rotor 1 further rotates 120 degrees, the exciting coil 32c is deactivated, and the exciting coil 32a is activated. A current supply mode is cyclically alternated every 120-degree rotation in the order of the exciting coil 32a → exciting coil 32b → exciting coil 32c, so that the motor can be driven as a three-phase half-wave motor. In this case, symmetrically disposed magnetic poles are magnetized to become N-poles and S-poles as shown in the drawing. Since two magnetic poles excited simultaneously are always magnetized to have opposite polarities, leaking magnetic fluxes passing through non-excited magnetic poles become mutually opposite, and therefore counter torque is prevented from being generated.

In order to further reduce the above-described leaking magnetic flux, No.1-phase magnetic poles 16a, 16d are respectively assembled as a set of two magnetic poles so that such magnetic poles can be magnetized to be an N-pole and an S-pole respectively by activating their exciting coils. Leakage of magnetic fluxes occurring in respective sets of two magnetic poles are cancelled by other magnetic poles until being extinguished almost completely. Other magnetic poles 16b, 16c, - - - 16f are also respectively constituted as a set of two magnetic poles which are magnetized to be an N-pole and an S-pole respectively. Thus, similar effect can be enjoyed, and leakage of magnetic fluxes are extinguished.

In this case, the number of the salient poles 1a, 1b, - - - becomes 16, and a resulting output torque becomes twice. The exciting coils 32a, 32b and 32c are respectively referred to as No.1-, No.2- and No.3-phase exciting coils.

Though the number of the salient poles of the rotor 1 shown in FIG. 1 is 8, the present invention can still be realized even if the number of the salient poles is reduced to 4 in order to reduce a diameter of the rotor 1. In this case, a number of the magnetic pole becomes 6.

Coils 10a, 10b and 10c of FIG. 3 are position detecting elements for detecting positions of the salient poles 1a, 1b, - - -, and are fixed on the armature 16 as shown in the drawings, with their coil surfaces facing side surfaces of the salient poles 1a, 1b, - - - over air gap. The coils 10a, 10b and 10c are spaced one another by 120 degrees. The coil is of a 100-turn air-core type having a diameter of 5 mm.

Figure 6:
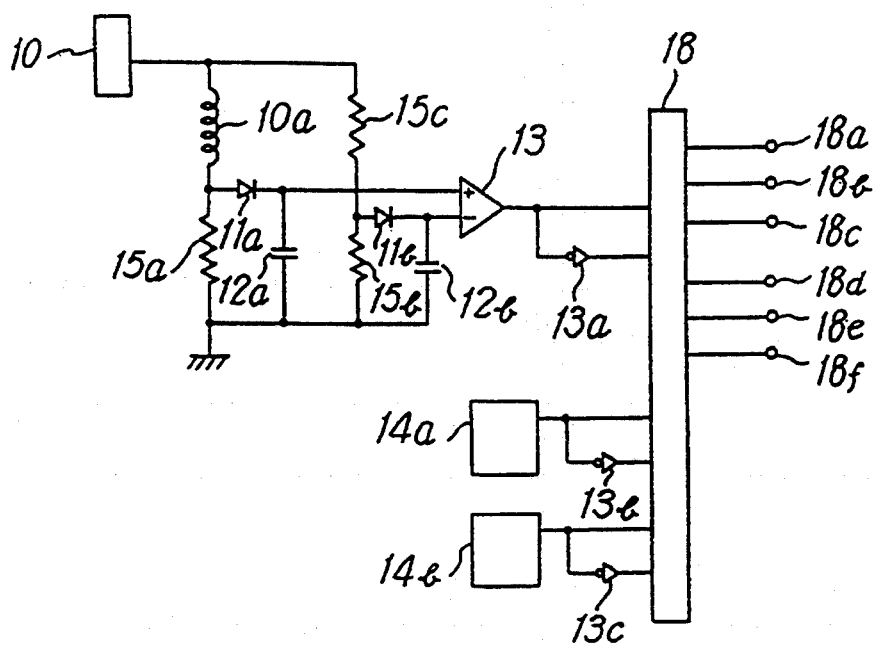
FIG. 6 is a circuit diagram showing a three-phase position detecting device.

FIG. 6 shows a device for obtaining position detecting signals from the coils 10a, 10b and 10c. In FIG. 6, the coil 10a and resistances 15a, 15b and 15c constitute a bridge circuit, which is designed to balance when the coil 10a does not directly confront with the salient poles 1a, 1b, - - - .

Accordingly, an output of a low-pass filter consisting of a diode 11a and a capacitor 12a and an output of a low-pass filter consisting of a diode 11b and a capacitor 12b are equal to each other, and therefore an output of the operational amplifier 13 becomes a LOW-level.

Reference numeral 10 denotes an oscillator capable of oscillating at approximately 1 MHz. When the coil 10a directly confront the salient poles 1a, 1b, - - -, an impedance is reduced due to iron loss (i.e. eddy loss and hysteresis loss). Therefore, a voltage drop in the resistance 15a becomes large, thereby causing the output of the operational amplifier 13 to become a HIGH-level.

Figure 16:
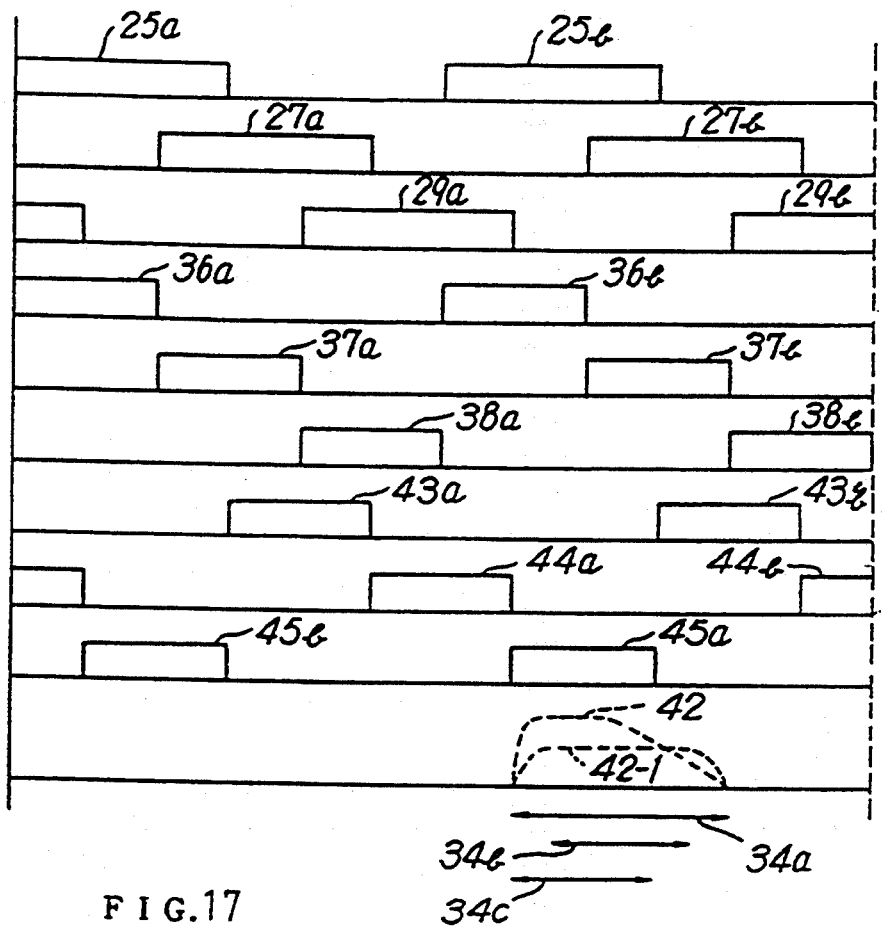
FIG. 16 is a time chart showing position detecting signals of the three-phase reluctance type motor.

Inputs to the block circuit 18 are shown by curves 25a, 25b, - - - in a time chart of FIG. 16, and inputs supplied through an inversion circuit 13a are identical with inverted curves of the curves 25a, 25b, - - -. Block circuits 14a, 14b in FIG. 6 have the same constitution as the above-described block circuits including the coils 10b, 10c, respectively. The oscillator 10 can be utilized commonly among these block circuits.

An output of the block circuit 14a and an output of the inversion circuit 13b are inputted into the block circuit 18, and their output signals become curves 27a, 27b, - - - as shown in FIG. 16 and inverted curves of the curves 27a, 27b.

An output of the block circuit 14b and an output of the inversion circuit 13c are inputted into the block circuit 18, and their output signals become curves 29a, 29b, - - - as shown in FIG. 16 and inverted curves of the curves 29a, 29b. The curves 27a, 27b, - - - are delayed 120 degrees in phase with respect to the curves 25a, 25b, - - - . In the same way, the curves 29a, 29b, - - - are delayed 120 degrees in phase with respect to the curves 27a, 27b, - - - .

The block circuit 18 is a circuit conventionally utilized in a control circuit of a three-phase Y-type semiconductor motor, and also it is a logic circuit generating 120-degree width rectangular-waveform electric signals from terminals 18a, 18b, - - - , 18f in response to the above-described position detecting signals. Outputs from the terminals 18a, 18b and 18c are shown respectively by curves 36a, 36b, - - -, curves 37a, 37b, - - -, and curves 38a, 38b, - - - in FIG. 16. Outputs from the terminals 18d, 18e and 18f are shown by curves 43a, 43b, - - -, curves 44a, 44b, - - -, and curves 45a, 45b, - - -, respectively.

The outputs of the terminal 18a and the terminal 18d, the terminal 18b and the terminal 18e, and the terminal 18c and the terminal 18f have a phase difference of 1.80 degrees respectively.

The output signals from the terminals 18a, 18b and 18c are successively delayed from one another by 120 degrees. In the same manner, the output signals from the terminals 18d, 18e and 18f are successively delayed from one another by 120 degrees. The same effect can be obtained even when an aluminum plate, synchronously rotating together with the rotor 1 of FIG. 1 and having the same configuration, is used instead of the salient poles 1a, 1b, - - - facing to the coils 10a, 10b and 10c.

In the plane view of FIG. 1 and the development of FIG. 3, the circular ring 16 and magnetic poles 16a, 16b, - - -are fixed together to the outer casing to form a fixed armature. Reference numerals 16, 16a and 16b, - - - respectively represent an armature or fixed armature.

Magnetic attraction forces derived from the excited magnetic pole and the salient pole, which are symmetrically disposed about an axis, are balanced in a radial direction, so that vibration is suppressed. A measure for supplying current to the exciting coils is next explained with reference to FIG. 12.

Lower ends of the exciting coils 32a, 32b and 32c are inserted with transistors 20a, 20b and 20c. The transistors 20a, 20b, 20c serve as switching elements, and can be replaced by other semiconductor elements having the same effect. A DC electric power source supplies electric power from its positive and negative terminals 2a, 2b.

This embodiment is characterized by a simplified circuit for activation/deactivation control due to that transistor 20a, 20b or 20c is provided at lower end of each exciting coil, i.e., a negative terminal side of the DC electric power source.

Position detecting signals of curves 36a, 36b, - - -, curves 37a, 37b, - - -, and curves 38a, 38b, - - - in FIG. 16 are inputted from terminals 42a, 42b and 42c. In response to base inputs fed through AND circuits 24a, 24b and 24c, the transistors 20a, 20b, 20c are turned on to activate exciting coils 32a, 32b and 32c.

A terminal 40 is supplied with a reference voltage specifying an armature current. By changing a voltage of the terminal 40, an output torque can be changed. When an electric power switch (not shown) is turned on, an output of an operational amplifier 40a becomes a HIGH-level, since an input of a negative terminal of the operational amplifier 40a is lower than that of its positive terminal, whereby the transistor 20a turns on, and the current supply control circuit of the exciting coil is activated. A resistance 22a and an absolute-value circuit 27 are provided for detecting exciting current flowing through the exciting coils 32a, 32b and 32c.

Figure 10:
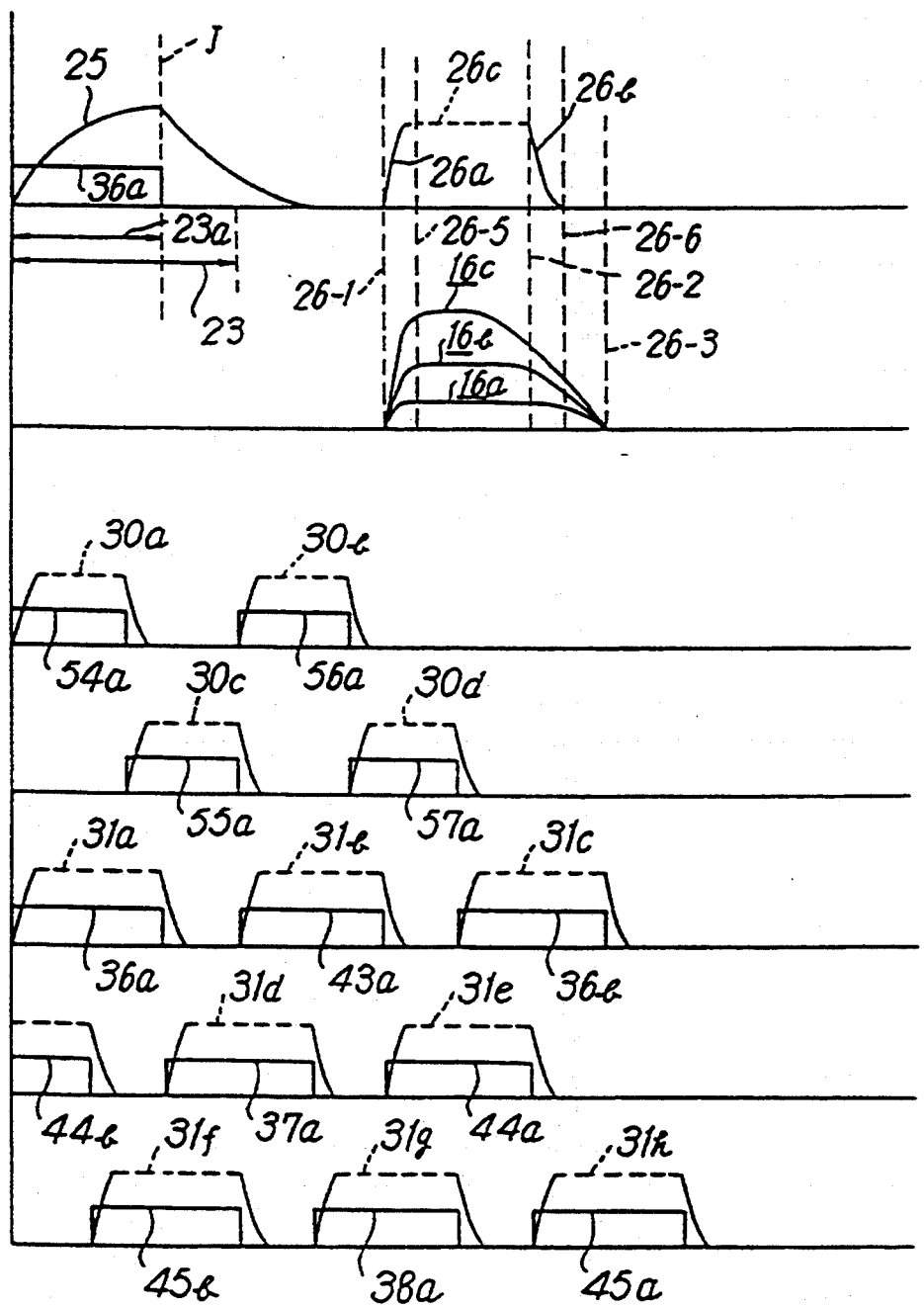
FIG. 10 is a time chart showing position detecting signals, exciting current, and output torque curves.

One of the above-described position detecting signal curves is shown as a curve 36a in the first stage of a time chart of FIG. 10. The exciting coil 32a is supplied with an exciting current during a time period corresponding to this curve 36a in FIG. 10. An arrow 23a shows a current supply angle of 120 degrees.

In an initial stage of the current supply period, the building-up of the exciting current is delayed due an inductance of the exciting coil. Thus, if the current is terminated, magnetic energy stored in the exciting coil is discharged to return to the electric power source. Therefore, the current decreases as shown by a second half portion of the curve 25; i.e. a right side the dotted line J. A section for generating a positive torque is a 180-degree section shown by an arrow 23; therefore counter torque is generated to decrease both output torque and efficiency. This phenomenon becomes so conspicuous as the speed increases that the motor will become unable to be operated for practical use in a high-speed region.

This is because a time width of a positive torque generating section 23 decreases in proportion to an increase of the rotational speed, while a time width of a counter torque generating section will not vary even if the motor speed becomes a high speed.

The same explanation applies to the current supply operation of the exciting coils based on other position detecting signals 36a, 37a and 38a. A building-up portion of the curve 25 also delays, so that an output torque decreases. That is, torque reduction occurs. This is because the magnetic pole and the salient pole interact to close the magnetic path to maintain a large inductance.

The reluctance type motor is advantageous in that is able to generate a large output torque but disadvantageous in that it is unable to increase its operational speed because of the occurrence of the above-described counter torque and torque reduction.

Figure 12:
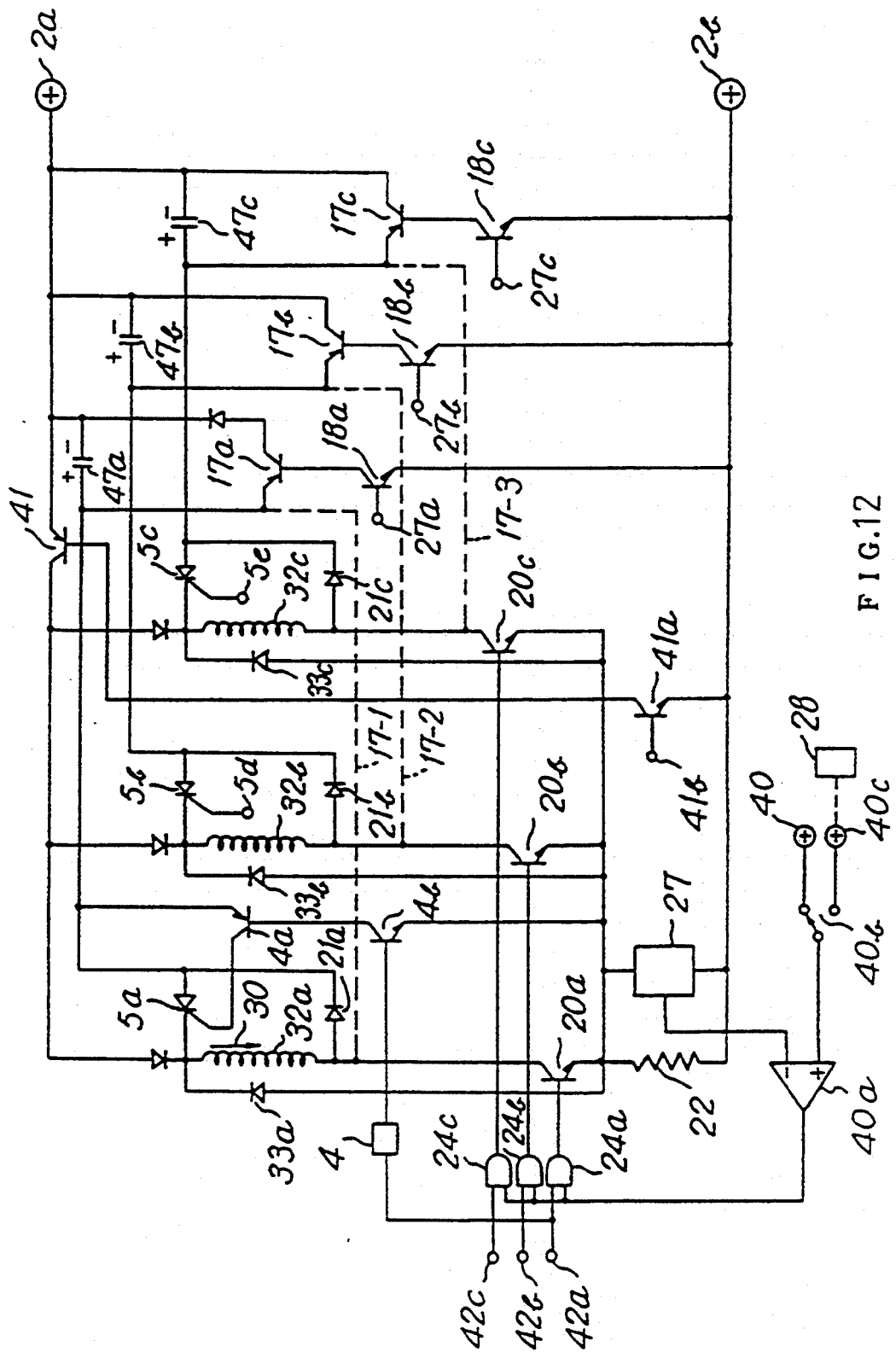
FIG. 12 is a circuit diagram showing a current supply control circuit for activating/deactivating exciting coils of three-phase half-wave current supply mode.

An apparatus in accordance with the present invention is characterized by that above-mentioned disadvantage is eliminated by additionally providing small-capacitance capacitor 47a and a diode 21a and semiconductor elements 4a, 4b, 5a and others shown in FIG. 12, and that only one switching element (20a, 20b or 20c), controlling activation/deactivation of each exciting coil, is provided on a negative voltage side of the DC electric power source.

When current is terminated at the terminal end of the curve 36a, magnetic energy stored in the exciting coil 32a is discharged through the diode 21a to the capacitor 47a so as to charge it up to a high voltage with polarities shown in the drawing, being prevented from returning to the DC electric power source side. Accordingly, the magnetic energy is sharply extinguished, and the current decreases steeply.

Curves 26a, 26b and, 26c shown in the first stage of the time chart of FIG. 10 cooperatively represent a curve of current flowing through the exciting coil 32a. Both dotted lines 26-1 and 26-2 are spaced 120 degrees. The armature current decreases steeply like the curve 26b to prevent the counter torque. The capacitor 47a is charged up to a high voltage and held at this voltage. Next, in response to the position detecting signal curve 36b, the transistor 20a is turned on to activate the exciting coil 32a again. A voltage equivalent to a summation of the charged voltage of the capacitor 47a and the DC electric power source voltage (a voltage between the terminals 2a, 2b) is applied to the exciting coil 32a in this case; therefore an exciting current of the exciting coil 32a builds up sharply as shown by the curve 26a. This phenomenon will be explained below.

A block circuit 4 of FIG. 12 obtains a differential pulse in an initiating portion of the position detecting signal 36b. By inputting this differential pulse, a monostable circuit generates an electric pulse having a narrow width. As the transistors 4b, 4a and the SCR 5a are turned on in response to the above electric pulse, high voltage of the capacitor 47a is applied to the exciting coil 32a, causing the exciting current to build up sharply. Thereafter, due to the voltage of the DC electric power source, a current of the curve 26c (FIG. 10) is obtained. Upon completion of discharge of the capacitor 47a, the SCR 5a is turned off.

As can be understood from the foregoing description, torque reduction and counter torque can be removed, and a wave form of the exciting current becomes substantially rectangular. Therefore, an output torque increases.

Above described explanation likewise applies to functions of other exciting coils 32b, 32c, diodes 21b, 21c, capacitors 47b, 47c, and SCRs 5b, 5c. Terminals 5d, 5e provide electric signals having a width equal to that of the electric pulse obtained in the initiating portions of the corresponding position detecting signals.

Diodes 33a, 33b and 33c are provided for allowing the exciting coils 32a, 32b and 32c to discharge magnetic energy.

Next, a chopper circuit will be explained. When the exciting current of the exciting coil 32a increases and causes the voltage drop in the resistance 22a, which detects exciting current value, increases until exceeding the reference voltage of the reference voltage terminal 40 (i.e. an input voltage of the positive terminal of the operational amplifier 40a), a downside input of the AND circuit 24a becomes a LOW level. Thus, the transistor 20a turns off, causing the exciting current to decrease. Due to hysteresis characteristics of the operational amplifier 40a, the output of the operational amplifier 40a resumes a HIGH level after a predetermined reduction. The transistor 20a, therefore, turns on, and the exciting current increases. By repeating such a cycle, the exciting current can be maintained at a predetermined value. A section indicated by the curve 26c in FIG. 10 is a chopper-controlled section. A height of the curve 26c is regulated by a voltage of the reference voltage terminal 40.

The exciting coil 32b of FIG. 12 is activated by the turning-on of the transistor 20b in accordance with widths of the position detecting signal curves 37a, 37b, - - -inputted from the terminal 42b, and, the chopper control is carried out by the operational amplifier 40a, the resistance 22, the absolute-value circuit 27, and AND circuit 24b. The same explanation applies to the exciting coil 32c. The activation/deactivation of the exciting coil 32c is controlled in response to the position detecting signals 38a, 38b, - - - of FIG. 16 supplied from the terminal 24c. Functions and effects of the transistor 20c, AND circuit 24c, operational amplifier 40a, resistance 22, and absolute-value circuit 27 are substantially the same as in the previous case.

Exciting current for respective exciting coils can be supplied from any point within an approximately 30-degree section or from the point at which the salient poles come to confront the magnetic poles. The fixing positions of coils 10a, 10b and 10c, which are to serve as position detecting elements, on the side of the armature are determined by adjusting their positions consideration of the rotational speed, efficiency and output torque. As is apparent from the foregoing description, in this embodiment, it becomes possible to drive a motor at a high speed with good efficiency and large output as a three-phase half-wave current supply type motor.

Thus, the purpose of the present invention can be accomplished. In the case of a three-phase full-wave current supply mode, the same purpose can be accomplished by combining two sets of above-described half-wave current supply mode circuits.

Curves 26a, 26b and 26c shown in FIG. 10 cooperatively represent a current supply curve for the exciting coil. A gap between a dotted line 26-1 and a dotted line 26-2 represents a 120-degree width of the position detecting signal. A gap between the dotted line 26-1 and a dotted line 26-3 represents a 180-degree width of the output torque generating section.

Curves 16a, 16b and 16c show output torque curves. At the point of the dotted line 26-1, the current supply operation is initiated, and the salient poles begin confronting the magnetic poles at the same time. The curve 16a represents a condition wherein a current supplied to the exciting coil is small, and its torque becomes relatively flat; however, as shown by the curves 16b, 16c, a peak value of the torque tends to shift toward a left side as the current value increases, and a width of the peak value becomes narrow.

In view of the above-described torque characteristics and supplied current value, it is ideal to set an initiation time of the current supply operation to an intermediate point of a 30-degree section after the salient poles begin confronting the magnetic poles by adjusting the fixing points of the position detecting coils 10a, 10b and 10c.

Since the charging voltage of a capacitor is inversely proportional to its capacity, the exciting current of exciting coils can both be built up and dropped sharply by using small-capacitance capacitors as capacitors 47a, 47b and 47c. The motor can thus operate at a high-speed region and the disadvantage of the conventional reluctance type motor can be eliminated. The capacitances of the above-described capacitors are preferred to be as small as possible not to cause the charging voltage to damage the transistors in the circuit.

As there is no field magnet, it is impossible to make available electromagnetic braking for deceleration or stopping, and thus it is also impossible to make available regenerative braking. So, it cannot be used as servomotors or actuators for electric powered vehicles.

The present invention resolves the above-described problems. Details will be described below. In FIG. 12, the capacitors 47a, 47b, 47c are connected in parallel with transistors 17a, 17b, 17c serving as semiconductor switching elements, respectively. A transistor 41 is inserted for regenerative braking.

In order to cause a reverse rotation for braking during the normal rotation of the motor, the input signals of the terminals 42a, 42b, 42c are switched to the position detecting signal curves 43a, 43b, - - - , curves 44a, 44b, - - - , curves 45a, 45b, - - - of FIG. 16.

Figure 11:
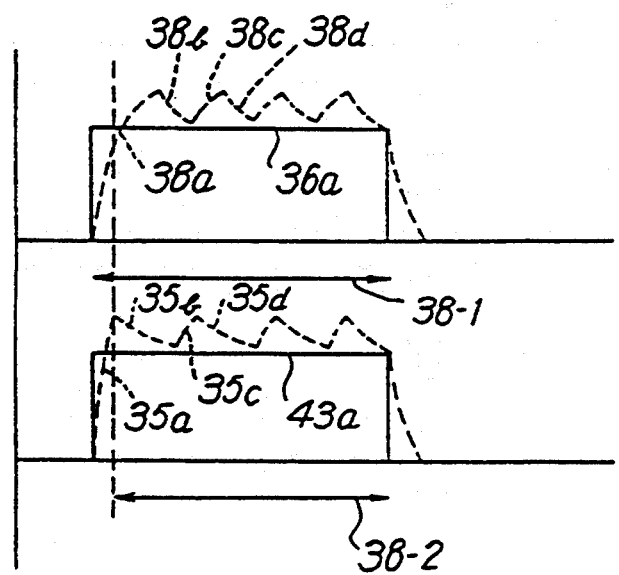
FIG. 11 is a graph showing currents of exciting coil in normal and reverse rotation modes.

Next, a regenerative braking which is to be applied by switching the motor to the reverse rotation mode during the normal rotation of the motor will be explained. A current supply to the exciting coil 32a during the normal rotation will be explained. In FIG. 11, the signal curve 36a denotes a position detecting signal inputted from the terminal 42a. An arrow 38-1 denotes 120-degree width. The transistors 17a, 18a of FIG. 12 are turned on in response to the input of the base terminal 27a; turning-on angle is indicated by an arrow 38-2 of FIG. 11, wherein a predetermined angle at the initiating portion is removed.

In order to obtain the above-described input signal, a monostable circuit is activated by a differential pulse at the initiating portion of the curve 36a, and, as an output from the monostable circuit, an electric signal having a predetermined width is obtained. This electric signal and a position detecting signal become two inputs to an OR circuit so that the above signal can finally be obtained from the OR circuit.

The input signals to the base terminal 27b of the transistors 17b and 18b, and to the base terminal of the transistors 17c and 18c can also be obtained from the corresponding position detecting signals by the same means.

Transistors 17a, 17b and 17c are controlled to realize the reverse rotation mode for the regenerative braking. In the normal rotation mode, base terminals 7a, 27b and 27c are maintained at earth level. Therefore, the purpose of the present invention can be accomplished either when the transistors are turned off or when the same current supply control as in the case of the reverse rotation mode is applied during the normal rotation mode.

The building-up of the exciting current of the exciting coil 32a becomes sharp due to high voltage of the capacitor 47a, as shown by the curve 38a. As the transistor 17a is turned off during the initiating portion of the curve 38a, the capacitor 47a will not be discharged by short-circuiting. Therefore, the electrostatic energy stored in the capacitor 47a is converted into magnetic energy of the exciting coil 32a.

When the output of the operational amplifier 40a turns to a LOW level, the transistor 20a turns off. Magnetic energy is returned through the transistor 17a to the section of electric power source, as shown by the curve 38b, causing the exciting current of the exciting coil 32a to decrease. When the exciting current is reduced to a predetermined value, an output of the operational amplifier 40a returns to a HIGH level due to its hysteresis characteristics. Then, the transistor 20a turns on, and the exciting current increases as shown by the curve 38c. Repeating such a cycle constitutes a chopper circuit. This chopper circuit can be constituted by another well-known means.

When the transistors 20a, 17a turn off at the terminal end of the curve 36a, magnetic energy is discharged as a current which in turn charges the capacitor 47a. Thus, the current decreases sharply. Hence, as described above, torque reduction and counter torque can be prevented, and a motor having high efficiency at high speed region can be obtained. The exciting current value can be controlled by the voltage of the reference voltage terminal 40. Other exciting coils 32b, 32c can be controlled in the same manner as the exciting coil 32a.

A case wherein the motor is switched to a reverse rotation mode for speed reduction during the normal rotation will be explained below with reference to the curve of FIG. 11. It is necessary for a motor having a large output to return kinetic energy of the rotor and load to the power source through regenerative braking.

Next, the measure for realizing the regenerative braking will be explained. This measure is designed to accomplish its purpose by switching the rotation mode of the motor rotating in the normal rotation mode to the reverse rotation mode either for deceleration or stopping. Next, the exciting coil 32a in the reverse rotation mode will be explained. In this case, an electromotive force is generated in a direction of an arrow 30, and a voltage applied to the exciting coil 32a will be V+E, where V being a voltage between the terminals 2a, 2b, and E being a counter electromotive force, that is, E equals to an electromotive force occurring when magnetic flux intersecting the exciting coil 32a reduces as the motor rotates.

Thus, when the exciting current sharply increases to a predetermined value in response to the position detecting signal curve 43a in a time chart of FIG. 11, as shown by dotted lines 35a, 35c - - -, the output of the operational amplifier 40a turns to a LOW level; the transistor 20a turns off; magnetic energy of the exciting coil 32a is discharged; and the direction of the discharge current becomes identical with that of the counter electromotive force. Although the above-described direction of current is opposite to that of the counter electromotive force during the normal rotation of the motor, they become identical with each other in the reverse rotation mode because braking torque is generated during the reverse rotation mode.

Hence, the discharge current flowing through the diodes 21a, 33a is returned through the transistor 17a to the electric power source whose voltage is changed to V−E, so that the rate at which the discharge current decreases in the reverse rotation mode is smaller than that in the normal rotation mode. Thus, reduction width increases as shown by dotted lines 35b, 35d of FIG. 11. When the exciting current decreases to a predetermined value, the output of the operational amplifier 40a turns to a HIGH level due to hysteresis characteristics. The transistor 20a is therefore turned on again to rapidly increase exciting current. Such cycle is repeated to constitute a chopper circuit. Function and effect of the capacitor 47a at the initial and terminal ends of respective position detecting signals are entirely the same as those in the normal rotation mode.

Widths of the dotted lines 35a, 35c, - - - become smaller than that of the dotted lines 35b, 35d, - - - in FIG. 11. Although electric power is consumed during sections of the dotted lines 35a, 35c, - - -, an amount of consumption is small because of small widths of these sections. On the other hand, energy of the rotor and load is transformed to electric energy and returned to the electric power source during sections of the dotted lines 35b, 35d, - - -. Therefore, regenerative braking is carried out effectively since widths of these sections are large. After a predetermined deceleration is finished, the motor is switched to the normal rotation mode and returns to the normal operation. If an applied voltage is increased, it becomes possible to realize a high speed of, for example, 300 thousands rpm. When used as a servomotor, it becomes possible to rotate the motor at 3000 rpm, as well as to increase its output torque by several times, by well-known means; that is, by increasing the number of salient poles 1a, 1b, - - - in FIG. 3 by several times and providing the teeth, each having a width same as that of the salient pole, locating opposite to the salient poles.

The above-described function and effect are also available for the exciting coils 32b and 23c. An arrow 38-2 of FIG. 11 shows a current supply width of the transistor 17a of FIG. 12, in which an initiating portion of the position detecting signal curve 43a is cut off by a predetermined width. The width of the cut-off portion varies depending on the constitution of individual motor. Therefore, it is necessary to set a cut-off width to a smallest possible value at which the high-voltage electrostatic energy discharged from the capacitors 47a, 47b and 47c of FIG. 12 can effectively be converted into magnetic energy for facilitating quick building-up of the exciting coil.

In the normal rotation mode, the base terminal 41b of the transistor 41a is maintained at a HIGH level. When switched to the reverse rotation mode, the terminal 41b supplies a HIGH-level output from the output terminal of the operational amplifier 40a. Accordingly, the transistors 41a and 41b are turned on by time widths of the curves 35a, 35c, - - -, of FIG. 11; current is supplied from the electric power source to the exciting coil 32a; the transistor 41 is turned off by the time widths of the curves 35b, 35d, - - -; and electric power is recovered on the side of electric power source through the transistor 17a.

Other exciting coils 32b and 32c can also be controlled in the same manner.

Next, the case of electromagnetic braking will be explained. The transistor 41 is removed in this case. In the case of reverse rotation mode, building-up of the curves 35a, 35c, - - - of FIG. 11 become sharp; width of the curves 35b, 35d, - - - become large; in these sections, magnetic energy stored in each exciting coil is subject to Joule loss with respect to each exciting coil through diodes 21a, 21b, 21c and transistors 17a, 17b, 17c, and is partly recovered as electric energy of the electric power source.

Next, an output torque of 180-degree section caused by salient poles and magnetic poles will be explained. In a time chart of FIG. 16, curves 42, 42-1 at the bottom represent the output torque of an arrow 34a (180 degrees). When an exciting current is small, the output torque becomes symmetrical as shown by the curve 42-1 and has flat torque characteristics. If the exciting current increases so much that magnetic flux is saturated, the output torque becomes an asymmetric torque curve as shown by the curve 42. That is, the output torque rapidly increases as soon as the salient poles begin confronting magnetic poles. Subsequently, the output torque becomes flat, and then it decreases gradually. If the exciting current further increases, the flat portion will almost disappear.

In a case where the exciting coil is supplied with current corresponding to a width of a central portion in the normal/reverse rotation modes as previously described, if the torque curve is symmetric (curve 42-1), the output torque characteristics does not change in the normal/reverse rotation modes. However, a symmetric torque curve is undesirable, since it will cause the output torque characteristics to change; nevertheless, it hardly affect actual operation of the motor, since this only causes the fall of deceleration torque during deceleration in the reverse rotation mode.

In the case of 120-degree current supply during the normal rotation mode, the exciting coil is generally supplied with current by an amount corresponding to the length of an arrow 34b; however, it is also possible to supply current by 120 degree width as shown by an arrow 34c starting from the initiating portion of the position detecting signal. The latter case will be effective for the motor rotating at a high speed of several tens of thousands rpm.

As understood from the foregoing description, the regenerative braking can be applied for deceleration by switching the normal rotation mode to the reverse rotation mode. Deceleration torque can be controlled by varying the voltage of the terminal 40 of FIG. 12. In order to decelerate and stop the motor by the regenerative braking, the voltage of the terminal 40 needs to be varied proportionally to the rotation speed of the motor upon switching to the reverse rotation mode, whereby the deceleration torque will be reduced as the motor speed decreases, and when the motor stops, the armature current of the exciting coil becomes "0" to cause the motor to stop.

A block circuit 28 of FIG. 12 is a circuit for changing an input voltage of the positive terminal 40c in proportion to the rotation speed of the motor. When the motor is switched to the reverse rotation mode for regenerative braking, the switch 40b is simultaneously changed over so that the output voltage of the block circuit 28 can be inputted into the operational amplifier 40a. Thus, as the motor decelerates, the voltage of the terminal 40c decreases, then exciting current decreases. Such a braking can stop the motor.

With this arrangement, it is possible to obtain the stop characteristics similar to the braking and stopping characteristics in the case where exciting coils of the motor having a magnet rotor are short-circuited.

Next, an embodiment of FIG. 13 will be explained. The embodiment of FIG. 13 differs from the embodiment of FIG. 12 in the following points.

The transistors 20a, 20b and 20c are provided on positive terminal sides of respective exciting coils to control activation/deactivation thereof. That is, outputs of the AND circuits 24a, 24b and 24c control turning on-and-off of the transistors 20a, 20b and 20c through the transistors 22a, 22b and 22c.

A chopper circuit including the operational amplifier 40a has the same function and effect as that of FIG. 12. The functions and effects of SCRs 5a, 5b and 5c and small-capacitance capacitors 47a, 47b and 47c which make building-up and trailing-off of the exciting coils fast to realize high efficiency in a high-speed region, are similar those of the components put on the same reference numerals in FIG. 12.

The circuit differs from that of FIG. 12 in that normal electromagnetic braking is not available although the regenerative braking is not attainable. This will be explained below.

As the same explanation applies to others too, the explanation will be made only for the exciting coil 32a.

When the rotational mode of the motor is switched from the normal rotation mode to the reverse rotation mode, the exciting current builds up sharply upon turning-on of the transistor 20a in the same manner as FIG. 12. Thereafter, the exciting current is regulated in accordance with the positive voltage of the terminal 40c or 40 so as to be a predetermined value. Then, the transistor 20a turns off.

Accordingly, magnetic energy stored in the exciting coil 32a is discharged through the diode 21a → the transistor 17a → the DC electric power source → the diode 33a arranged in the given order. Thus, the motor is decelerated by the reverse rotation torque. The magnetic energy is recovered to the electric power source. Thus, regenerative braking becomes available.

The turning-on-and-off control of the transistors 17a, 17b, 17c, 18a, 18b and 18c is performed in the same manner as in FIG. 12.

The same purpose will be accomplished even if the capacitors 47a, 47b and 47c are replaced by capacitors 46a, 46b and 46c.

Next, an operation in the normal rotation mode will be explained.

When the transistor 20a turns off at the terminal end of the position detecting signal, magnetic energy stored in the exciting coil 32a is discharged to the small-capacitance capacitor 46a to charge it up to a high voltage.

Accordingly, the exciting current decreases steeply. In the normal rotation mode, the transistors 17a, 17b, 17c, 18a, 18b and 18c are maintained in turned-off condition.

When the transistor 20a turns on at the initiating end of the next arriving position detecting signal, the SCR 5a and the transistors 4a and 4b are turned on during predetermined periods of time. Thus, high voltage of the capacitor 46a is applied to the exciting coil 32a to make the building-up of exciting current sharp. As current supply control for other exciting coils 32b and 32c are carried out in the same manner, the purpose of the present invention can be accomplished.

When the motor rotating in the normal direction is switched to the reverse rotation mode, turning-on-and-off control of the transistors 17a, 17b and 17c is switched together with the position detecting signals in the same manner as in the previous embodiment. Hence, tile regenerative braking can be carried out.

Figure 5:
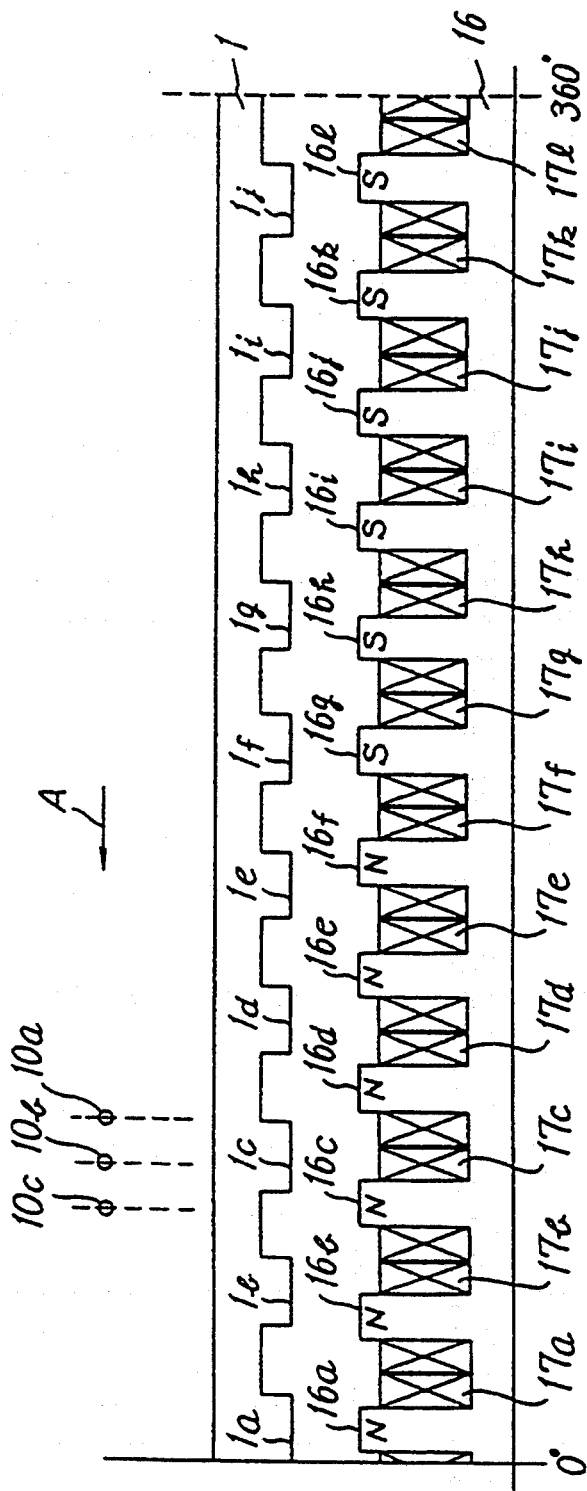
FIG. 5 is a development showing magnetic poles and salient poles of a three-phase full-wave reluctance type motor.

Next explained is an embodiment in which the present invention is applied to a three-phase full-wave type motor. FIG. 5 shows an example of constitution of such a motor. FIG. 5 is a development. In FIG. 5, ten salient poles 1a, 1b - - - disposed one another at regular intervals of a 180-degree width are formed on the magnetic rotor 1 which is fixed on the rotational shaft. A fixed armature 16 is equipped with 12 magnetic poles 16a, 16b, - - - having a 120-degree width to be wound with an associated exciting coil. The armature 16 is fixed on an inside surface of the outer casing. The rotational shaft is rotatably supported on bearings provided on the side plates of the outer casing. The magnetic poles 16a, 6b, - - - are mounted with exciting coils 17a, 17b, - - -, respectively.

Position detecting coils 10a, 10b and 10c are spaced one another by 120 degrees and fixed on the side of the armature 16 at the positions shown in the drawing to confront the side surfaces of the salient poles 1a, 1b - - - -. The electric circuit of FIG. 6 can generate position detecting signals from the coils 10a, 10b and 10c. Respective curves in the time chart of FIG. 16 show the generated position detecting signals.

Respective magnetic poles are magnetized by the exciting coils to have N- or S-polarity as shown in the drawing. The exciting coils 17a, 17g are connected in series or in parallel with each other to constitute an exciting coil 32a. The exciting coils 17b, 17h, the exciting coils 17c, 17i, the exciting coils 17d, 17j, the exciting coils 17e, 17k, and the exciting coils 17f, 17l are similarly connected and are referred to as exciting coils 32f, 32b, 32d, 32c and 32e, respectively.

The exciting coils 32a, 32b and 32c are activated by amounts corresponding to the position detecting signal curves 36a, 36b, - - -, 37a, 37b, - - - and 38a, 38b, - - -of FIG. 16, respectively; the exciting coils 32f, 32d and 32e are activated by amounts corresponding to the position detecting signals 45a, 45b, - - -, 43a, 43b, - - -and 44a, 44b, - - -, respectively; then, the rotor 1 rotates in a direction of an arrow A as a three-phase full-wave type motor.

The above-described current supply mode can also be expressed as follows: the exciting coils 32a, 32b and 32c are referred to as No.1-, No.2- and No.3-exciting coils, respectively; the exciting coils 32d, 32e and 32f are referred to as No.1-, No.2- and No.3-exciting coils, respectively; and both groups are activated by a half-wave current supply mode, respectively.

A first-phase exciting coil is constituted by the No.1- and No.1-exciting coils. Second-phase and third-phase exciting coils are constituted by the No.2- and No.2-exciting coils and the No.3- and No.3-exciting coils, respectively.

The position detecting signal curves 36a, 36b, - - -, 37a, 37b, - - -, and 38a, 38b, - - - are referred to as No.1-, No.2- and No.3-phase position detecting signals, respectively, and, the position detecting signal curves 43a, 43b, - - -, 44a, 44b, - - -, and 45a, 45b, - - - are referred to as No.1-, No.2- and No.3-phase position detecting signals, respectively.

Figure 14:
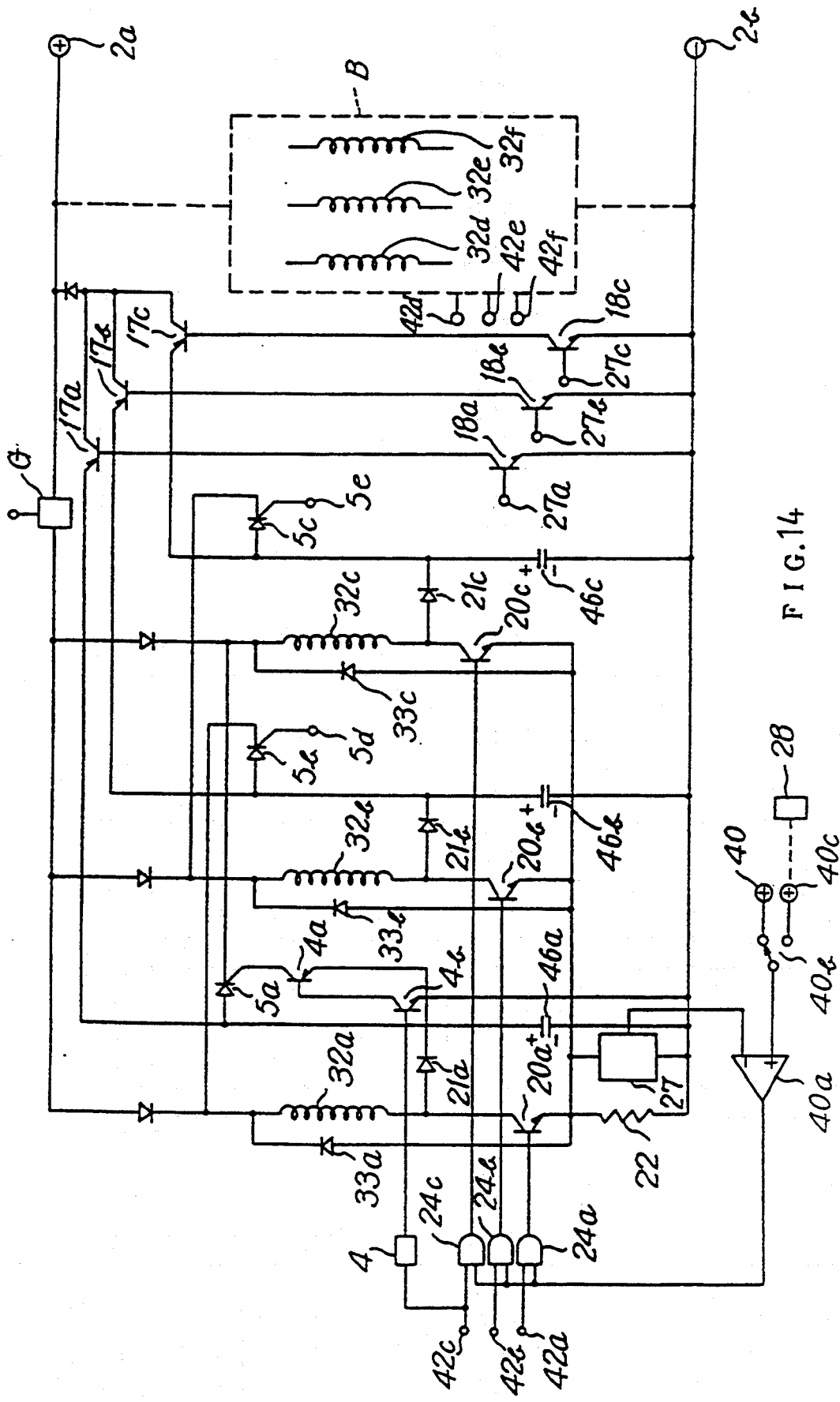
FIG. 14 is a circuit diagram showing a current supply control circuit for activating/deactivating exciting coils of three-phase full-wave current supply mode.

In FIG. 14, position detecting signals inputted from the terminals 42a, 42b and 42c are referred to as No.1-, No.2- and No.3-phase position detecting signals; position detecting signals inputted from the terminals 42d, 42e and 42f are referred to as No.1-, No.2- and No.3-phase position detecting signals. Furthermore, exciting coils 3 2a, 32d are referred to as No.1- and No.1-exciting coils of No.1phase. Exciting coils 32b, 32e and exciting coils 32c, 32f are referred to as No.2- and No.2-exciting coils of No.2phase and No.3- and No.3-exciting coils of No.3phase, respectively.

Next, an embodiment of three-phase half-wave current supply control circuit according to the present invention will be explained by referring to FIG. 14. Position detecting signals of curves 36a, 36b, - - -, 37a, 37b, - - -, and 38a, 38b, - - - of FIG. 16 are inputted from terminals 42a, 42b and 42c. Accordingly, a 120-degree width current is successively supplied to the armature coils 32a, 32b and 32c. An operational amplifier 40a, an absolute-value circuit 27, a resistance 22, and a reference voltage terminal 40 are like components as those put on the same reference numerals in the previous embodiment. These components constitute a chopper circuit for maintaining the armature current at a predetermined value. When the exciting coil 32a is deactivated in response to the input from the terminal 42a, magnetic energy stored is discharged through the diodes 21a, 33a to the small-capacitance capacitor 46a so as to charge it up to a high voltage with polarities shown in the drawing. In this instance, the transistor 20a is maintained in a turned-off condition. When the rotor rotates 240 degrees, the transistor 20c is turned on in response to an input from the terminal 42c to initiate current supply to the exciting coil 32c. As the transistors 4a, 4b and SCR 5a turn on simultaneously in this instance, the current builds up sharply due to high voltage of the capacitor 46a being applied. The smaller the capacitance of the capacitor 46a is, the steeper the building-up of the current is, but it will be necessary to determine the capacitance of the small-capacitance capacitor in view of withstanding voltages of other semiconductor elements, since the capacitor is charged to a high voltage.

Discharge of the capacitor 46a is made through the armature coil 32c, the transistor 20c, and the resistance 22.

When the transistor 20a is turned off, magnetic energy of the armature coil 32a is transferred through the diodes 21a, 33a and the resistance 22 into the capacitance 46a to charge it up to a high voltage.

When the transistor 20c is turned on in response to the position detecting signal inputted from the terminal 42c, a block circuit 4 (having the same function as the one put on the same reference number in the previous embodiment) is caused to generate an electric pulse corresponding to its initiating portion. This then causes the transistors 4b, 4a and the SCR 5 to be tamed on to apply high voltage of the capacitor 46a to the exciting coil 32c and to bring an effect of building up the exciting current sharply.

When the transistor 20b is turned on in response to the position detecting signal inputted from the terminal 42b, the block circuit 4 and the circuit having the same construction as the transistors 4a, 4b generate an electric pulse corresponding to its initiating portion from a terminal 5e to turn on the SCR 5c. Thus, high voltage of the capacitor 46c is applied to the exciting coil 32b to build up the exciting current sharply.

When the transistor 20a is turned on in response to the position detecting signal inputted from the terminal 42a, the SCR 5b turns on in response to the electric pulse inputted from the terminal 5d. High voltage of the capacitor 46b is applied to the exciting coil 32a to build up the exciting current sharply. When the transistors 20a, 20b and 20c are turned off at the terminal ends of the position detecting signals, magnetic energy stored in respective exciting coils is charged in the small-capacitance capacitors 46a, 46b and 46c, thereby causing exciting current to decrease steeply.

As explained in the foregoing description, the purpose of the present invention can be attained.

The circuit including the transistors 17a, 17b, 17c, 18a, 18b and 18c and the terminals 27a, 27b and 27c has the same function as the circuit of the previous embodiment comprising the like components put on the same reference numerals. Accordingly, when the motor is switched from the normal rotation mode to the reverse rotation mode, the regenerative braking can be performed under the operation of the chopper circuit.

A block circuit G has the same function as the transistors 41, 41a of FIG. 12. Regenerative braking is carried out by shutting off the block circuit G in tile reverse rotation mode. On the contrary, if the circuit is closed, braking is carried out by converting kinetic energy to thermal energy caused in the exciting coils.

The switching circuit 40b has the same function as the one disclosed in the previous embodiment.

A block circuit B is added in the case of a three-phase full-wave current supply mode.

The block circuit B is identical in configuration witch the previously described circuit for controlling current supply to the armature coils 32d, 32e, 32f. Position detecting signals of curves 43a, 43b, - - -, and electric signals corresponding to the two series of curves shown thereunder in FIG. 16 are inputted from the terminals 42d, 42e, 42f, respectively so that a 120-degree width exciting current is supplied to each armature coil. A chopper circuit is provided independently, too.

With the above arrangement, it becomes possible to obtain a three-phase full-wave reluctance type motor capable of attaining the purpose of the present invention.

Figure 13:
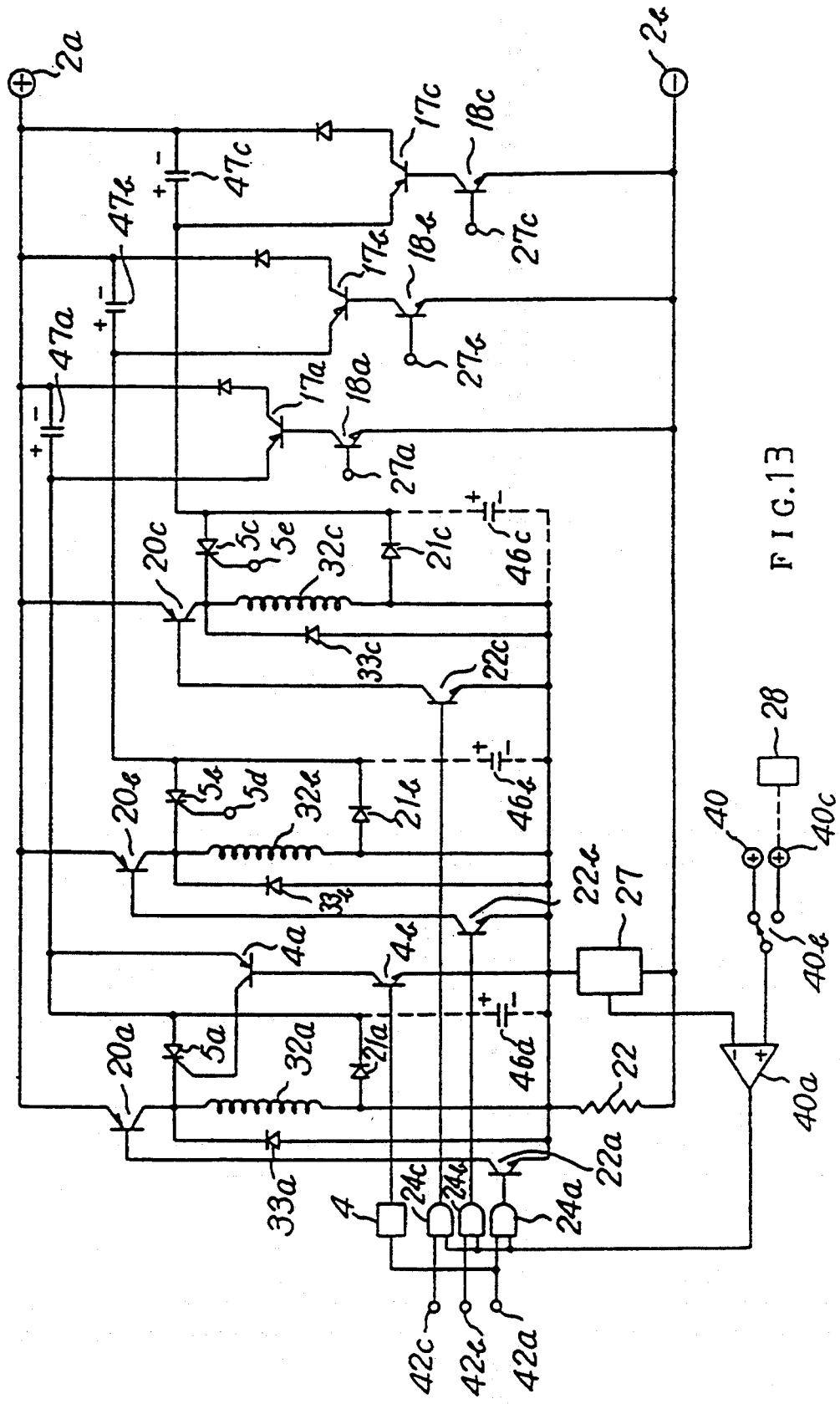
FIG. 13 is a circuit diagram showing another current supply control circuit for activating/deactivating exciting coils of three-phase half-wave current supply mode.

A three-phase full-wave type motor can be constituted by adding the block circuit B in each embodiment of FIGS. 12 and 13.

Curves 31a, 31b and 31c of FIG. 10 represent current supply curves of the exciting coils 32a, 32d in response to the position detecting signals 36a, 43a and 36b. Curves 31d and 31e represent current supply curves of the exciting coils 32b, 32e in response to the position detecting signals 37a, 44a. Curves 31g, 31h and 31f represent current supply curves of the exciting coils 32c, 32f in response to the position detecting signals 38a, 45a and 45b.

A means for converting the motor from the normal rotation mode to the reverse rotation mode will be explained below.

Figure 9:
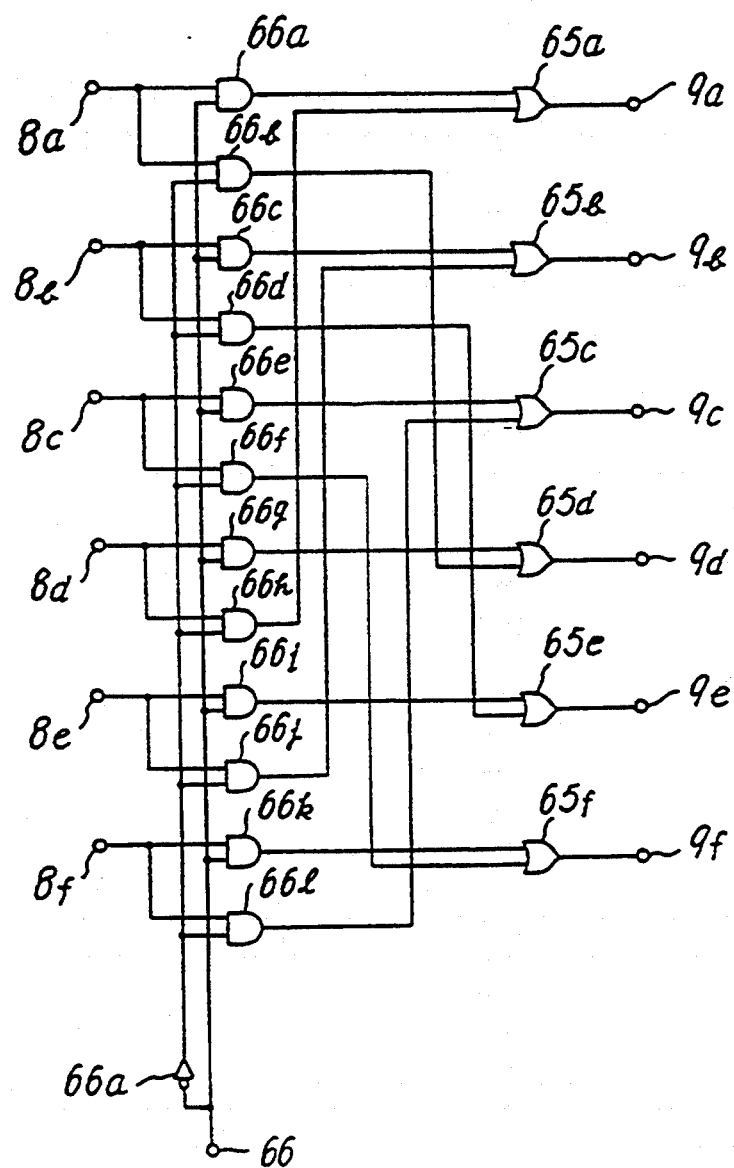
FIG. 9 is a circuit diagram showing a switching circuit for switching normal and reverse rotation modes of position detecting signals of a three-phase full-wave motor.

The motor's rotation can be reversed by inputting the position detecting signals of the terminals 42a, 42b, 42c to the terminals 42d, 42e, 42f, while inputting the position detecting signals of the terminals 42d, 42e, 42f to the terminals 42a, 42b, 42c. FIG. 9 shows such a switching means. In FIG. 9, terminals 8a, 8b, - - -, and 8f receive position detecting signal curves 36a, 36b, - - -, curves 37a, 37b, - - -, curves 38a, 38b, - - -, curves 43a, 43b, - - -, curves 44a, 44b, - - -, and curves 45a, 45b, - - - of FIG. 16, respectively.

When an input of the terminal 66 is HIGH-level, downside inputs of the AND circuits 66a, 66c, 66e, 66g, 66i, 66k become HIGH-level. These signals, having passed through OR circuits 65a, 65b, - - -, and 65f, are obtained from the terminals 9a, 9b, - - -, 9f as position detecting signals for rotating the motor in the normal direction. Output signals of the terminals 9a, 9b,--, 9f are inputted into the terminals 42a, 42b, - - -, 42f of FIG. 14, respectively. When an input of the terminal 66 is turned to a LOW level, this signal is inverted into a HIGH level through an inversion circuit 66a. This HIGH-level electric signal is supplied to the downside terminals of the AND circuits 66b, 66d, - - -, 66l. Accordingly, the position detecting signals for the reverse rotation can be obtained from the terminals 9a, 9b, - - -, and 9f through the OR circuits 65a, 65b,--, and 65f. Thus, normal-/reverse rotation of the motor can be made available by the input signal from the terminal 66.

At a point corresponding to 30 degrees after the salient poles begin confronting magnetic poles, current supply to each exciting coil is started. Positions of the coils 10a, 10b and 10c, as position detecting elements fixed on the armature side, are adjusted so that the exciting coil is deactivated after 120-degree rotation. Thus, the exciting coil is activated at the point 30 degrees after the salient poles begin to confront the magnetic poles, and is deactivated after 120-degree rotation, thereby providing an effect that output torque in the normal rotation mode is identical with that in the reverse rotation mode.

Only the reference voltage (i.e. voltage of the terminal 40 of FIGS. 12, 13 and 14) can regulate the output torque, so that the applied voltage has nothing to do with the output torque. Thus, ripple voltage between the electric power source terminals 2a and 2b does not affect little. So, in the case of AC electric power source, a capacitor for rectification is not required to be a large-capacitance capacitor. In the case where the AC electric power source is of three-phase, the capacitance of the capacitor can be further reduced, thereby contributing to the simplification of the electric power source.

Figure 2:
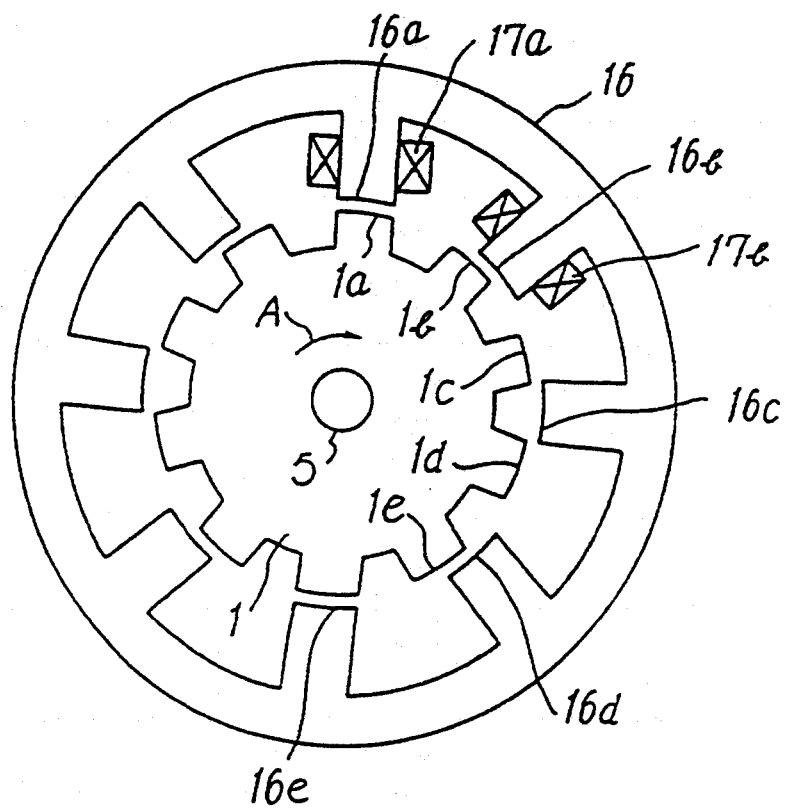
FIG. 2 is a plane view showing a two-phase full-wave reluctance type motor in accordance with the present invention.
Figure 4:
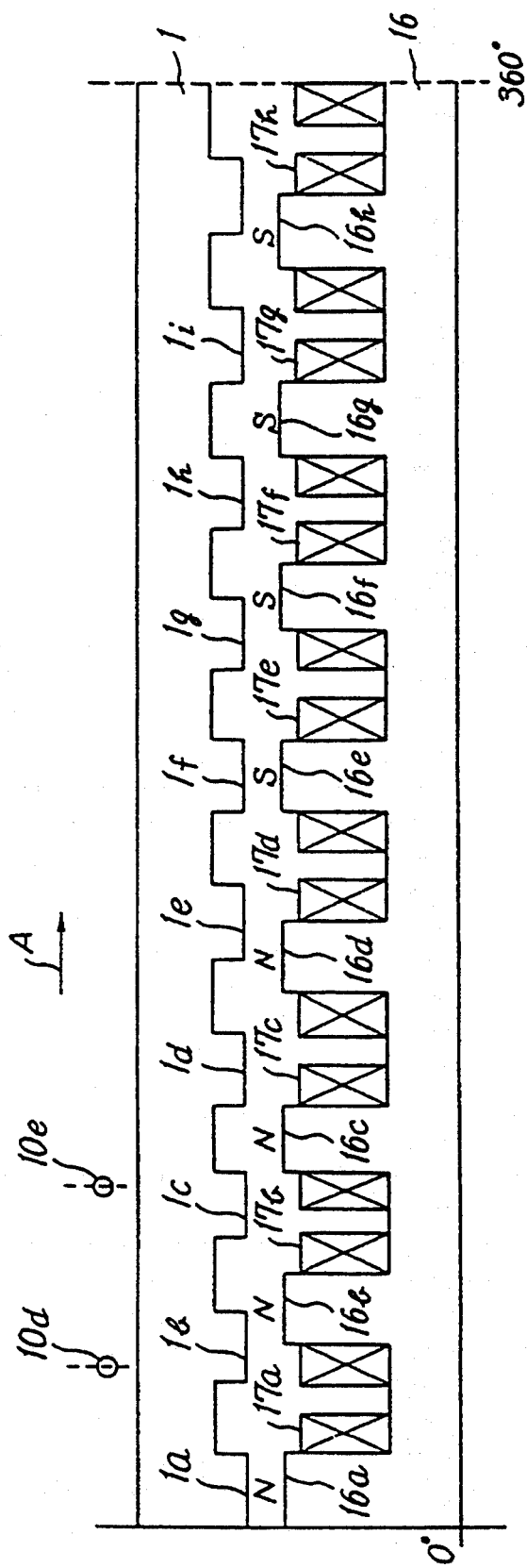
FIG. 4 is a development showing magnetic poles and salient poles of the motor shown in FIG. 2.

A next explained embodiment of the present invention will be of a two-phase type motor. FIG. 2 is a plane view showing constitution of this embodiment, and FIG. 4 is its development. In FIGS. 2 and 4, a circular ring portion 16 and magnetic poles 16a, 16b, - - - are made of conventional laminated silicon steel sheets and fixed on an outer casing (not shown) to form an armature. The portion 16 is a magnetic core to serve as a magnetic path. Magnetic poles 16a, 16b, - - - are wounded with exciting coils 17a, 17b, - - -. The rotor 1 has an outer peripheral portion provided salient poles 1a, 1b, - - -. These salient poles 1a, 1b, - - - confront the magnetic poles 16a, 16b, - - - over air gap of approximately 0.1–0.2 mm wide.

The rotor 1 is made by the same means as the armature 16. The rotor 1 includes 10 salient poles uniformly spaced with one another. The magnetic poles 6a, 16b, - - - have the same width as the salient poles. Eight magnetic poles are uniformly disposed. When the exciting coils 17b, 17f, 17c and 17g are activated, the salient poles 1b, 1g, 1c and 1h are magnetically attracted to rotate the rotor 1 in a direction of an arrow A.

When the rotor 1 rotates 90 degrees, the exciting coils 17b, 17f are deactivated, while, the exciting coils 17d, 17h are activated to magnetically attract the salient poles 1d, 1i, thereby causing the torque to be generated. The magnetic poles 16b, 16c are magnetized to respectively have N-polarity. The magnetic poles 16f, 16g are magnetized to respectively have S-polarity. Thus, the counter torque due to leaking magnetic flux is prevented from occurring. In a subsequent 90-degree rotation, the magnetic poles 16c, 16d, and the magnetic poles 16g, 16h are magnetized to have N-pole and S-pole, respectively, as shown in the drawing. Further, every time the rotor 1 rotates 90 degrees, respective magnetic poles are successively magnetized to have the polarities shown in the drawing.

By the above-described magnetization, the rotor 1 rotates in a direction of the arrow A to operate as a two-phase full-wave type motor. A clearance between two adjacent magnetic poles is 1.5 times as large as the width of a salient pole. Furthermore, a large space can be provided for installing the exciting coil, so that a wire of relatively large diameter can be used. This brings an effect of reducing copper loss and resulting increase in efficiency. As the reluctance type motor has no filed magnet, it is necessary to cause the magnetic poles to generate magnetic flux sufficiently large enough to compensate the absence of the field magnet. Hence, providing a large space between the magnetic poles has an important meaning.

FIG. 4 shows 10 salient poles, which is larger in number compared with conventional motor of the same type. Accordingly, counter torque is generated due to discharge of the magnetic energy stored in respective magnetic poles, thereby increasing output torque. This, however, causes the speed of the motor to be reduced so largely that the motor cannot practically be used regardless of its large output torque. The present invention, however, resolves the above problem and rather increases the output torque. In addition, the regenerative braking can be realized. The details of the above effect will be described later.

A current supply angle of the exciting coil can be set within a range of 90 to 120 degrees. The 90-degree current supply mode operation will be explained next with reference to FIG. 15.

Figure 15:
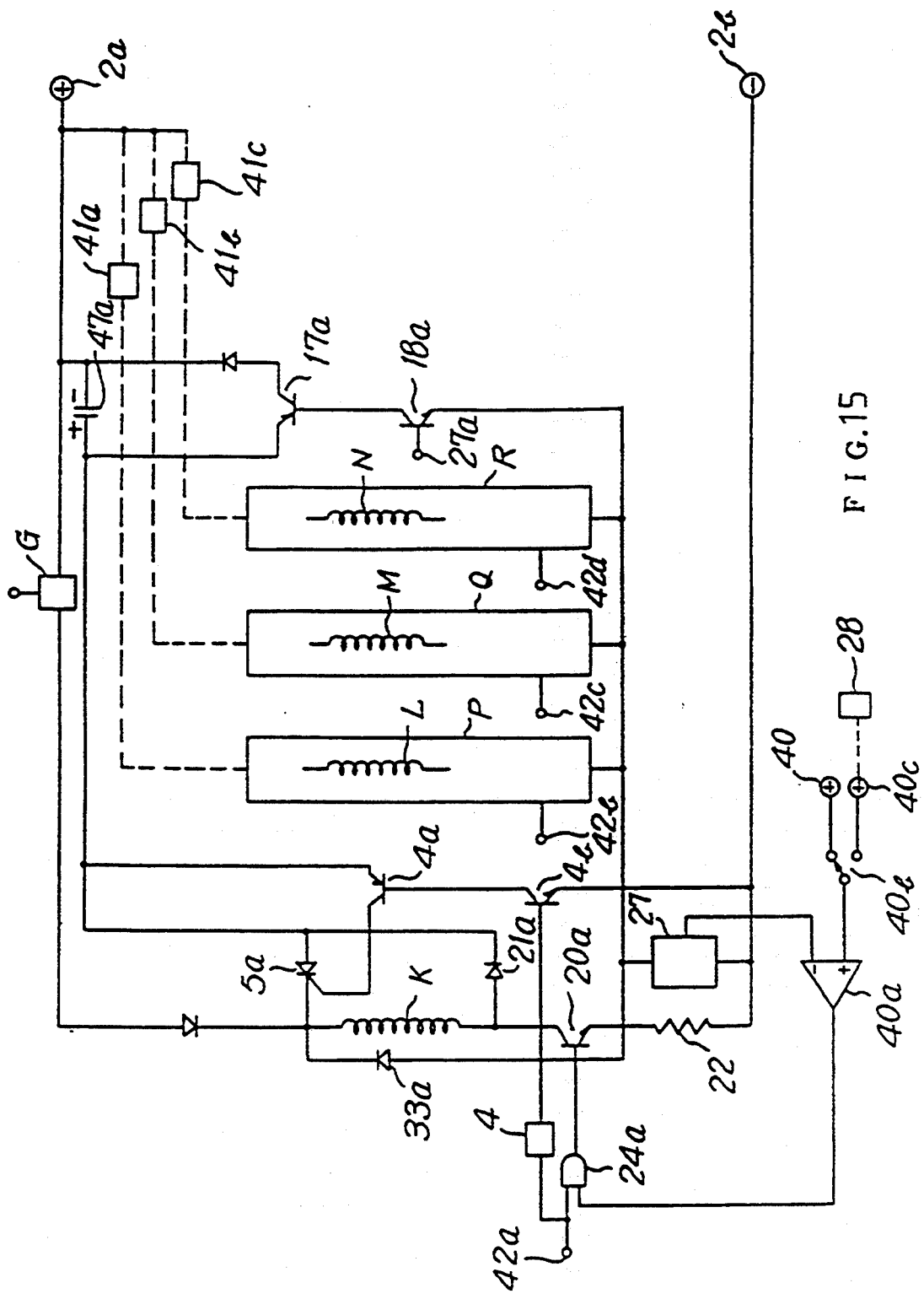
FIG. 15 is a circuit diagram showing a current supply control circuit for activating/deactivating exciting coils of two-phase full-wave current supply mode.

In FIG. 15, the exciting coils K, M denote the exciting coils 17a, 17e and 17c, 17g of FIG. 4, respectively. Two exciting coils are connected in series or in parallel. Downside ends of the exciting coil K is connected to the transistor 20a. The transistor 20a functions as a semiconductor switching element and can be replaced by any other semiconductor element having the same effect. Electric power is supplied from the positive and negative terminals 2a, 2b of the DC electric power source. Block circuits P, Q and R are provided for activating or deactivating the exciting coils L, M and N, respectively, and are identical in their configuration with that of the exciting coil K.

If the HIGH-level position detecting signal is inputted from the input terminal 42a, the transistor 20a is turned on to activate the exciting coil K. When the HIGH-level position detecting signal is inputted from the input terminal 42c, the transistor is turned on to activate the exciting coil M. The coils 10d and 10e, having the same configuration with the previously-explained coils 10a, 10b and 10c, are disposed to confront the side surfaces of the salient poles 1a, 1b, - - -so as to obtain position detecting signals. A means for obtaining position detecting signals inputted through the terminals 42a, 42b, - - - will be explained below.

Figure 7:
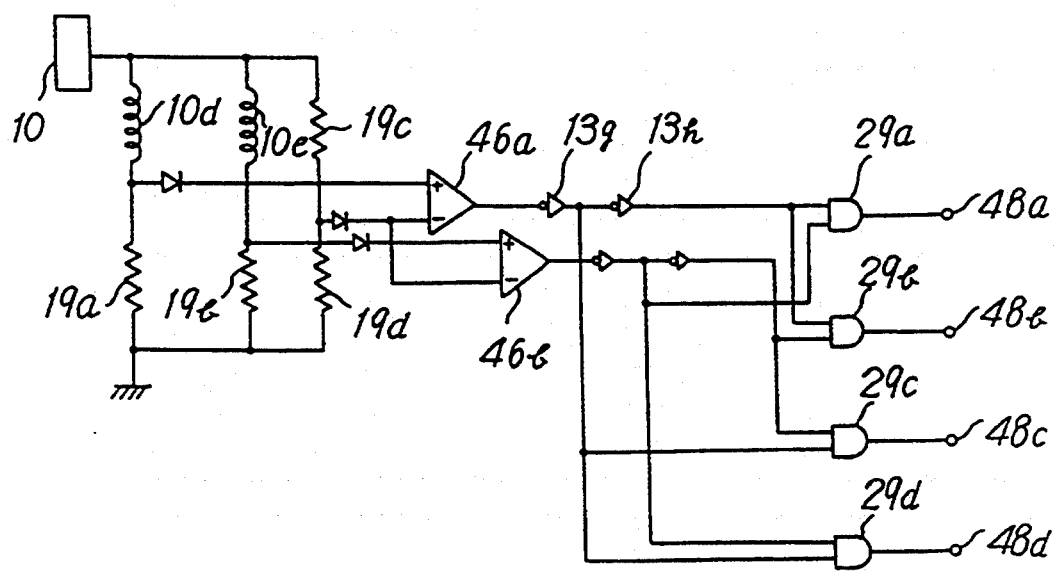
FIG. 7 is a circuit diagram showing a two-phase position detecting device.

In FIG. 7, the coils 10d, 10e are secured to the fixed armature 16 at the position of FIG. 4. A reference numeral 10 denotes an oscillator having a frequency of approximately 1 MHz.

Coils 10d, 10e and resistances 19a, 19b, 19c and 19d constitute a bridge circuit. When the coils 10d, 10e directly confront the salient poles 1a, 1b, - - - , the bridge circuit is balanced. Thus, two inputs of each of the operational amplifiers 46a and 46b become identical with each other. Above-described input is rectified by the diode to become a DC signal. The rectification will be perfectly performed if smoothing capacitors 12a, 12b are added; however, these smoothing capacitors 12a, 12b are not always necessary. Removing capacitors is advantageous in converting the circuit into an integrated circuit. An output of the operational amplifier 46a by the coil 10d is twice inverted through the inversion circuits 13g, 13h and inputted to the AND circuits 29a, 29b. This input signal becomes a rectangular waveform, as shown by curves 50a, 50b, - - - in a time chart of FIG. 17. An output of the operational amplifier 46b, i.e. position detecting signal curves 52a, 52b, - - - by the coil 10e, is inputted to the AND circuits 29b, 29c through inversion circuits. This input signal is shown by curves 52a, 52b, - - - of FIG. 17. Coils 10d and 10e are spaced by (360+90) degrees. Accordingly, there is 90-degree phase difference between curves 50a, 50b, - - - and curves 52a, 52b, - - - .

An output between the inversion circuits 13g and 13h (i.e. downside input to the AND circuits 29c, 29d) is shown by curves 51a, 51b, - - - .

A downside input to the AND circuit 29a and an upside input to the AND circuit 29d are shown by curves 53a, 53b, - - - . An output of the output terminal 48a of the AND circuit 29a is identical with an overlapped portion of the curves 50a, 50b, - - - and the curves 53a, 53b, - - -, and so corresponds to the curves 54a, 54b, - - - of FIG. 17, which have 90-degree width and are spaced one another at intervals of 360 degrees.

Figure 17:
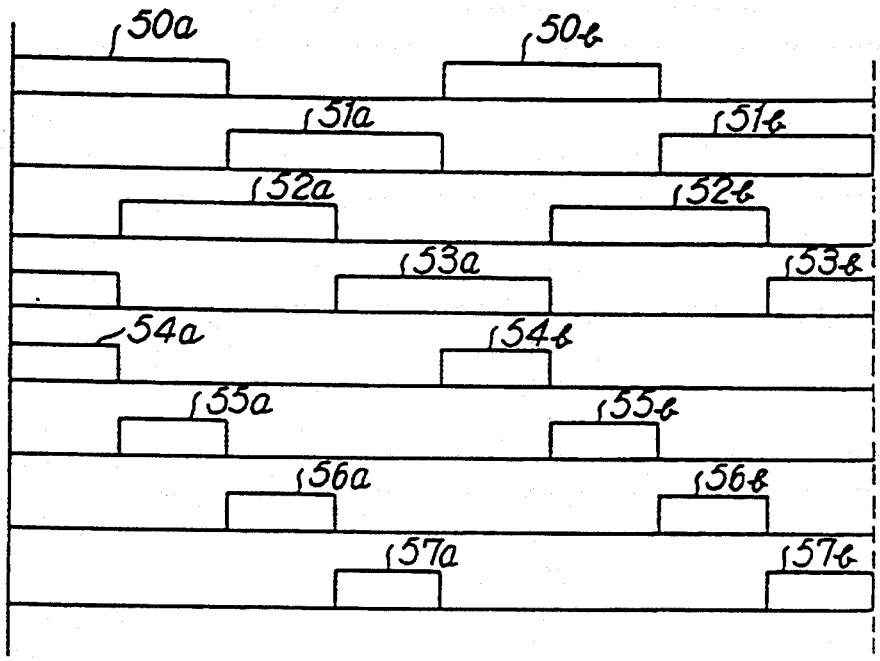
FIG. 17 is a time chart showing position detecting signals of the two-phase reluctance type motor.

From the same reason, output signals of the output terminals 48b, 48c and 48d of the AND circuits 29b, 29c and 29d are represented by curves 55a, 55b, - - - , curves 56a, 56b, - - - , curves 57a, 57b, - - - of FIG. 17.

The reason for using two inversion circuits 13g, 13h as indicated in FIG. 7 will be described later.

The above-described position detecting signals are used for the circuit of FIG. 15. The details will be explained below.

The connection of the exciting coils 17b and 17f connected in series or in parallel is referred to as an exciting coil L, while the connection of the exciting coils 17d and 17h connected similarly is referred to as an exciting coil N. In FIG. 15, the exciting coils L and N respectively have lower ends being connected to transistors for controlling activation/deactivation thereof.

The terminals 42a, 42b, 42c and 42d are supplied with the outputs from the terminals 48a, 48b, 48c and 48d of FIG. 7, respectively.

The exciting coil K is activated within the period of the width of the position detecting signal inputted from the terminal 42a. Building-up and trailing-off of the exciting current become steep due to function of the diode 21a and the capacitor 47a in the same manner as in the previous embodiment. An AND circuit 24a, resistance 22, an absolute-value circuit 27, an operational amplifier 40a, and reference voltage terminals 40, 40c have the same functions as those of corresponding parts put on the same reference numerals in the previous embodiment. Current supplied to the exciting coil K is maintained at a value proportional to the voltage of the terminal 40 or 40c by the function of the chopper circuit.

Curves 30a and 30b of FIG. 10 respectively represent exciting currents supplied to the exciting coils K and in response to the position detecting signal curves 54a and 56a. Portions indicated with dotted line are chopper-controlled sections. The resistance 22, the absolute-value circuit 27, and the operational amplifier 40a control the current supplied to the exciting coils L and N in response to the position detecting signals inputted from the terminals 42b and 42d. With this control, building-up and trailing-off of the exciting current become sharp, and the current value is regulated by the voltage of the terminal 40 or 40c of the chopper circuit.

Curves 30c and 30d of FIG. 10 respectively represent exciting currents supplied to the exciting coils L and N in response to the position detecting signal curves 55a and 57a. Portions indicated by dotted line are chopper-controlled sections.

No.1- and No.1-position detecting signals of No.1-phase, inputted from the terminals 42a and 42c of FIG. 15, are shown by curves 54a, 54b, - - - and curves 56a, 56b, - - - . No.2- and No.2-position detecting signals of No.2phase, inputted from the terminals 42b and 42d, are shown by curves 55a, 55b, - - - and curves 57a, 57b, - - - . The No.1- and No.1-position detecting signals are inputted from the terminals 42a and 42c for the turning on-and-off control of respective transistors. Thus, No.1-phase exciting coils K and M are activated by 90-degree width in response to respective position detecting signals.

The No.2- and No.2-position detecting signals are inputted from the terminals 42b and 42d for the turning on-and-off control of respective transistors. Thus, No.2-phase exciting coils L and N are activated by widths of respective position detecting signals.

An angle position of starting of the current supply operation can be set to either 0 degree or 45 degrees after the salient poles begin confronting the magnetic poles, depending on situation. With the above constitution, the motor can be driven as a two-phase full-wave motor. Referring to the case shown in FIG. 4, the same effect can also be obtained by providing 8n magnetic poles having 120-degree width, wherein n is a positive integer. In this case, the number of the salient poles will be increased correspondingly. Increasing the number of magnetic poles causes the output torque to increase but causes the rotational speed to decrease.

If there is any gap between boundaries of curves 54a, 54b, - - -, no exciting current will flow at the start, and, therefore, the start becomes unstable. A means for eliminating such a gap is the inversion circuits 13g and 13h, which is previously described with reference to FIG. 7.

As the diameters of the coils 10d and 10e are finite in size, output signals of the operational amplifiers 46a and 46b have inclination in both the building-up and trailing-off portions. For this reason, if the inversion circuits 13g and 13h are not provided, the gap may be generated among the boundaries of curves 54a, 55a, - - - in the logical processing of the output of rectangular position detecting signals.

The above problem can solved by providing the inversion circuits 13g and 13h.

Next explained will be regenerative braking in which the motor is switched from the normal rotation mode to the reverse rotation mode for deceleration.

Figure 8:
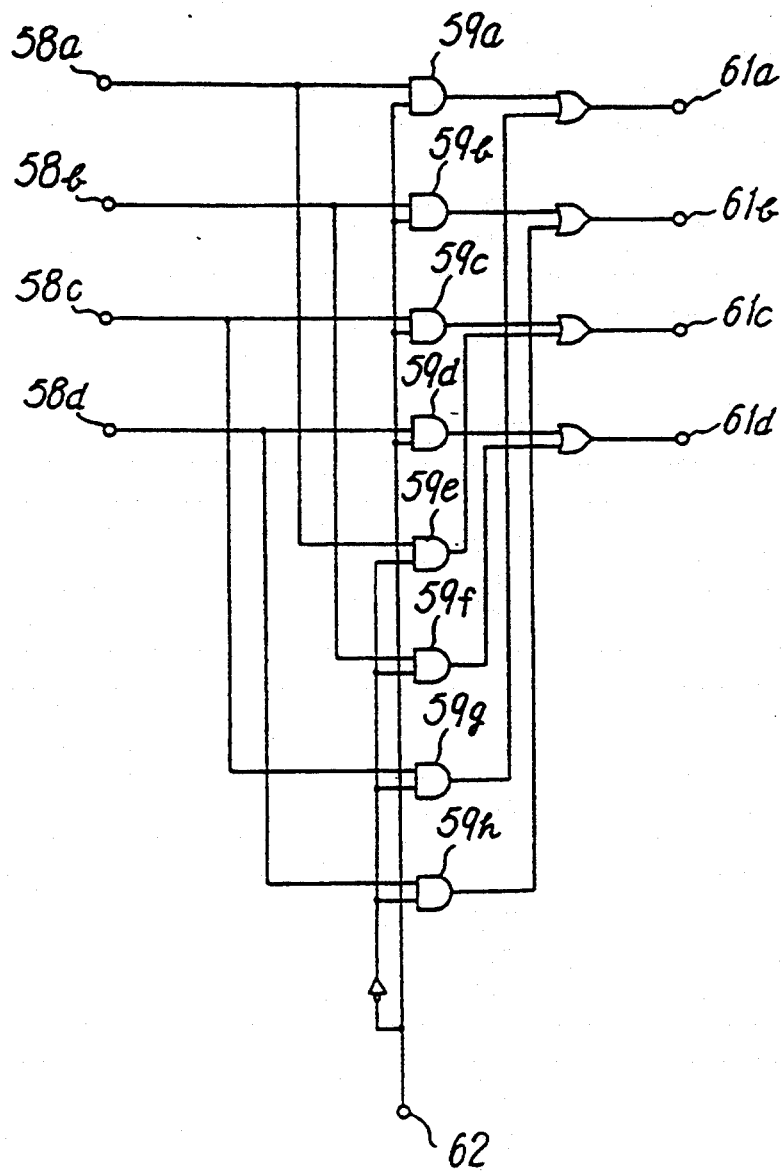
FIG. 8 is a circuit diagram showing a switching circuit for switching normal and reverse rotation modes of position detecting signals of a two-phase full-wave motor.

In order to perform the reverse rotation, input signals of the terminals 41a, 41b, 41c and 41d are inputted to the terminals 41c, 41d, 41a and 41b, respectively. A circuit used for this switching operation is shown in FIG. 8.

The control of the exciting current in the reverse rotation mode is carried out in the same manner as in the normal rotation mode. However, large impact noise may occur and cause the burning of the exciting coil if the motor is switched to the reverse rotation mode during the normal rotation of the motor. Because, the direction of the counter electromotive force of the exciting coil become identical with the direction of the exciting current in the reverse rotation mode, thereby causing large exciting current to flow in the reverse rotation mode.

With the apparatus in accordance with the present invention, however, the exciting current at a predetermined value due to its chopper function can be maintained even in the reverse rotation mode. Thus, tile above disadvantage can be eliminated. Hence, the motor can be decelerated even when switched to the reverse rotation mode during the normal rotation of the motor, and the deceleration torque can be varied by controlling the voltage of the reference voltage terminal 40c.

Consequently, the motor can be utilized as a servo-motor or a driving source of an electric motor car. In the case of a conventional reluctance type motor, current supply is generally initiated before the salient poles begin confronting the magnetic poles, in order to prevent counter torque from generating. If the rotational direction of such a motor is reversed, an output torque is largely decreased and torque ripple is largely increased, which would prevent a practical use of the motor.

According to the present embodiment, the current supply to the exciting coils starts at a point where the salient poles enter 45 degrees into the region of the magnetic poles even in the reverse rotation mode. Thus, the output torque remains almost unchanged regardless of the rotational direction of the motor. Accordingly, the above-described disadvantage can be removed. The reluctance type motor has no field magnet, and thus it lacks in means for applying electromagnetic braking to the rotor 1 when the electric power source is turned off. A means for removing such a disadvantage will be explained next.

Inputs to the terminals 58a, 58b, 58c and 58d are shown as curves 54a, 54b, - - - and succeeding curves below them in FIG. 17.

Outputs of the terminals 61a, 61b, 61c and 61d are inputted to the terminals 42a, 42b, 42c and 42d of FIG. 15, respectively. When the input of the terminal 62 is HIGH-level, the AND circuits 59a, 59b, - - -, 59d generate outputs. Outputs of the terminals 58a, 58b, - - -, 58d become inputs of the terminals 42a, 42b, - - -, 42d of FIG. 15. Thus, the motor rotates in the normal direction. When the input of the terminal 62 is turned to LOW-level, the AND circuits 59e, 59f, 59g, 59h generate outputs. Outputs of the terminals 61a, 61b, 61c, 61d are represented by the curves 56a, 56b, - - -, the curves 57a, 57b, - - -, the curves 54a, 54b, - - -, and the curves 55a, 55b, - - -, respectively. Thus, the motor rotates in the reverse direction.

In FIG. 8, inputs to the terminals 58a, 58b, 58c and 58d are shown as the electric signals represented by curves 54a, 54b, - - - and succeeding curves below them in FIG. 17.

Outputs of the terminals 61a, 61b, 61c and 61d are inputted to the terminals 42a, 42b, 42c and 42d of FIG. 15, respectively. When the input of the terminal 62 is HIGH-level, the AND circuits 59a, 59b, - - -, 59d generate outputs. Outputs of the terminals 58a, 58b, - - -, 58d become inputs to the terminals 42a, 42b, - - -, 42d of FIG. 15. Thus, the motor rotates in the normal direction. When the input of the terminal 62 is turned to LOW-level, the AND circuits 59e, 59f, 59g, 59h generate outputs. Outputs of the terminals 61a, 61b, 61c, 61d corresponds to the curves 56a, 56b, - - -, the curves 57a, 57b, - - -, the curves 54a, 54b, - - -, and the curves 55a, 55b, - - -, respectively. Thus, the motor rotates in the reverse direction.

While the motor is driven in the normal direction, current to the exciting coils is regulated by the chopper circuit as shown by curves 38a, 38b, - - - of FIG. 11. According to the present embodiment, the current supply section is of 90 degrees.

When the circuit of FIG. 8 has selected the reverse rotation mode, current to the exciting coils is supplied as shown by the curves 35a, 35b, - - - of FIG. 11. Then, the motor is decelerated by the reverse rotation torque, and this is followed by regenerative braking to work in the sections of curves 35b, 35c, - - - -. As the exciting current can be varied by the voltage of the terminal 40c, it is possible to vary the reverse rotation torque. It is, therefore, possible to perform the control of deceleration and a braking for stop. In the regenerative braking, functions of the transistors 17a and 18a of FIG. 15 are identical with those of the previous embodiment. Block circuits 41a, 41b and 41c are provided for performing the regeneration of the magnetic energy of the exciting coils L, M and N, respectively. These circuits are similar to that of the exciting coil K.

The block circuit G has the same function and effect as the like circuit put on the same reference numeral in the previous embodiment. By opening or closing the block circuit G, two modes can be made available; one being regenerative braking mode and the other being a mode converting kinetic energy to the thermal energy of the exciting coil.

In each embodiment, an output torque can be increased by providing teeth to the magnetic poles and the salient poles. The apparatus according to the present invention is structurally designed to be capable of rotating at high speeds, so that this apparatus is able to provide a useful means because it can enjoy the merit of the increase of output torque exclusively.

In the embodiment of FIG. 1, it will be possible to increase the number of the magnetic poles to 6n (n: positive integer). In this case, the salient poles will be correspondingly increased. In this embodiment, the output torque can be increased without accompanying the decrease in the rotational speed. This technology will be effective especially for the motor having a large diameter.

Even if the transistors for activating or deactivating respective exciting coils are provided at upper sides thereof, the means similar to the embodiment of FIG. 13 can be made available.

The exciting coils K and M in FIG. 15 are activated alternately with the range of 90 degrees width. The exciting coils L and N are also activated alternately with the range of 90 degrees width. When such a function is utilized, the present invention can be embodied by using the following means.

The exciting coils K and M will be explained. When the exciting coils k and M are deactivated, magnetic energy is transferred into the capacitor 47a through the diode to sharply build up the exciting current. When the activation of the exciting coil M is initiated, high voltage of the capacitor 47a makes the exciting current build up sharply. Furthermore, when the activation of the exciting coil K is initiated, high voltage of the capacitor 47a makes the exciting current build up sharply. With above arrangement, there are provided two capacitors corresponding to the capacitor 47a. Two transistors (represented by reference numerals 17a and 18a) are provided in parallel to the above capacitors to perform the regenerative braking. Thus, the circuit can be simplified.

The same purpose will be accomplished even when emitters of the transistors 17a, 17b and 17c in FIG. 12 are connected to the negative terminal side of the exciting coils 32a, 32b, and 32c, as shown by dotted lines 17-1, 17-2 and 17-3. In this case, input signals to the base terminals 27a, 27b and 27c can be equalized in width with their corresponding position detecting signals, That is, there is not need of equalizing the width of the input signal with the width of an arrow 38-2 of FIG. 11.

The above-described explanation equally applies to other embodiments, too.

Next, a three-phase half-wave reluctance type motor embodying the present invention will be explained. FIGS. 1 and 3 have already been explained in the foregoing description, and so that same explanation will be omitted. However, the exciting coils 32a, 39b and 39c are replaced by exciting coils 39a, 39b and 39c in the following embodiment. Also, the time chart of FIG. 16 is replaced by a time chart of FIG. 27.

In the plane view of FIG. 1 and the development of FIG. 3, a circular ring 16 and magnetic poles 16a, 16b, - - -are fixed on an outer casing to form an armature. The portion 16 is a magnetic core to serve as a magnetic path. Portions denoted by reference numeral 16 and reference numerals 16a, 16b, - - - are referred to as an armature or a fixed armature. Magnetic attraction forces deriving from the excited magnetic pole and the salient pole, which are symmetrically disposed about an axis, are balanced in a radial direction, so that vibration is suppressed.

Next, current supply control to the exciting coils will be explained with reference to FIG. 23. Both ends of the exciting coils 39a, 39b and 39c are connected with transistors 20a, 20b; 20c, 20d; and 20e, 20f. The transistors 20a, 20b, 20c, - - - serve as switching elements and can be replaced by other semiconductor elements having the same effect. A DC electric power source supplies electric power from its positive and negative terminals 2a and 2b.

When a HIGH-level signal is inputted from the terminals 42a while a downside input of the AND circuit 41a is HIGH-level, the transistors 20a and 20b are turned on to activate the exciting coil 39a. In the same way, when HIGH-level signals are inputted from the terminals 42b, 42c, the transistors 20c, 20d and the transistor 20e, 20f are turned on to activate the exciting coils 39b, 39c, respectively.

A terminal 40 is supplies with a reference voltage specifying an exciting current. An output torque can be changed by changing a voltage of the terminal 40. When an electric power switch (not shown) is turned on, an output of an operational amplifier 40b becomes a HIGH level, since an input of a negative terminal of the operational amplifier 40b is lower than that of its positive terminal. Accordingly, the transistors 20a, 20b turn on to activate the exciting coil 39a. A resistance 22a is provided for detecting exciting current flowing through the exciting coil 39a. A reference number 26a represents an absolute-value circuit.

Figure 27:
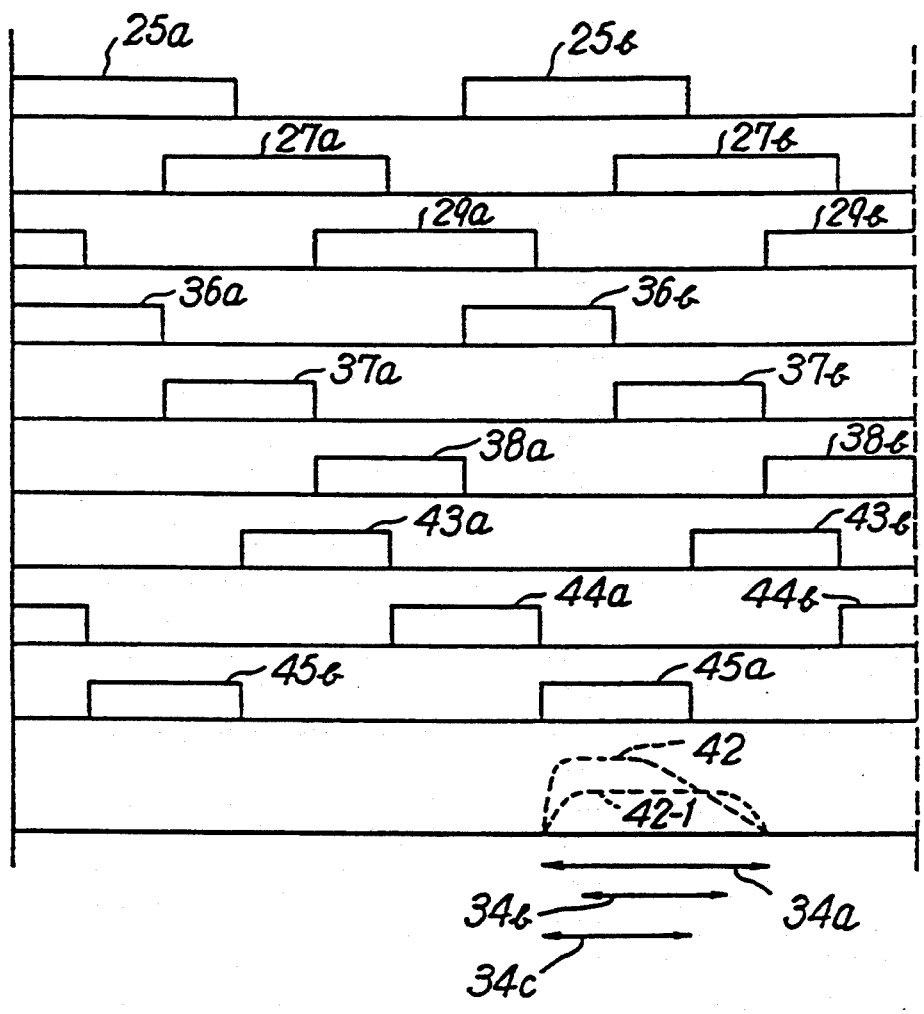
FIG. 27 is a time chart showing position detecting signals of the three-phase DC motor.

Position detecting signals 36a37b, - - - of FIG. 27 shows the input signal from the terminal 42a. Position detecting signals 37a, 37b, - - - and 38a, 38b, - - - show the input signals from the terminals 42b and 42c.

Figure 21:
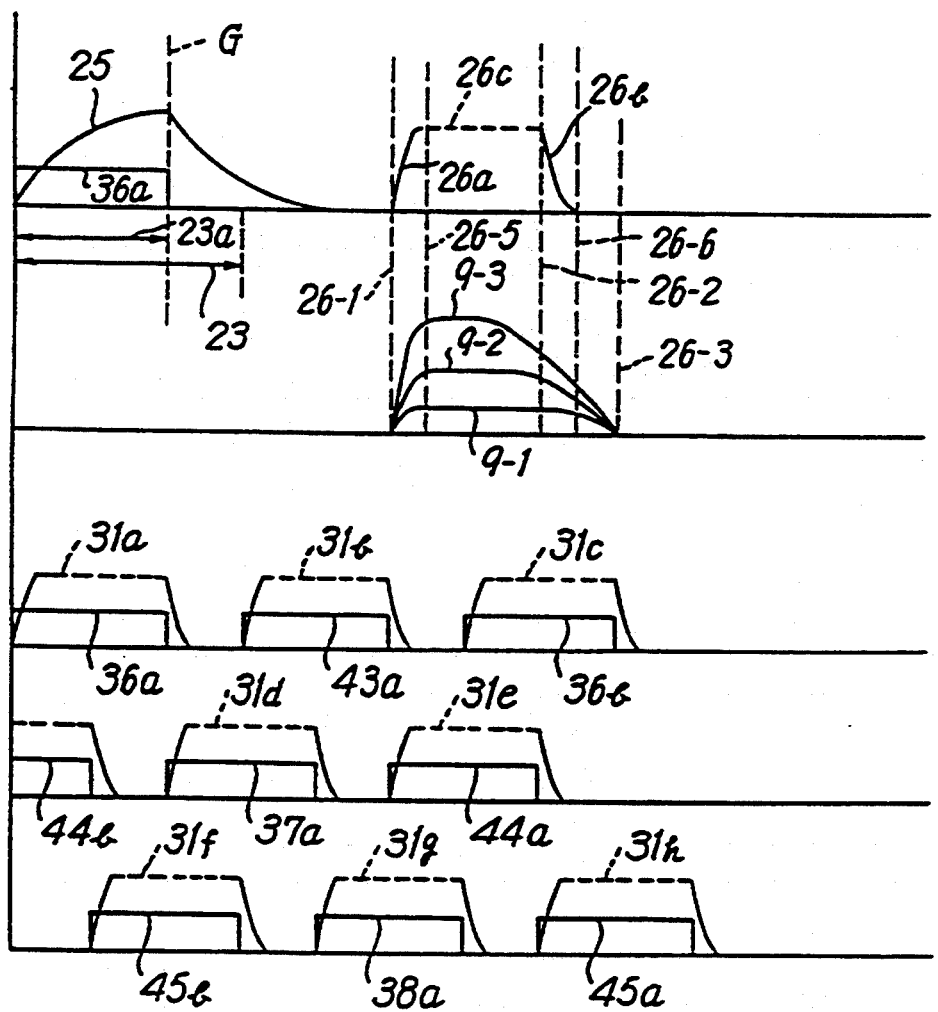
FIG. 21 is a time chart showing position detecting signals, exciting current, and output torque curves.

One of above-described position detecting signals curves is shown as a curve 36a is the first stage of a time chart of FIG. 21. The exciting coil 39a is supplied with an exciting current during a time period corresponding to this curve 36a. An arrow 23a shows a current supply angle of 120 degrees. In an initial stage of the current supply period, building-up of the exciting current is delayed due to inductance of the exciting coil. When the current is stopped, magnetic energy stored in the exciting coil is discharged to the electric power source through diodes 21a and 21b if the diode 49a of FIG. 23 is omitted. Therefore, the current decreases as shown by a second half portion of the curve 25 or a right side of the dotted line G. A section generating positive torque is a 180-degree section shown by an arrow 23; therefore, counter torque is generated to decrease both output torque and efficiency. This phenomenon becomes so conspicuous as the speed increases that the motor cannot be used for practical purposes in a high-speed region.

This is because the duration of a positive torque generating section 23 decreases in proportion to an increase of the rotational speed, while the duration of a counter torque generating section will not vary even if the motor speed becomes a high speed.

The same explanation applies to the current supply operation of the exciting coils 39b, 39c based on other position detecting signals 37a, 38a.

Since a building-up of the curve 25 is also delayed, an output torque decreases. That is, torque reduction is generated. This is because the magnetic path is closed by magnetic poles and the salient poles to generate a large inductance.

The reluctance type motor has a disadvantage of not being capable of increasing its rotational speed notwithstanding its advantage of being capable of producing a large output torque, such a disadvantage deriving from the above-described counter torque and torque reduction. According to the conventional means designed for removing such disadvantages, the current supply is started before the salient poles confront the magnetic poles.

Advancing the phase of the current supply point makes exciting current build up quickly because of small inductance of the magnetic poles; however, inductance rapidly increases when an output torque begins to be generated, i.e. when the salient poles begin confronting the magnetic poles. Hence, the exciting current declines steeply. Accordingly, an output torque decreases. In the case where a motor is to be driven in both forward and reverse directions, the number of position detecting elements disadvantageously needs to be doubled.

Figure 23:
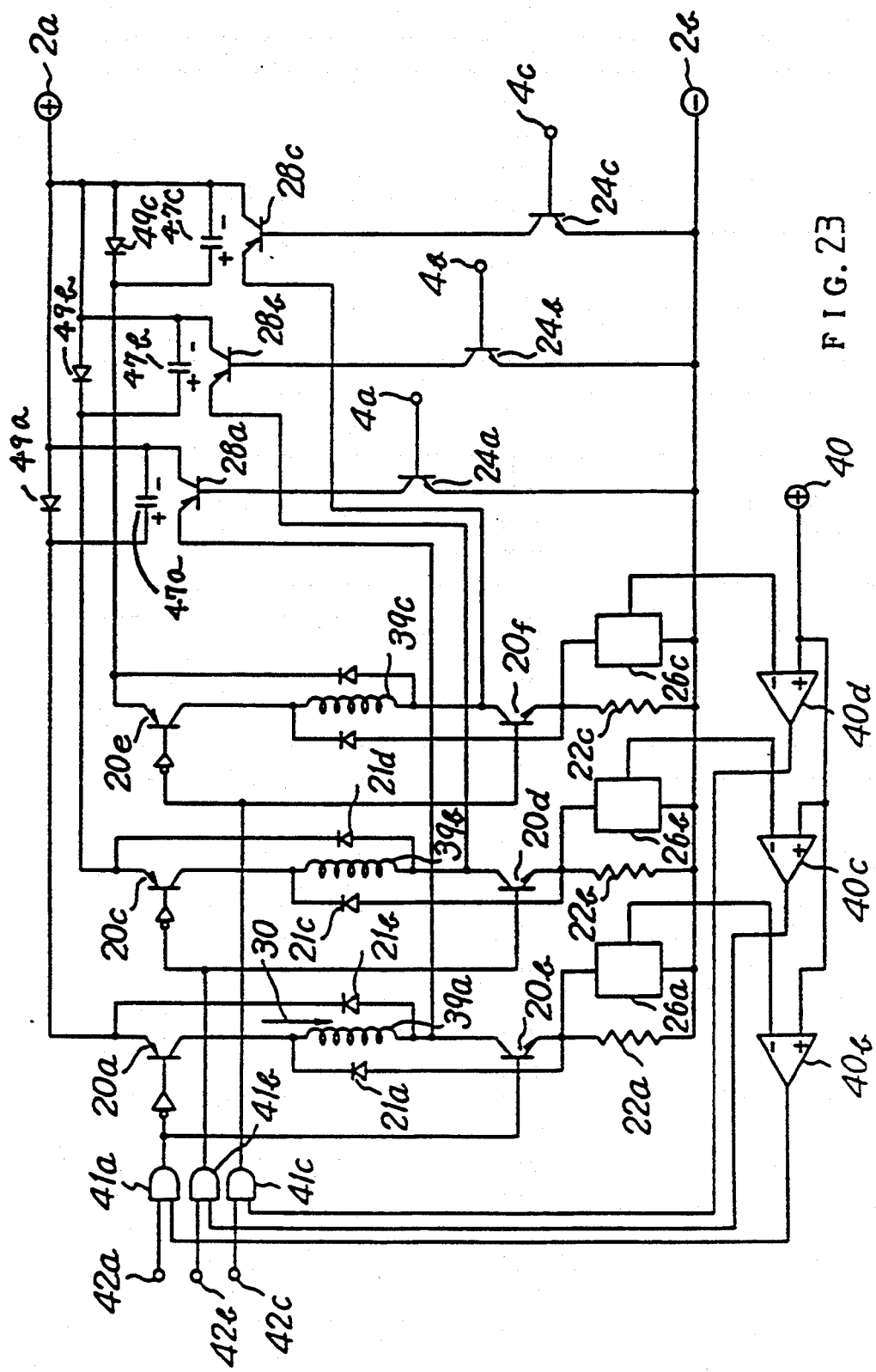
FIG. 23 is a circuit diagram showing a current supply control circuit for activating/deactivating exciting coils of three-phase half-wave current supply mode.

An apparatus in accordance with the present invention is characterized by that above-mentioned disadvantage is eliminated by additionally providing back-flow preventing diodes 49a, 49b, 49c, and capacitors 47a, 47b, 47c shown in FIG. 23. When the current is terminated at the terminal end of the curve 36a, magnetic energy stored in the exciting coil 39a is discharged through the diodes 21b, 21a to the capacitor 47a to charge it up to a high voltage with polarities shown in the drawing, being prevented from returning to the DC electric power source due to a function of the back-flow preventing diode 49a. Accordingly, the magnetic energy is sharply extinguished to steeply decrease the current.

Curves 26, 26a and 26b shown in the first section of the time chart of FIG. 21 cooperatively represent a curve of the current flowing the exciting coil 39a. Two dotted lines 26-1, 26-2 are spaced 120 degrees. The exciting current decreases steeply like the curve 26b, and therefore no counter torque is generated. The capacitor 47a is charged up to a high voltage and held at this voltage.

Next, in response to the position detecting signal of curve 36b, the transistors 20a, 20b are turned on to activate the exciting coil 39a again. In this case, a voltage equivalent to a summation of the charged voltage of the capacitor 47a and the DC electric power source voltage (a voltage between the terminals 2a, 2b) is applied to the exciting coil 39a, so that an exciting current of the exciting coil 39a builds up sharply. By virtue of this phenomenon, the exciting current builds up rapidly as shown by the curve 26a; as is explained above, the torque reduction and the counter torque are removed; and as the exciting current will have substantially the rectangular waveform, an output torque will be increased.

Next, a chopper circuit will be explained. When the exciting current of the exciting coil 39a increases, and the voltage drop in the resistance 22a, which detects exciting current value, increases to exceed the reference voltage of the reference voltage terminal 40 (i.e. an input voltage of the positive terminal of the operational amplifier 40b), a downside input of the AND circuit 41a becomes LOW-level. Thus, the transistors 20a, 20b are turned off, and the exciting current is decreased.

Due to hysteresis characteristics of the operational amplifier 40b, the output of the operational amplifier 40b returns to HIGH-level due to decrease of a predetermined amount. This causes the transistors 20a, 20b to be turned on to increase the exciting current. By repeating such a cycle, the exciting current is maintained at a predetermined value.

A section indicated by the curve 26c of FIG. 21 is a section being chopper controlled. A height of the curve 26c is regulated by the voltage of the reference voltage terminal 40. The exciting coil 39b of FIG. 23 is activated for the duration of the position detecting signal curves 37a, 37b - - - supplied from the terminal 42b when the transistors 20c and 20d are turned on. A chopper control is carried out by the operational amplifier 40c, resistance 22b, absolute-value circuit 30b, and AND circuit 41b. Functions and effects of the diode 49b and the capacitor 47b are the same as those for the exciting coil 39a. The same explanation applies to the exciting coil 39c; the exciting coil 39c is activated in response to the position detecting signal curves 38a, 38b, - - - of FIG. 27 supplied from the terminals 42c. Functions and effects of the transistors 20e, 20f, AND circuit 41c, operational amplifier 40d, resistance 22c, absolute-value circuit 26c, diode 49c and capacitor 47c are the same as in previously explained case.

Current supply to each exciting coil can be initiated from either when the salient poles come to confront the magnetic poles or when the same has gone through a 30-degree section. The positions where the coils 10a, 10b and 10c functioning as position detecting elements are fixed on the side of the fixed armature are changed, taking into account the rotational speed, efficiency and output torque.

As is apparent from the foregoing description, it becomes possible to drive a motor at a high speed with good efficiency and large output as a three-phase half-wave current supply type motor. Thus, the purpose of the present invention can be accomplished. In the case of a three-phase full-wave current supply mode, the same purpose can be accomplished by combining the above-described two half-wave current supply systems.

Curves 26a, 26b and 26c shown in the first section of FIG. 21 cooperatively represent a current supply curve for the exciting coil. A gap between a dotted line 26-1 and a dotted line 26-2 represents a 120-degree width of the position detecting signal. A gap between the dotted line 26-1 and a dotted line 26-3 represents a 180-degree width of the output torque generating section.

Curves 9-1, 9-2 and 9-3 show output torque curves. At the point of the dotted line 26-1, the current supply is initiated, and simultaneously the salient poles begin confronting the magnetic poles. The curve 9-1 represents a current of small value supplied to the exciting coil, when its torque becomes relatively flat; however, as shown by the curves 9-2, 9-3, a peak value of the torque tends to shift toward left side as the current value increases, and a width of the peak value becomes narrower.

The initiating point of current supply should be determined by adjusting the fixed positions of the coils 10a, 10b and 10c taking into account the above-described torque characteristic and the value of current to be supplied. Charging voltages of the capacitors 47a, 47b and 47c increase in inverse proportion to their capacitances, so that, with small-capacitance capacitors 47a, 47b, 47c, the exciting currents of the exciting coils can be built up and reduced steeply. Thus, the motor can be operated at high speeds, and the disadvantage of the conventional reluctance type motor can be eliminated. It is preferable, however, to select the capacitance of the capacitor so as not to damage transistors in the circuit.

As there is no field magnet, it becomes impossible to perform electromagnetic braking for deceleration or stopping, nor is it possible to perform regenerative braking. Accordingly, the conventional reluctance type motor cannot be used as servomotors or actuators for electric motive vehicles.

The present invention resolves the above-described problems. The details will be described below. In FIG. 23, the diodes 49a, 49b, 49c are connected in parallel with transistors 28a, 28b, 28c, which function as semiconductor switching elements, respectively.

Terminals 4a, 4b and 4c supply position detecting signals to be inputted to the terminals 42a, 42b and 42c. Accordingly, transistors 24a, 28a are turned on during time period of the signal curves 36a, 36b, - - -. Transistors 24b, 28b are turned on duping time period of the signal curves 37a, 37b, - - - of FIG. 27, while transistors 24c, 28c are turned on during time period of the signal curves 38a, 38b, - - -.

The exciting coils 39a, 39b and 39c are successively activated by an amount of 120 degrees. Therefore, the same function and effect will be obtained even if the emitters of the transistors 20b, 20d and 20f are connected with each other and the absolute-value circuits 26b, 26c, the resistances 22b, 22c, and operational amplifiers 40c, 40d are omitted together. If current supply angle of the exciting coil is set to be more than 120 degrees, above-described means cannot be adopted.

When reversing the motor's rotation, the input signals of the terminals 42a, 42b, 42c are switched to the position detecting signal curves 43a, 43b, - - -, curves 44a, 44b, - - -, curves 45a, 45b, - - - of FIG. 27.

When the motor's rotation has been reversed, the position detecting signals shown from the first to the third levels from the top of FIG. 27 are all shifted left by 180 degrees. Therefore, these shifted signal curves become equivalent to the reversed curves. Accordingly, in order to obtain signals curves 43a, 43b, - - -, an output of an AND circuit is used. This AND circuit has two inputs, one being the signal curve of the top of FIG. 27 and the other being the reversed signal curve of the second level from the top of FIG. 27. The signal curves 44a, 44b, - - - and signal curves 45a, 45b, - - - are obtained in the same way.

The above-described means will not be necessary in the case where the motor is switched to a reverse rotation mode during the normal rotation of the motor.

Figure 22:
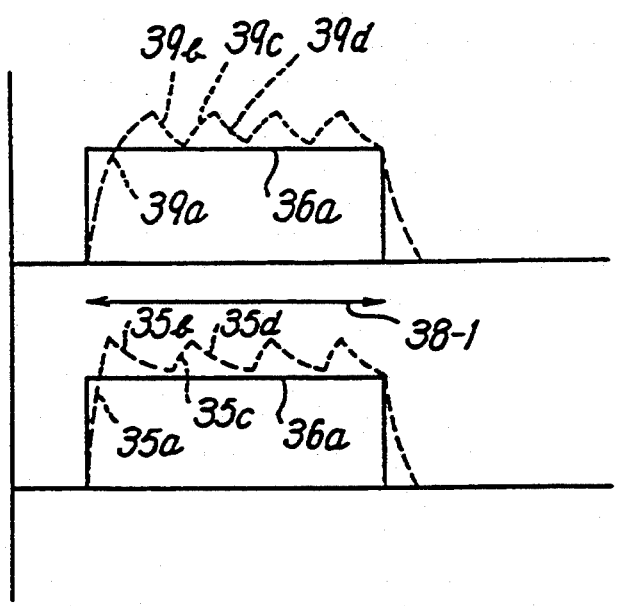
FIG. 22 is a graph showing currents of exciting coil in normal and reverse rotation modes.

Next, a regenerative braking which is carried out by switching the motor to the reverse rotation mode during the normal rotation of the motor will be explained. A current supply to the exciting coil 39a during the normal rotation will be explained. In the graph of FIG. 22, the signal curve 36a denotes a position detecting signal inputted from the terminal 42a. An arrow 38-1 denotes 120-degree width. The transistor 28a of FIG. 23 is turned on during time period of an arrow 38-1.

A building-up portion of the exciting current of the exciting coil 39a becomes sharp as shown by the curve 39a due to high voltage of the capacitor 47a. Electrostatic energy is transformed into magnetic energy of the exciting coil 39a in the first half of the signal curve 39a. In the second half of the signal curve 39a, the electric power source supplies magnetic energy.

When the output of the operational amplifier 40b turns to LOW-level, the transistors 20a, 20b turn off. Thus, as shown by the curve 39b, magnetic energy is returned through the transistor 28a to the electric power source to cause the exciting current to decrease. When the exciting current has decreased to predetermined level, the output of the operational amplifier 40b turns to HIGH-level due to hysteresis characteristics. Thus, the transistors 20a, 20b are turned on, thereby causing the exciting current to increase as shown by the curve 39c. Repeating such a cycle constitutes a chopper circuit. This chopper circuit may be constructed by other conventional means.

The transistors 20a, 20b and 28a are turned off at the terminal end of the curve 36a, so that the current deriving from the magnetic energy stored in the exciting coils is discharged to the capacitor 47a to charge it up to a high voltage, being prevented from returning to the DC electric power source due to a function of the diode 49a. Thus, as described previously, torque reduction and counter torque are both prevented. Hence, a motor capable of operating with high efficiency in a high speed region can be obtained. An exciting current can be controlled by the voltage of the reference voltage terminal 40. Other exciting coils 39b, 39c are controlled in the same manner.

A decelerating operation wherein the motor is switched to the reverse rotation mode during the normal rotation will be explained below with reference to the curve shown at the bottom of FIG. 22. Regenerative braking is necessary for a motor having a large output for returning kinetic energy of the rotor and load to the electric energy of the electric power source.

Next, the measure for realizing the regenerative braking will be explained. This measure is designed for accomplishing the purpose by switching the mode of the motor rotating in the normal rotation mode to the reverse rotation mode for deceleration or stop. Next, the exciting coil 39a in the reverse rotation mode will be explained. An electromotive force is generated in a direction of an arrow 30. A voltage applied to the exciting coil 39a will be V+E, where V being a voltage between the terminals 2a, 2b, and E being a counter electromotive force. That is, E equals an electromotive force occurring when magnetic flux intersecting the exciting coil 39a decreases as the motor rotates. Thus, when the armature current sharply increases up to a predetermined value in response to the curve 36a in the second stage of a time chart of FIG. 22, as shown by dotted lines 35a, 35c - - -, the output of the operational amplifier 40b turns to a LOW level; the transistors 20a, 20b turn off; and the direction of the current supply due to the discharge of magnetic energy of the exciting coil 39a become identical with the direction of the counter electromotive force. Although above discharge direction is opposite to the counter electromotive force during the normal rotation of the motor, it becomes identical with each other in the reverse rotation mode, because braking torque is generated during the reverse rotation mode. Hence, the discharge current flowing through the diodes 21a, 21b is returned through the transistor 28a to the electric power source whose voltage is changed to V−E.

Thus, the degree of decrease of the discharge current in the reverse rotation mode becomes smaller than in the normal rotation mode, thus increasing the width of trailing-off portions, as shown by dotted lines 35b, 35d of FIG. 22. When the armature current decreases to a predetermined level, the output of the operational amplifier 40b turns to a HIGH level due to hysteresis characteristics. This causes the transistors 20a, 20b to be therefore turned on again to sharply increase armature current. Repeating such a cycle constitutes a chopper circuit. Functions and effects of the diode 49a, transistor 28a, and capacitor 47a at the initial and terminal ends of respective position detecting signals are substantially the same as those in the normal rotation mode.

Widths of the dotted lines 35a, 35c, - - - become smaller than those of the dotted lines 35b, 35d, - - - in FIG. 22. Although electric power is consumed during sections of the dotted lines 35a, 35c, - - -, an overall amount of consumption is small because of small widths of these sections. Meanwhile, energy of the rotor and load is transformed into electric energy to return to the electric power source during sections of the dotted lines 35b, 35d, - - -. Therefore, regenerative braking works effectively, since widths of these section are large.

After a predetermined deceleration is finished, the motor is switched to the normal rotation mode to return to the normal operation. If the applied voltage is increased, the motor can speed up, for example, to 30 thousands rpm. In a case where the motor is used as a servomotor, it can rotate at 3,000 rpm and generate an output torque as large as several times, by increasing the number of the salient poles 1a, 1b, - - - of FIG. 3 several times and further by providing teeth the same width as the salient pole at confronting portions between the magnetic poles 16a, 16b, - - - and the salient poles.

Although the transistor 28a, diode 49a, and capacitor 47a are provided on the side of the positive terminal 2a of the electric power source, the same purpose can be accomplished even if these components are provided on the side of the negative terminal 2b of the electric power source.

The above-described function and effect are identical with those of the exciting coils 39b, 39c. Next, an output torque of 180-degree section by salient poles and magnetic poles will be explained. In a time chart of FIG. 27, curves 42 and 42-1 represent the output torque of an arrow 34a (180 degrees). When the value of an exciting current is small, the output torque becomes symmetrical as shown by the curve 42-1, and has flat torque characteristics. If the exciting current increases so much that magnetic flux is saturated, the output torque becomes an asymmetric torque curve as shown by the curve 42. That is, the output torque promptly increases as soon as the salient poles begin confronting magnetic poles; then, it becomes flat, and decreases gradually. If the exciting current further increases, the flat portion will be almost extinguished.

When the exciting coil is supplied with current, corresponding to a width of a central portion of the waveform in the normal/reverse rotation modes as is previously described; in this case, if the torque curve is symmetric (curve 42-1), the output torque characteristics will not change regardless of normal or reverse rotation modes. When the torque curve is asymmetrical, this will cause undesirable change in the output torque characteristics; however, such change will not do any practical harm, since it causes only the decrease in deceleration torque during the deceleration in the reverse rotation mode.

In the case of 120-degree current supply mode, the exciting coil is generally supplied with current by an amount of an arrow 34b during the normal rotation mode; however, it is also possible to supply current by 120 degrees as shown by an arrow 34c from the initiation point of the position detecting signal. The latter will be effective for the motor rotating at a high speed of several tens of thousands rpm.

As can be understood from the above-described explanation, regenerative braking is carried out to reduce the speed of motor by switching to the reverse rotation mode during the normal rotation of the motor. Deceleration torque can be regulated by the voltage of the terminal 40 of FIG. 10. In order to decelerate and stop the motor, the following measure is employed. If the voltage of the terminal 40 is set to be proportional to the rotational speed of the motor by switching the mode of the motor to the deceleration mode, the deceleration torque decreases with decreasing speed of the motor. When the motor stops, the exciting current becomes 0.

Figure 24:
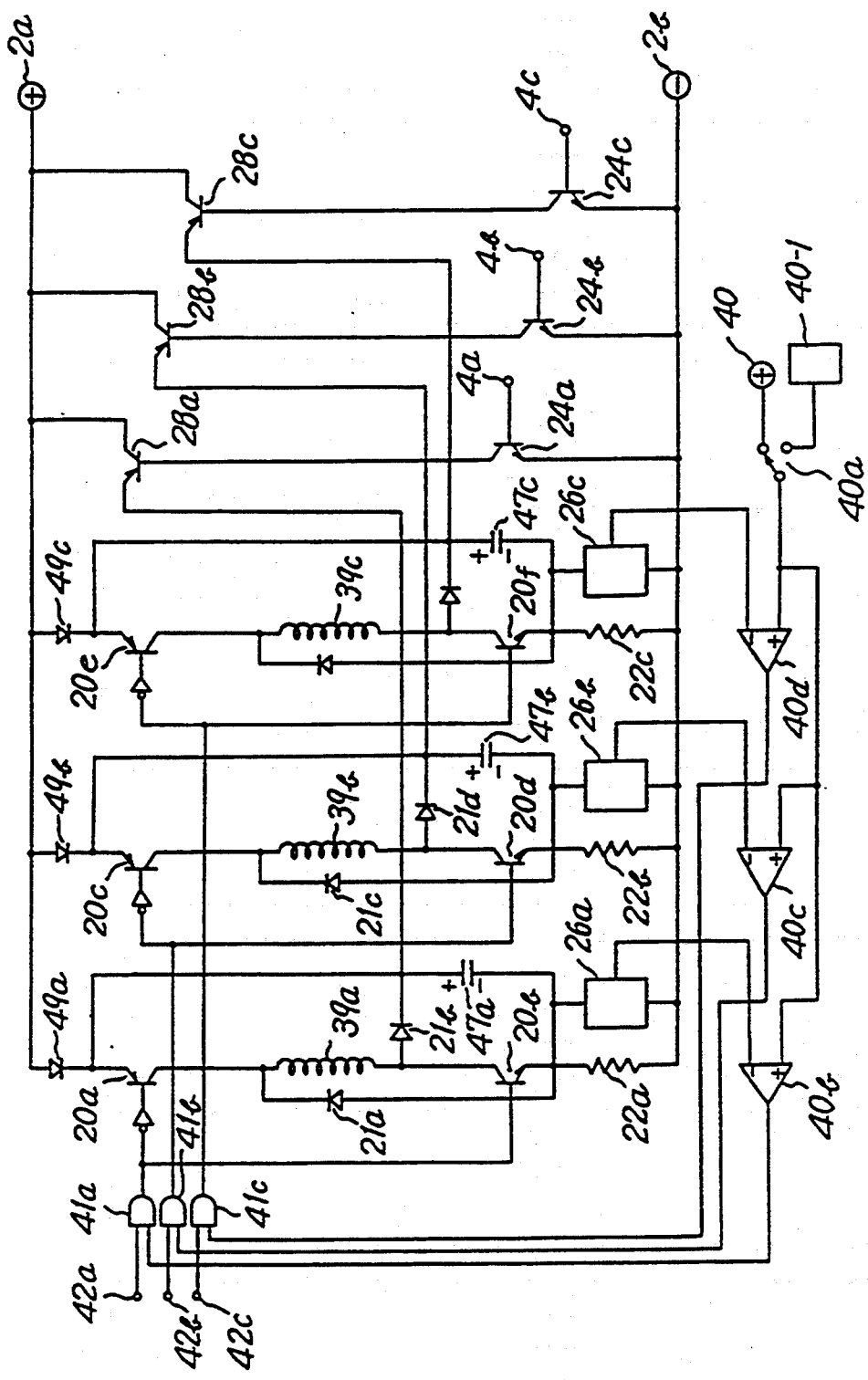
FIG. 24 is a circuit diagram showing another current supply control circuit for activating/deactivating exciting coils of three-phase half-wave current supply mode.

FIG. 24 is an embodiment modifying the connecting positions of the capacitors 47a, 47b and 47c in FIG. 23. The components put on the same reference numerals as those of FIG. 23 are corresponding elements which have the same functions and effects. So, the explanation of these elements will be omitted.

In FIG. 24, when the exciting coil 39a is deactivated, magnetic energy stored in the exciting coil 39a is transferred to the small-capacitance capacitor 47a to decrease the exciting current sharply. When the transistors 20a, 20b turn on at the initiating end of the next arriving position detecting signal, high voltage of the capacitor 47a is applied to the exciting coil 39a to make the building-up of exciting current sharp. The resistance 22a, the absolute-value circuit 26a, the operational amplifier 40b, and the reference voltage terminal 40 constitute a chopper circuit in the same manner as in FIG. 23. The exciting current is adjusted to be a value corresponding to the voltage of the terminal 40. The output torque also corresponds to the voltage of the terminal 40.

Current supply control for other exciting coils 39b and 39c are carried out in the same manner. The activation of transistors 20c, 20d, 20e and 20f is controlled by the position detecting signal curves 37a, 37b - - - , and 38a, 38b - - - of FIG. 27 inputted from the terminals 42b and 42c so that the exciting coils 39b and 39c be supplied with currents. Similarly, the resistances 22b, 22c, the absolute-value circuit 26b, 26c, the operational amplifiers 20b, 20c and the reference voltage terminal 40 constitute a chopper circuit. The function and effect of the capacitors 47b and 47c, that is, building up and reducing exciting current quickly can be obtained.

The transistors 28a, 28b, 28c, 24a, 24b and 24c allow the motor to perform regenerative braking in the same manner as in FIG. 23 when the motor is switched to the reverse rotation mode during the normal rotation of the motor.

The block circuit 40-1 is an electric circuit for obtaining a DC voltage proportional to the motor rotational speed, so that when the changeover switch 40a is switched, the braking torque derived from the regenerating braking decreases with decreasing motor speed and becomes 0 when the motor stops. Hence, by performing the regenerative braking, kinetic energy of the load is continuously recovered to the electric power source until the motor automatically stops.

In case of the present embodiment, it is necessary to form input signals of the terminals 4a, 4b and 4c by cutting off for a predetermined width the initiating portions of the position detecting signals inputted to the terminals 42a, 42b and 42c. Because, it is necessary to prevent the charges of the capacitors 47a, 47b and 47c from returning to the side of electric power terminal 2a through the transistors 28a, 28b and 28, when activation of each exciting coil is initiated.

Figure 18:
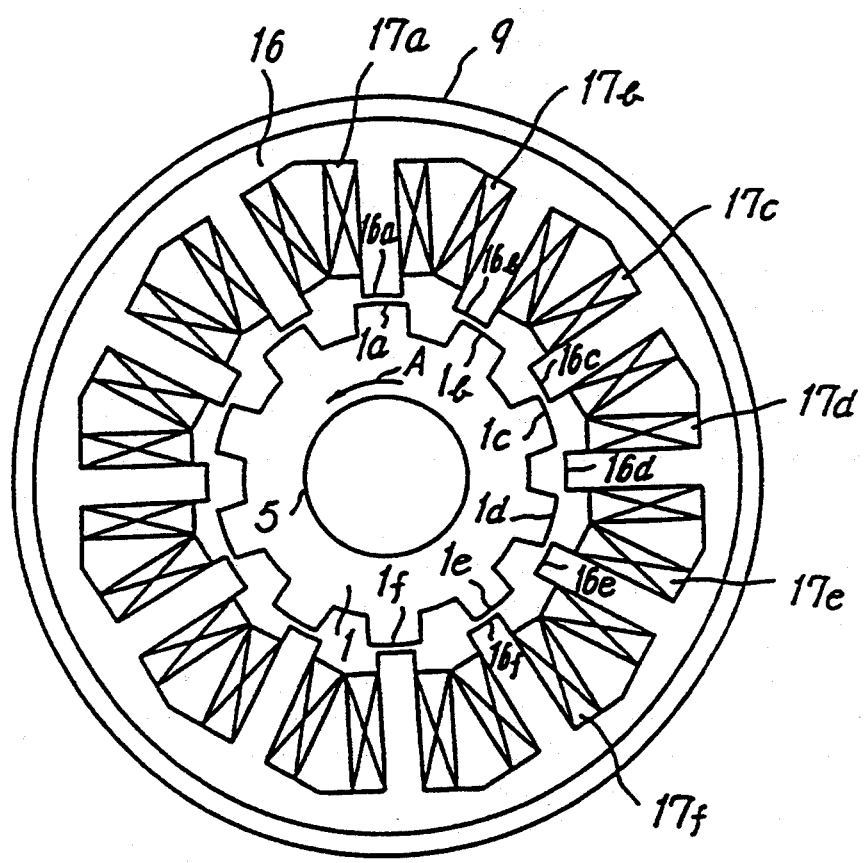
FIG. 18 is a plane view showing a three-phase full-wave reluctance type motor in accordance with the present invention.
Figure 19:
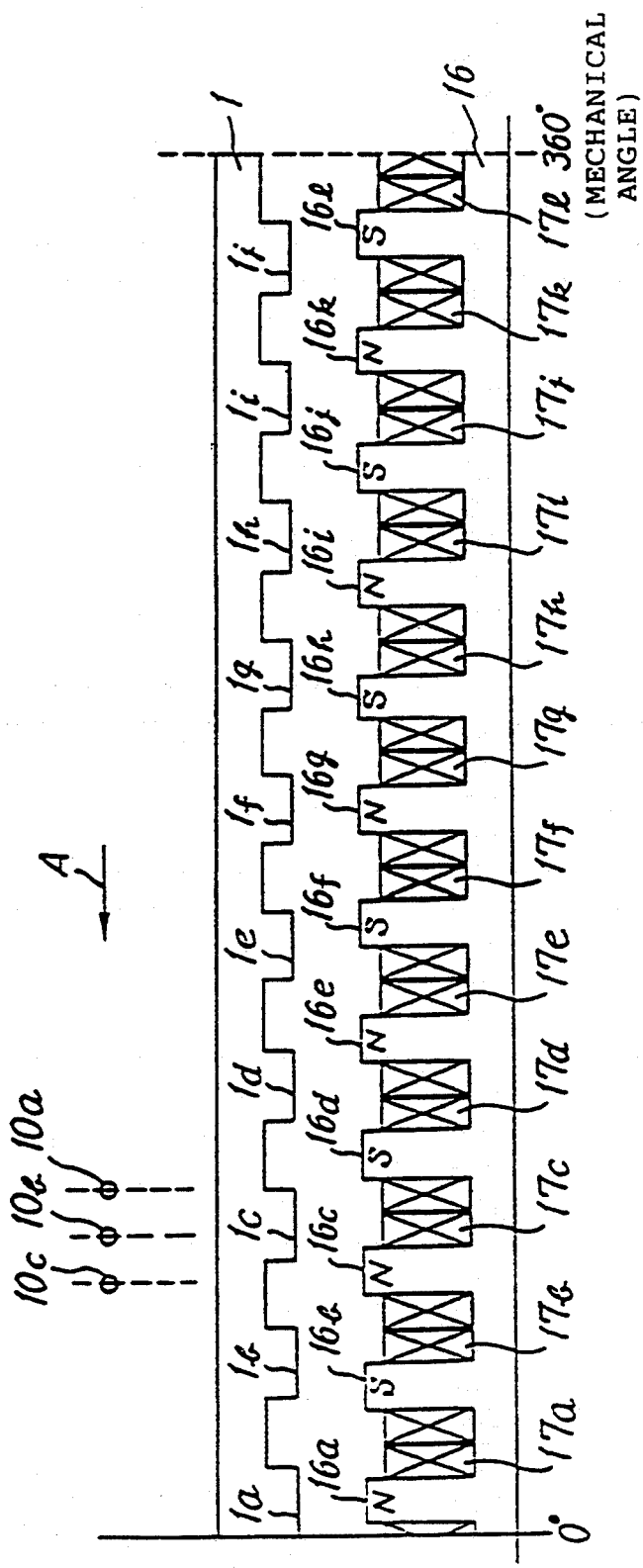
FIG. 19 is a development showing magnetic poles and salient poles of the motor shown in FIG. 18.

Next explained is an embodiment in which the present invention is applied to a three-phase full-wave type motor. FIG. 18 shows an example of constitution of such a motor: FIG. 19 is a development. In FIGS. 18 and 19, ten salient poles 1a, 1b - - - disposed one another at regular intervals of a 180-degree width are formed on the magnetic rotor 1 which is fixed on the rotational shaft 5. A fixed armature 16 is equipped with 12 magnetic poles 16a, 16b, - - - having a 120-degree width to be wound with exciting coil. The armature 16 is fixed on an inside surface of the outer casing 9. The rotational shaft 5 is rotatably supported with bearings provided on the side plates of the outer casing 9. The magnetic poles 16a, 16b, - - - are wound with exciting coils 17a, 17b, - - - , respectively.

Position detecting coils 10a, 10b and 10c are spaced one another by 120 degrees and fixed on the side of the armature 16 at the positions shown in the drawing so as to confront the side surfaces of the salient poles 1a, 1b - - - . The electric circuit which obtains position detecting signals from the coils 10a, 10b and 10c is equal to the electric circuit as shown in FIG. 6, being capable of obtaining the position detecting signals shown in the time chart of FIG. 27.

Respective magnetic poles are magnetized by the exciting coils to have N- or S-polarity as shown in the drawing. The exciting coils 17a, 17g connected in series or in parallel with each other is referred to as an exciting coil 32a. The exciting coils 17b, 17h, the exciting coils 17c, 17i, the exciting coils 17d, 17j, the exciting coils 17e, 17k, and the exciting coils 17f, 17l similarly connected are referred to as exciting coils 32b, 32d, 32c, 32e and 32f, respectively.

Referring to FIG. 27, when the exciting coils 32a, 32c and 32e are activated for the durations corresponding to those of the position detecting signal curves 36a, 36b, - - - , 37a, 37b, - - - and 38a, 38b, - - - respectively, and the exciting coils 32b, 32d and 32f are activated for the durations corresponding to those of the position detecting signals 45a, 45b, - - - , 43a, 43b, - - - and 44a, 44b, - - - , respectively, the rotor 1 rotates in a direction of an arrow A as the rotor of a three-phase full-wave type motor.

The above-described current supply mode can be expressed as follows: the exciting coils 32a, 32c and 32e are referred to as No.1-, No.2- and No.3-exciting coils, respectively, while the exciting coils 32d, 32f, and 32b are referred to as No.1-, No.2- and No.3-exciting coils, respectively; the both are respectively activated by a half-wave current supply mode.

A first-phase exciting coil is constituted by the No.1- and No.1-exciting coils; second-phase and third-phase exciting coils are constituted by the No.2- and No.2-exciting coils and the No.3- and No.3-exciting coils, respectively.

The position detecting signal curves 36a, 36b, - - - , 37a, 37b, - - - , and 38a, 38b, - - - are referred to as No.1-, No.2- and No.3-phase position detecting signals, respectively, while the position detecting signal curves 43a, 43b, - - - , 44a, 44b, - - - , and 45a, 45b, - - - are referred to as No.1-, No.2-, and No.3-phase position detecting signals, respectively. The art of the present invention can be applied even if a current supply period of each exciting coil is larger than 120 degrees. A means for supplying current to the exciting coils will be explained below with reference to FIG. 25.

Figure 25:
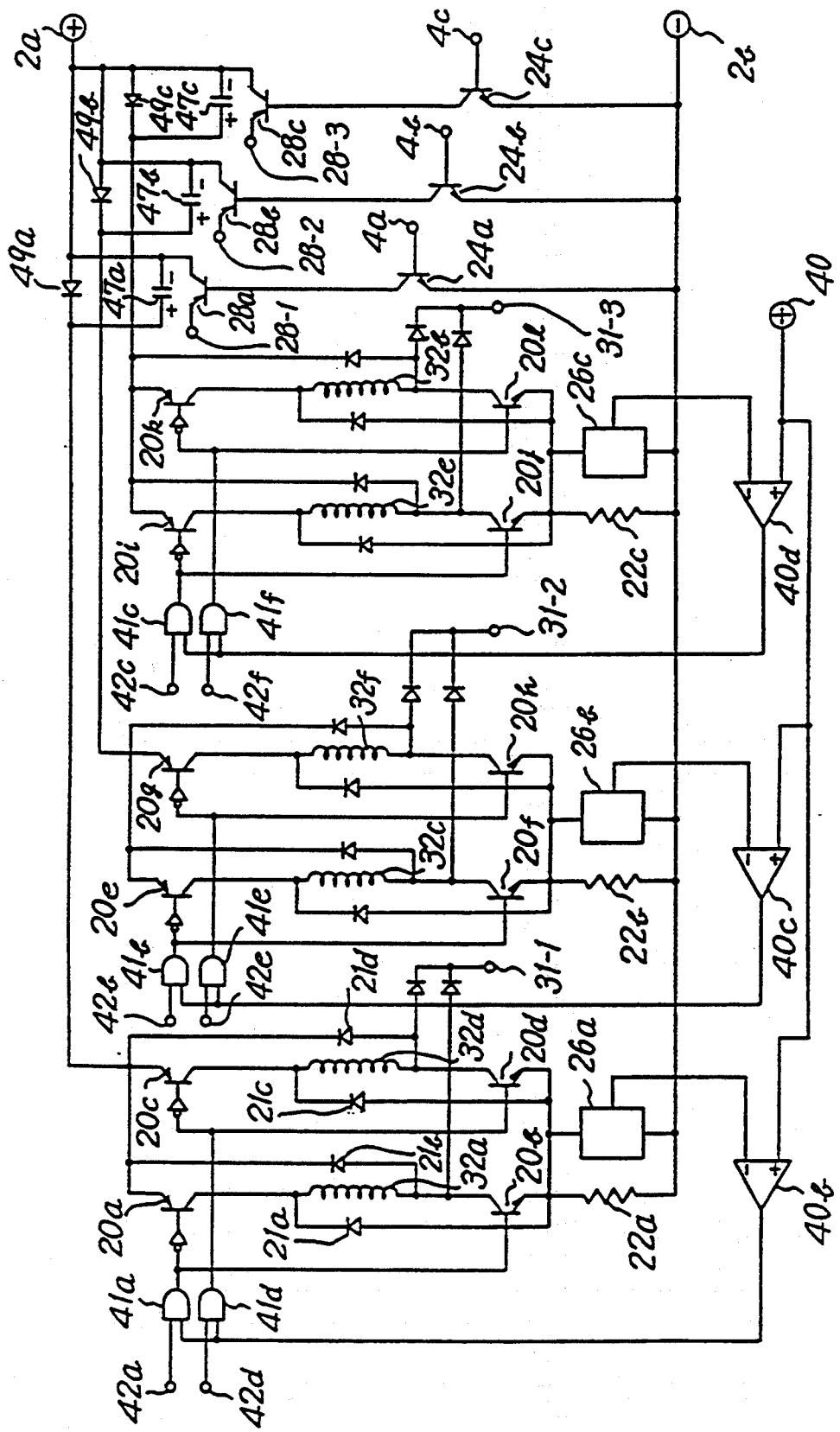
FIG. 25 is a circuit diagram showing a current supply control circuit for activating/deactivating exciting coils of three-phase full-wave current supply mode.

In FIG. 25, position detecting signals inputted from the terminals 42a, 42b and 42c are referred to as No.1-, No.2-, and No.3-phase position detecting signals respectively, while position detecting signals inputted from the terminals 42d, 42e and 42f are referred to as No.1-, No.2- and No.3-phase position detecting signals. Furthermore, exciting coils 32a, 32d are referred to as No.1- and No.1-exciting coils of No.1phase, while exciting coils 32c, 32f and exciting coils 32e, 32b are referred to as No.2- and No.2-exciting coils of No.2phase and No.3- and No.3-exciting coils of No.3phase, respectively.

Transistors 20a, 20b turn on in response to the input signal of the terminal 42a. Subsequently, the exciting coil 32a is activated through the diode 49a which is connected in the forward direction. Then, the transistors 20a, 20b turn off at the terminal end of the input signal (curve 36a). Magnetic energy stored in the exciting coil 32a is transferred to the capacitor 47a to charge it, being prevented by diode 49a from returning the electric power source (terminals 2a, 2b) through diodes 21a, 21b. Accordingly, discharge current due to the stored magnetic energy is extinguished promptly.

A capacitance of the capacitor 47a is adjusted in such a manner that the discharge current disappears within a period of time in which the salient poles rotate 60 degrees, i.e. a section between a right edge of the curve 36a and a left edge of the curve 43a in FIG. 27, by using a capacitor of appropriately small capacitance. Because, if the capacitance is too small, charge voltages of the transistors will exceed their withstand voltages. Thus, the occurrence of counter torque can be prevented.

When the salient poles rotate 60 degrees, the terminal 42d is supplied with the position detecting signal of the curve 43a. In response to this input signal, the transistors 20c, 20d turn on to activate the exciting coil 32d. As a voltage applied to the exciting coil 32d is high voltage of the capacitor 47a in this instance, the exciting current builds up sharply as shown by the curve 31b in the time chart of FIG. 21. Subsequently, the exciting coil 32d is supplied with a constant current determined by the chopper circuit, which will be described later. At the terminal end of the curve 43a, the transistors 20c, 20d are turned off, so that the magnetic energy stored in the exciting coil 32d is transferred to the capacitor 47a to charge it to a high voltage, being prevented from returning to the electric power source by the back-flow preventing diode 49a. Next, the terminal 42a supplies an input signal of curve 36b to sharply build up exciting current of the exciting coil 32a.

As apparent from the foregoing description, magnetic energy stored in the exciting coils 32a, 32d is transformed into electrostatic energy of the capacitor 47a upon termination of current supply, so that the discharge current due to the magnetic energy is extinguished promptly. Thus, counter torque can be prevented, and torque reduction is prevented.

When the exciting coil 32d is deactivated, magnetic energy stored in the exciting coil 32d is promptly stored in the capacitor 47a, and its discharge current is also promptly extinguished within a section of 60 degrees even during high speed rotation. After a predetermined time has elapsed, the exciting coil 32a is activated, and its exciting current sharply increases by the high voltage of the capacitor 47a. Its time width is less than a time required for a Potation of a 60-degree salient pole. After that, a difference voltage, obtained by subtracting from the voltage of terminals 2a, 2b the voltage drop by the resistance of the exciting coil is balanced with the counter electromotive force generated by the increase in inductance (derived from increase of confronting area between the salient poles and magnetic poles), so that an output torque corresponding to the counter electromotive force can be obtained.

Next, a case wherein a chopper function is available will be explained. A chopper circuit, constituted by the AND circuits 41a, 41d, the operational amplifier 40b, the reference voltage terminal 40, the resistance 22a, and the absolute-value circuit 30a, turns on and off the transistors 20a, 20b, 20c and 20d in the same manner as in the previously described embodiments. With such chopper function, current supply curves 31a, 31b, 31c of FIG. 21 become substantially a rectangular shape. A dotted portion represents a section wherein a current value is regulated to a predetermined value by the chopper function.

Current supply to the exciting coils 32c, 32f is controlled by the input signals of the terminals 42b, 42e, the diode 49b, the capacitor 47b, the AND circuits 41b, 41e, the transistors 20e, 20f, - - - , the resistance 22b, the operational amplifier 40c, and the absolute-value circuit 26b in the same way as in the case of the exciting coils 32a, 32d.

Current supply to the exciting coils 32e, 32b is controlled by the input signals of the terminals 42c, 42f, the diode 49c, the capacitor 47c, the AND circuits 41c, 41f, the transistors 20i, 20j, - - - , the operational amplifier 40d, the resistance 22c, and the absolute-value circuit 26c in the same way as in the above-described case. Accordingly, a three-phase full-wave current supply mode reluctance type motor is obtained, which not only reserves an advantage of large output torque but solves a problem of low speed. Furthermore, with this motor, ripple torque can be suppressed.

Curves 31d, 31e of FIG. 21 represent current supply curves of exciting coils 32c, 32f in response to the position detecting signals 37a, 44a. Curves 31g, 31h, 31f represent current supply curves of exciting coils 32e, 32b in response to the position detecting signals 38a, 45a, 45b. The present invention can be embodied even if capacitors 47a, 47b, 47c are disposed in parallel with diodes 49a, 49b, 49c and the electric power source.

If the exciting coil is deactivated during chopper control, voltages of the capacitors 47a, 47b, 47c increase by the magnetic energy. Hence, exciting current of the exciting coil builds up quickly when the exciting coil is next activated.

Next, a means for rotating the motor in the reverse direction will be explained. The motor's rotation can be reversed by inputting the position detecting signals to be inputted to the terminals 42a, 42b, 42c to the terminals 42d, 42e, 42f, while inputting the position detecting signals to be inputted to the terminals 42d, 42e, 42f to the terminals 42a, 42b, 42c. FIG. 9 shows such a switching means. In FIG. 9, terminals 8a, 8b, - - - , and 8f receive position detecting signal curves 36a, 36b, - - - , curves 37a, 37b, - - - , curves 38a, 38b, - - - , curves 43a, 43b, - - - , curves 44a, 44b, - - - , and curves 45a, 45b, - - - of FIG. 27, respectively.

When an input of the terminal 66 is HIGH-level, downside inputs of the AND circuits 66a, 66c, 66e, 66g, 66i, 66k become HIGH-level. These signals, having passed through OR circuits 65a, 65b, - - - , and 65f, are obtained from the terminals 9a, 9b, - - - , 9f as position detecting signals for rotating the motor in the normal direction. Output signals of the terminals 9a, 9b, - - - , 9f are inputted to the terminals 42a, 42b, - - - , 42f of FIG. 25, respectively. When an input of the terminal 66 is turned to a LOW level, this signal is inverted into a HIGH level through an inversion circuit 66a. This HIGH-level electric signal is supplied to the downside terminals of the AND circuits 66b, 66d, - - - , 66l. Accordingly, the position detecting signals for the reverse rotation can be obtained from the terminals 9a, 9b, - - - , and 9f through the OR circuits 65a, 65b, - - - , and 65f, and thus normal/reverse rotation of the motor can be controlled by the input signal of the terminal 66.

If the input of the terminal 66 is changed to a LOW level during the normal rotation of the motor, reverse torque is generated. By the chopper circuit, a time width of increasing portion of the exciting current becomes smaller than that of decreasing portion of the exciting current. Hence, regenerative braking can be carried out in the same manner as the embodiment of FIG. 24. Its function and effect are similar too.

Terminals 28-1, 28-2, 28-3 are connected to the terminals 31-1, 31-2, 31-3, respectively. Input signals of the terminals 4a, 4b, 4c are identical with the input signals from the terminals 42a, 42d, terminals 42b, 42e, and terminals 42c, 42f, respectively.

As a result, the regenerative braking can be performed by switching the motor rotating in the normal direction to the reverse rotation mode in the same manner as in the previously explained embodiment.

Coils 10a, 10b and 10c serving as position detecting elements are positionally adjusted and fixed on the side of the armature so that the exciting coil is started to be activated at the position of 30 degrees passed since salient poles began confronting magnetic poles, and then deactivated after rotation of 120 degree. Accordingly, in any of the normal and reverse rotation modes, the exciting coil is activated at the point 30 degrees after the salient poles begin to confront the magnetic poles, and is deactivated after 120-degree rotation. Thus, an effect that an output torque in the normal rotation mode is identical with that in the reverse rotation mode can be obtained.

Only the reference voltage (i.e. voltage of the terminal 40 of FIG. 25) can regulate the output torque, so that the applied voltage has nothing to do with the output torque. Accordingly, the effect of the ripple voltage between the electric power source terminals 2a and 2b is not so influential. Thus, in the case of AC electric power source, a capacitor to be used for rectification need not to have a large capacitance. In the case where the AC electric power source is of three-phase, the capacitance of the capacitor can be further reduced, and so the electric power source can be simplified as a feature of the invention.

The present invention can be embodied even if capacitors 47a, 47b, 47c of FIGS. 23 and 25 are provided on a negative terminal side of the electric power source.

Figure 20:
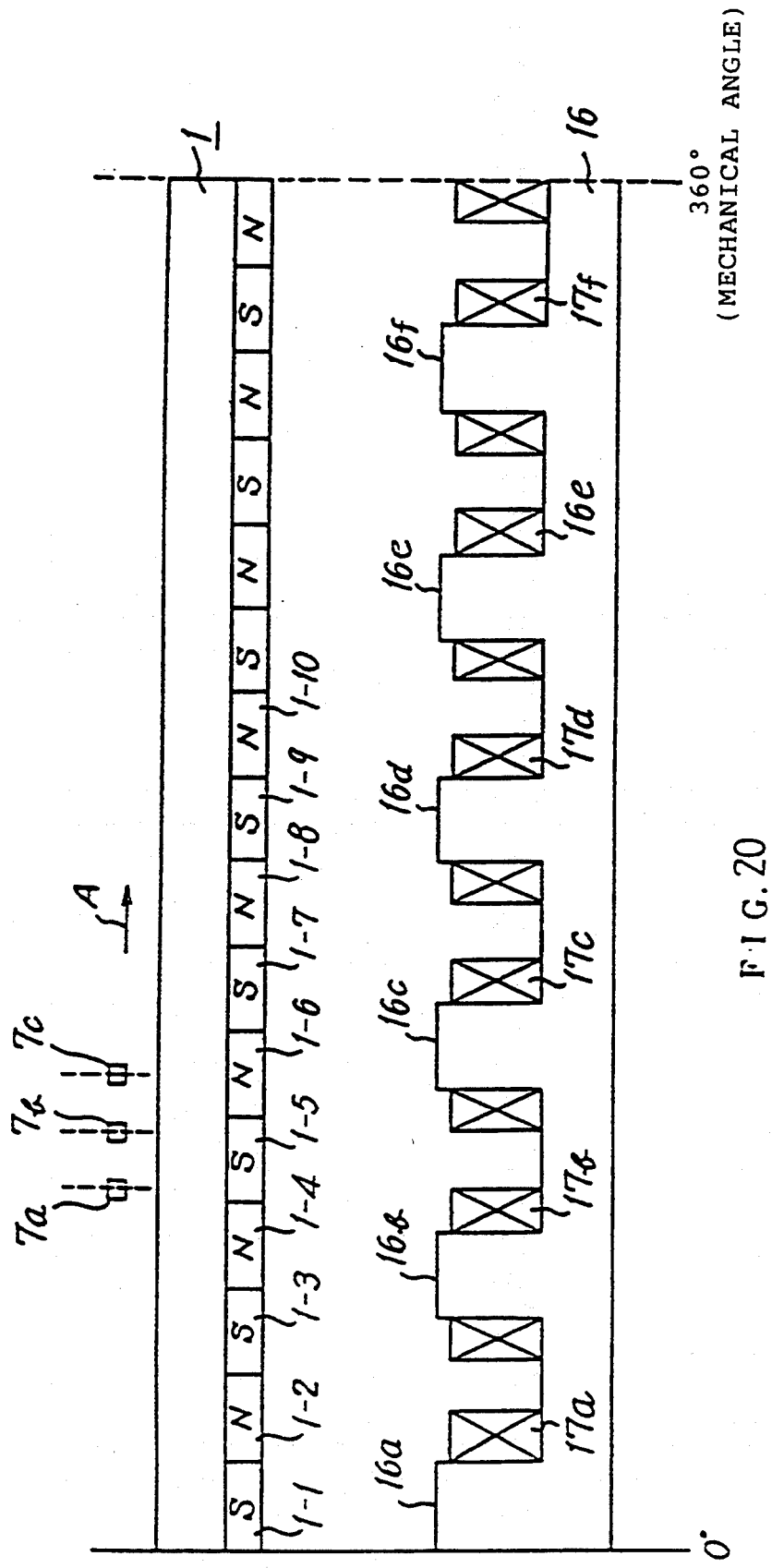
FIG. 20 is a development showing a magnet rotor and a fixed armature of a three-phase DC motor having a magnet rotor.

Next explained is an embodiment which embodies the present invention in a brushless DC motor. FIG. 20 is a development of a magnet rotor 1 and a fixed armature 16. Sections indicated by reference numerals 1-1, 1-3, - - - are magnetized to be S-poles, and sections indicated by reference numerals 1-2, 1-4,-- are magnetized to be N-poles. Respective N- and S-magnetic poles have their magnetic paths closed by a mild steel cylinder. Opening ends of the magnetic paths face to magnetic poles 16a, 16b, - - - to serve as magnetic fields.

Magnetic poles 16a, 16b, - - - are wound with exciting coils 17a, 17b, - - -. The above-described constitution is of a well-known brushless DC motor of three-phase full-wave current supply mode. Hall elements 7a, 7b and 7c are spaced one another by 120 degrees and face to N- and S-magnetic poles 1-1, 1-2, - - - -. Output signals from the Hall elements undergoes a logic processing by a conventional circuit to generate respective position detecting signals shown in FIG. 27. A serial or parallel connecting unit of armature coils 17a and 17d is referred to as an armature coil K; a similar connecting unit of armature coils 17b and 17e is referred to as an armature coil L; and a similar connecting unit of armature coils 17c and 17f is referred to as an armature coil M.

When the armature coils K, L and M are activated to let their armature currents flow in the normal direction in response to the position detecting signal curves 36a, 36b, - - -, the curves 37a, 37b, - - -, the curves 38a, 38b, - - -of FIG. 27, while the armature coils K, L and M are activated to let their armature currents flow in the reverse direction in response to the position detecting signal curves 43a, 43b, - - -, the curves 44a, 44b, - - -, the curves 45a, 45b, - - - of FIG. 27, the magnet rotor 1 rotates in a direction of an arrow A to function as a three-phase DC motor.

Next, with reference to FIG. 26, a current supply control circuit for respective exciting coils will be explained. When the transistors 20a, 20b are turned on, the exciting coil K is activated to let its armature current flow in a right (i.e. a normal) direction, while when the transistors 20c, 20d are turned on, the exciting coil K is activated to let its armature current flow in a left (i.e. a reverse) direction.

With respect to the exciting coils L and M, the above-described conditions also applies. Therefore, by successively turning on two each of transistors positioned symmetrically on a diagonal line, the exciting coils L and M are activated in the normal and reverse direction, respectively. With reference to FIG. 26, a means for controlling the activation of the armature coils will be explained. As the current supply control circuits for the armature coils L and M are similar to that of the armature coil K, these circuits are schematically shown by block circuits P and Q, respectively.

The position detecting signal curves 36a, 36b, - - -, the curves 37a, 37b, - - -, and the curves 38a, 38b, - - - of FIG. 27 are inputted from the terminals 42a, 42b and 42c. The position detecting signal curves 43a, 43b, - - - of FIG. 27 and two rows of electric signals shown below the curves 43a, 43b, - - - are inputted from the terminals 42d, 42e and 42f.

In response to the input signals from the terminals 42a, 42b and 42c, their corresponding transistors are turned on, so that the exciting coils K, L and M are activated to let their armature current flow in the normal direction.

Thus, the motor can be driven as a DC motor having a 120-degree current supply angle of three-phase half-wave current supply mode. The armature coils K, L and M become normal-direction current supply mode. In this case, the armature coils K, L and M are referred to as No.1-phase armature coil, No.2-phase armature coil, and No.3-phase armature coil, respectively.

In response to the input signals from the terminals 42d, 42e and 42f, their corresponding transistors are turned on, and the armature coils K, L and M are activated to let their armature currents flow in the reverse direction.

Thus, the motor can be driven as a DC motor having a 120-degree current supply angle of three-phase half-wave current supply mode.

The resistance 22a, the absolute-value circuit 26a, the operational amplifier 40b, and the reference voltage terminal 40, and the AND circuit 41a, 41d have the same functions as like parts put on the same reference numerals in the previous embodiments, and therefore constitutes a chopper circuit. A current to be supplied to the armature coil K is regulated by the voltage of the terminal 40.

When the armature coil K is deactivated in either right or left direction, magnetic energy stored in this armature coil K is transferred to the small-capacitance capacitors 47d, 47a to charge them to a high voltage, thereby causing the current to decrease rapidly. When the armature coil K is next activated, high voltage of respective capacitors 47d and 47a is supplied to the armature coil K in the current supply of both right- and left-directions, thereby causing armature current to build up sharply. Hence, no counter torque is generated in the same manner as in the previous embodiments, and the motor can rotate in a high-speed region.

Thus, this technology will be effective to the motor having a large output and being equipped with a large-inductance armature coil.

The block circuits P and Q have the same functions and effects as the above.

The block circuits P and Q respectively includes a chopper circuit, so that armature current regulated by t, he voltage of the terminal 40 can be obtained.

In order to drive the motor in the reverse direction, the input signals of the terminals 42a, 42b, 42c and the input signals of the terminals 42d, 42e, 42f are exchanged with each other.

Next, regenerative braking will be explained. The explanation will be made only as to the armature coil K, since the same explanation applies to other armature coils L and M.

If the motor rotating in the normal direction is switched to the reverse rotation mode, the armature coil K is activated in the opposite direction. Therefore, the current supply direction becomes identical with the direction of counter electromotive force, so that the armature current builds up sharply, as shown by curves 35a, 35c, - - - of FIG. 9.

When the transistors 20a, 20b or transistors 20c, 20d are turned off, magnetic energy of the armature coils is returned through the transistor 28a to the electric power source whose voltage is reduced by an amount corresponding to the counter electromotive force. Accordingly, the current begins to decrease at lower rate as shown by curves 35b, 35d, - - - of FIG. 22, thus, the time required for decrease will be increasing accordingly. As the position detecting signals inputted to the terminals 42a and 42d are supplied from the terminal 4a, the transistors 24a and 28a are activated for the durations of these signals. As the sections of curves 35a, 35c, - - - are short, electric power consumption is also small accordingly, so that, in the sections of curves 35b, 35d, - - - , kinetic energy of the rotor 1 and its load can be recovered as electric power. The braking torque can be regulated by the voltage of the terminal 40.

As is explained above, the same function and effect as the previous embodiment will be obtained in this embodiment.

The present invention can be embodied even if the capacitor 47a is provided on the side of a positive voltage (terminal 2a) as shown in FIG. 23.

If the transistors 28a, 28b and 28c are turned on only when the regenerative braking is performed in respective embodiments, the following function and effect will be obtained.

When the exciting coil or the armature coil is deactivated by the chopper function, magnetic energy of respective coils is transferred to the capacitors 47a, 47b and 47c to charge them to a high voltage in accordance with the number of repetition of chopper operations. Thus, current can be built up sharply. Accordingly, the motor can be driven at a high speed.

Figure 26:
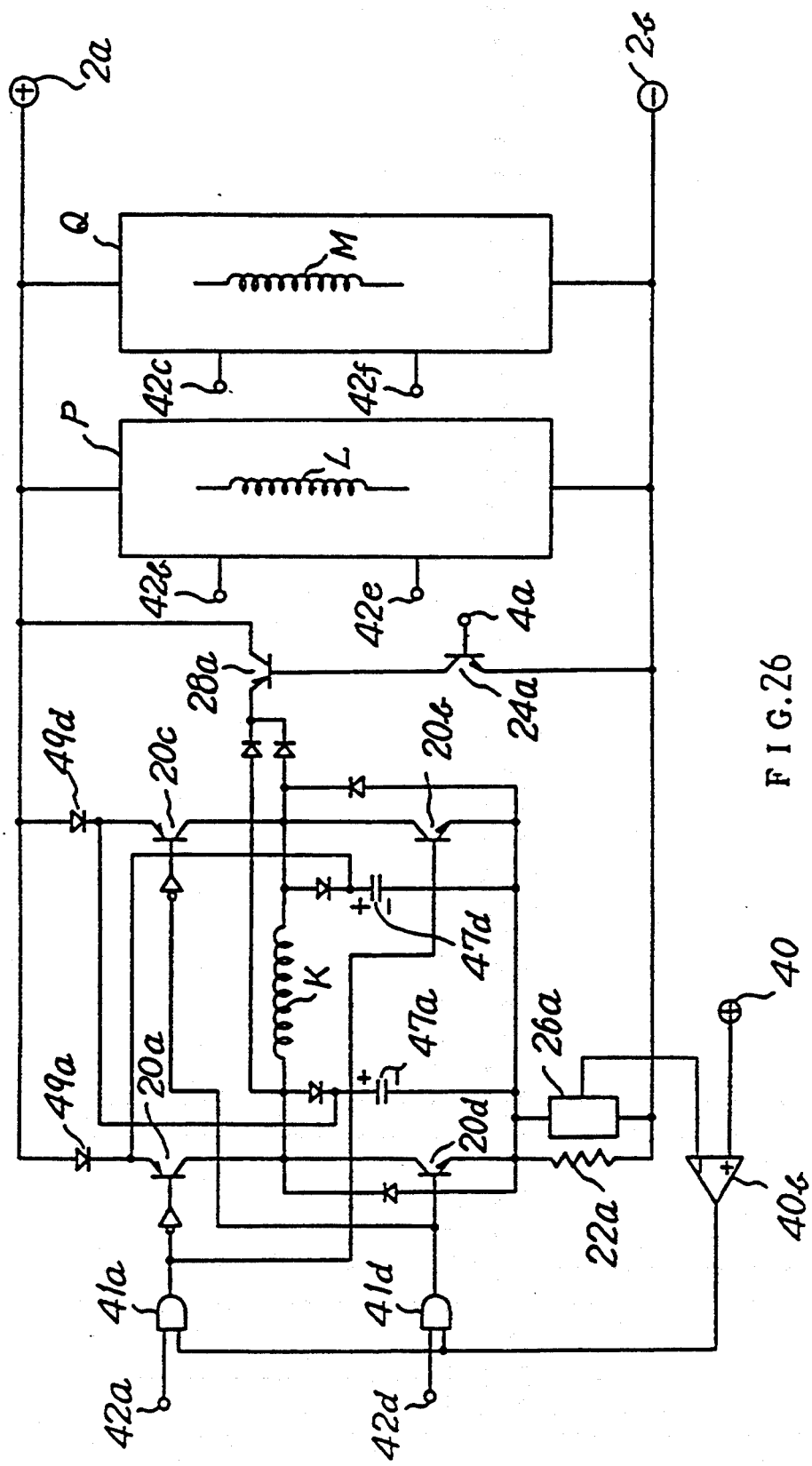
FIG. 26 is a circuit diagram showing a current supply control circuit of the three-phase DC motor having the magnet rotor.

Although the embodiment of FIG. 20 discloses a three-phase DC motor of concentrated winding, the current supply control means of FIG. 26 can be applied to a well-known three-phase Y-type brushless DC motor of lap winding.

What is claimed is:

1. A plural-phase reluctance type motor with a fixed armature and a magnetic rotor comprising:

a plurality of salient poles of equal width disposed on an outer surface of said magnetic rotor at regular intervals of equal angle;

2n pieces (n: a positive integer not less than 3) of magnetic poles protruding from an inner peripheral surface of said fixed armature, symmetrically disposed magnetic poles being in-phase, said magnetic poles confronting said salient poles over slight gap, being disposed at regular intervals and having a 120- through 180-degree circumferential width in terms of electric angle to be wound with an exciting coil;

plural-phase exciting coils wound around said magnetic poles;

a position detecting device for detecting rotational positions of said salient poles and generating plural-phase position detecting signals;

a first switching element installed at one end of each exciting coil;

a DC electric power source supplying electric power to a serial joint unit consisting of said first switching element and said each exciting coil;

a current supply control circuit for obtaining output torque by supplying current to said plural-phase exciting coils by turning on corresponding first switching elements connected to said exciting coils in response to said plural-phase position detecting signals by the duration of signal of each position detecting signal;

a first electric circuit for transferring magnetic energy stored in the exciting coil through a diode into a small-capacitance capacitor for storage from a negative terminal of the exciting coil to quickly reduce exciting current of said exciting coil, when said first switching element is turned off at a terminal end of said position detecting signal;

a second electric circuit for discharging electrostatic energy stored in said small-capacitance capacitor into said exciting coil through a semiconductor switching element activated together with said first switching element from a positive terminal of said exciting coil, to quickly build up exciting current, when said exciting coil is activated by said first switching element in response to said position detecting signal after said magnetic rotor rotates a predetermined angle;

a switching device for switching the motor between normal and reverse rotations by turning on said first switching element in response to said plural-phase position detecting signal;

a detecting circuit for generating a detection electric signal when exciting current of said exciting coil exceeds a predetermined value;

a chopper circuit for turning off said first switching element connected to said exciting coil in response to said detection electric signal and turning on this first switching element after a predetermined time to maintain exciting current at a predetermined value;

an electric closed circuit comprising the negative terminal of said exciting coil, said diode, second switching element, positive terminal of the electric power source, negative terminal of the electric power source, diode inversely connected to said exciting coil, and the positive terminal of said exciting coil;

a third electric circuit for, activating said second switching element by the same interval as that of the exciting coil of each phase; and a fourth electric circuit for, when the motor rotating in the normal direction is switched to a reverse rotation mode, quickly building up chopper-controlled current by applying a sum of the voltage of the DC electric power source and an electromotive force due to reduction of magnetic flux intersecting the exciting coil, and further, in trailing-off section, supplying to the positive terminal of the DC electric power source through said second switching element with current corresponding to the sum of the electromotive force due to reduction of magnetic flux intersecting the exciting coil and the electromotive force due to discharge of magnetic energy stored by said exciting coil, thereby regenerating the electric power and making gentle the slope of said trailing-off section of the current so as to perform braking.

2. A three-phase half-wave current supply mode reluctance type motor, comprising:

a plurality of salient poles of equal width disposed on an outer surface of a magnetic rotor at regular intervals of the same angle;

6n (n: a positive integer) pieces of magnetic poles protruding from an inner peripheral surface of a fixed armature, symmetrically disposed magnetic poles being in-phase, said magnetic poles confronting said salient poles over slight gap, being disposed at regular intervals and having a 120- or 180-degree circumferential width in terms of electric angle to be wound with an exciting coil;

said No.1-, No.2- and No.3-phase exciting coils wound around said magnetic poles;

a position detecting device including a plurality of position detecting elements for detecting rotational positions of said salient poles and generating No.1-phase position detecting signals of rectangular waveform having the same width of 120-degree electric angle and a phase difference of 360-degree electric angle therebetween, and No.2- and No.3-phase position detecting signals of rectangular waveform having the same width and phase difference as the No.1-phase position detecting signals but being successively delayed one another from the No.1-phase position detecting signals by 120-degree electric angle;

a switching element connected to both ends of each exciting coil;

a diode inversely connected to each serial joint unit of said switching element and corresponding exciting coil;

first, second and third current supply control circuits for turning on said switching elements connected to both ends of the exciting coils in response to said No.1-, No.2- and No.3-phase position detecting signals to supply current to said No.1-, No.2- and No.3-phase exciting coils through first, second and third back-flow preventing diodes, respectively connected to the DC electric power source in a forward direction for rotating the motor in the normal direction, or turning on said switching elements connected to both ends of said exciting coils in response to said No.1-, No.2- and No.3-phase position detecting signals for generating reverse rotation torque to supply current to said No.1-, No.2- and No.3-phase exciting coils for rotating the motor in a reverse direction;

first, second and third capacitors of small capacitances for storing magnetic energies discharged from said No.1-, No.2- and No.3-phase exciting coils through said diodes with one end connected to the negative voltage side of said exciting coil, respectively, so as to quickly reduce exciting current when said No.1-, No.2- and No.3-phase exciting coils are deactivated at the terminal ends of said position detecting signals;

a first electric circuit for supplying high-voltage electrostatic energy charged in the first, second and third capacitors to the next activated exciting coils together with the voltage of said DC electric power source, so as to make exciting current build up quickly;

a chopper circuit for deactivating said exciting coil when its exciting current exceeds a predetermined value and activating said exciting coil when the exciting current decreases to a predetermined value;

first, second and third semiconductor switching elements connected in parallel with current supply circuits of said first, second and third diodes so that respective current supply directions become opposite to those of said current supply control circuits;

a second electric circuit for activating said first, second and third semiconductor switching elements for duration of said No.1-, No.2- and No.3-phase position detecting signals, respectively;

a third electric circuit for quickly building up chopper-controlled current by applying a sum of the voltage of the DC electric power source and an electromotive force due to reduction of magnetic flux intersecting the exciting coil, and further for slowly decreasing the current by performing regenerative braking so as to regenerate the electric power through said first, second and third semiconductor switching elements to the positive terminal of the DC electric power source by applying a voltage as a sum of the electromotive force due to reduction of magnetic flux intersecting the exciting coil and an electromotive force due to discharge of magnetic energy stored in said exciting coil, when the motor rotating in the normal direction is switched to a reverse rotation mode; and a means for fixing said position detecting elements on the fixed armature side so that said exciting coils wound around said magnetic poles can be activated at a predetermined angle within an electric angle of approximately 30 degrees after said salient poles begin confronting with said magnetic poles.

3. A DC motor in a three-phase full-wave current supply mode reluctance type motor, comprising:

a plurality of salient poles of equal width disposed on an outer surface of a magnetic rotor at regular intervals of the equal angle;

12n (n: a positive integer) pieces of magnetic poles protruding from an inner peripheral surface of a fixed armature, symmetrically disposed magnetic poles being in-phase, said magnetic poles confronting said salient poles over slight gap, being disposed at regular intervals and having a 120- or 180-degree circumferential width in terms of electric angle to be wound with an exciting coil;

No.1-, No.2- and No.3-phase exciting coils wound around said magnetic poles;

a position detecting device including a plurality of position detecting elements for detecting rotational positions of said salient poles and generating rectangular-waveform No.1-phase position detecting signals having the same width of 120-degree electric angle and a phase difference of 360-degree electric angle therebetween, and rectangular-waveform No.2- and No.3-phase position detecting signals having the same width and phase difference as the No.1-phase position detecting signals but being successively delayed one another from the No.1-phase position detecting signals by 120-degree electric angle, and further generating a rectangular-waveform No.1-phase position detecting signals having the same width and same phase difference as the No.1-phase position detecting signals but being delayed from said No.1-phase position detecting signals by 180-degree electric angle, and rectangular-waveform No.2- and No.3-phase position detecting signals having the same width and the phase difference as the No.1-phase position detecting signals but being successively delayed one another from the No.1-phase position detecting signals by 120-degree electric angle;

switching elements respectively connected to both ends of exciting coils, where a pair of said exciting coils of No.1-phase half-wave current mode are referred to as No.1- and No.1-exciting coils, and each pair of No.2-phase and No.3-phase half-wave current mode exciting coils are referred to as No.2- and No.2-exciting coils and No.3- and No.3-exciting coils respectively.

a diode inversely connected to a serial joint unit of said switching element and corresponding exciting coil;

a first electric circuit for turning on the switching elements connected to both ends of said No.1-, No.2- and No.3-exciting coils wound around said magnetic poles of the fixed armature for the duration of said No.1-, No.2- and No.3-phase position detecting signals and further turning on the switching elements connected with both ends of said No.1-, No.2- and No.3-exciting coils wound around other magnetic poles of the fixed armature for the duration of said No.1-, No.2- and No.3-phase position detecting signals so as to rotate the motor in a normal direction, or turning on the switching elements connected with both ends of said No.1-, No.2-, and No.3-exciting coils for the duration of said No.1-, No.2-, and No.3-phase position detecting signals and further turning on the switching elements connected with both ends of said No.1-, No.2- and No.3-exciting coils for the duration of said No.1-, No.2- and No.3-phase position detecting signals, so as to rotate the motor in a reverse direction;

first, second and third current supply control circuits for turning on said switching elements connected to both ends of the exciting coils so as to supply current to said No.1-, No.1-exciting coils, No.2-, No.2-exciting coils, and No.3-, No.3-exciting coils through first, second and third back-flow preventing diodes respectively connected to the DC electric power source in the normal direction;

first, second and third capacitors having small capacitances for storing magnetic energies discharged from said No.1-, No.1-exciting coils, No.2-, No.2-exciting coils, and No.3-, No.3-exciting coils through diodes having one end being connected to the negative voltage side of said exciting coil, respectively, so as to quickly reduce exciting current when said No.1-, No.1-exciting coils, No.2-, No.2-exciting coils, and No.3-, No.3-exciting coils are deactivated at the terminal ends of said position detecting signals;

a second electric circuit for supplying high-voltage electrostatic energy charged in the first second and third capacitors to the exciting coils to be next activated, together with the voltage of said DC electric power source, so as to make exciting current build up quickly;

a chopper circuit for deactivating each of said No.1-, No.1-, No.2, No.2-, No.3- and No.3-exciting coils when its exciting current has exceeded a predetermined value and activating said exciting coil when the exciting current decreases to a predetermined value;

first, second and third semiconductor switching elements connected in parallel with said first, second and third back-flow preventing diodes so that respective current supply directions become opposite to those of said current supply circuits;

a third electric circuit for activating said first, second, and third semiconductor switching elements for the duration of said No.1-, No.1-phase position detecting signals, No.2-, No.2-phase position detecting signals, and No.3-, No.3-phase position detecting signals, respectively;

a fourth electric circuit for quickly building up chopper-controlled current by applying a sum of the voltage of the DC electric power source and an electromotive force due to reduction of magnetic flux intersecting the exciting coil, as well as for slowly decreasing the current by regenerative braking so as to regenerate the electric power through said first, second and third semiconductor switching elements to the positive terminal of the DC electric power source by applying a voltage as a sum of the electromotive force due to reduction of magnetic flux intersecting the exciting coil and an electromotive force due to discharge of magnetic energy stored in said exciting coil, when the motor rotating in the normal direction is switched into a reverse rotation mode; and a means for fixing said position detecting elements on the fixed armature side so that said exciting coils wound around said magnetic poles can be activated at a predetermined angle within an electric angle of approximately 30 degrees after said salient poles begin confronting with said magnetic poles.

4. A three-phase full-wave current supply mode DC motor including a fixed armature and a magnet rotor, comprising:

No.1-, No.2- and No.3-phase armature coils wound around magnetic poles of the fixed armature;

said armature coils including an armature coil being referred to as a No.1-phase armature coil in No.1-phase normal-direction current supply mode and referred to as a No.1-phase armature coil in No.1-phase reverse-direction current supply mode, armature coils being referred to as No.2- and No.3-phase armature coils in No.2-phase and No.3-phase normal-direction current supply modes and referred to as No.2- and No.3-phase armature coils in No.2-phase and No.3-phase reverse-direction current supply modes;

a position detecting device including a plurality of position detecting elements for detecting rotational positions of N- and S-poles of said magnet rotor and generating rectangular-waveform No.1-phase position detecting signals having the same width of 120-degree electric angle and a phase difference of 360-degree electric angle therebetween, rectangular-waveform No.2- and No.3-phase position detecting signals being successively delayed one another from the No.1-phase position detecting signals by 120-degree electric angle, rectangular-waveform No.1-phase position detecting signals having the same width and phase difference as the No.1-phase position detecting signals but being delayed from said No.1-phase position detecting signals by 120-degree electric angle, and rectangular-waveform No.2- and No.3-phase position detecting signals being successively delayed one another from the No.1-phase position detecting signals by 120-degree electric angle, where the armature coil is referred to as No.1-phase armature coil when in No.1-phase normal current supply mode and as No.1-phase armature coil when in No.1-phase reverse current supply mode, while the armature coil is referred to as No.2-phase and No.3-phase armature coils when in No.2- and No.3-phase normal current supply modes and as No.2- and No.3-phase armature coils when in No.2- and No.3-phase reverse current supply modes;

6 switching elements connected with both ends of each of said No.1-, No.1-, No.2-, No.2-, No.3-, No.3-armature coil;

diodes inversely connected to serial joint units each consisting of said switching element and its corresponding armature coil;

first, second and third current supply control circuits for turning on said switching elements connected to both ends of said No.1-, No.2-, No.3-, No.1-, No.2-and No.3-armature coils in response to corresponding No.1-, No.2-, No.3-, No.1-, No.2- and No.3-phase position detecting signals, so as to supply current through first, second, - - - sixth backflow preventing diodes respectively connected to the DC electric power source in the forward direction for rotating the motor in a normal direction, or for turning on said switching elements connected to both ends of said No.1-, No.2-, No.3-, No.1-, No.2- and No.3-armature coils in response to No.1-, No.2-, No.3-, No.1-, No.2- and No.3-phase position detecting signals for generating reverse rotation torque so as to rotate the motor in a reverse direction;

first, second, - - - , sixth capacitors having small capacitances for storing magnetic energies discharged from said No.1-, No.2-, No.3-, No.1-, No.2- and No.3-armature coils through diodes having one end being connected to the negative voltage side of said armature coil, respectively, so as to quickly reduce armature current when said No.1-, No.2-, No.3-, No.1-, No.2-, and No.3-armature coils are deactivated at the terminal ends of said position detecting signals;

a first electric circuit for supplying high voltage electrostatic energy charged in the first, second, - - -, sixth capacitors to the next activated armature coils together with the voltage of said DC electric power source, so as to make armature current build up quickly;

a chopper circuit for deactivating each of said No.1-, No.2-, No.3-, No.1-, No.2- and No.3-armature coils when its armature current exceeds a predetermined value and activating said armature coil when the armature current decreases to a predetermined value;

first semiconductor switching element connected through a diode, from each of negative terminals of said No.1-, No.1-armature coils, to the positive terminal of the DC electric power source, and second and third semiconductor switching elements connected through a diode, from each of negative terminals of said No.2-, No.2-, No.3-, and No.3-armature coils, to the positive terminal of the DC electric power source;

a second electric circuit for activating said first, second, and third semiconductor switching elements for predetermined duration of said No.1-, No.1-phase position detecting signals, No.2-, No.2-phase position detecting signals, and No.3-, No.3-phase position detecting signals, respectively;

a third electric circuit for quickly building up chopper-controlled current by applying a voltage as a sun, of the voltage of the DC electric power source and an electromotive force due to reduction of magnetic flux intersecting the armature coil, and further for slowly decreasing the current by regenerative braking so as to recover the electric power through said first, second and third semiconductor switching elements to the positive terminal of the DC electric power source by applying a voltage as a sum of the electromotive force due to reduction of magnetic flux intersecting the armature coil and an electromotive force due to discharge of magnetic energy stored in said armature coil, when the motor rotating in the normal direction is switched into a reverse rotation mode; and a means for fixing said position detecting elements on the fixed armature side so that maximum torque can be obtained when said armature coils are activated by 120-degree electric angle.

* * * * *

UNITED STATES PATENT AND TRADEMARK OFFICE
CERTIFICATE OF CORRECTION

PATENT NO. : 5,432,420
DATED : July 11, 1995
INVENTOR(S) : Itsuki BAHN

It is certified that error appears in the above-indentified patent and that said Letters Patent is hereby corrected as shown below:

Column 1, line 27, delete "1-31433" and insert --1-231433--.
Column 2, line 13, after "salient" delete ",".
Column 5, lines 46, 50, 52, and 58, underline "No. 1";
    line 49, underline "No.2" and "No. 3";
    line 61, underline "No. 2" (second occurrence); and
    line 62, underline "No. 3".
Column 6, lines 4 and 14, underline "No. 1";
    lines 5 and 15, underline "No.2" and "No. 3";
    lines 7 and 12, underline "No. 1", No. 2" and "No. 3";
    lines 23 and 57, underline the second occurrence of "No. 1";
    lines 24, underline "No. 2" and the second occurrence of "No. 3";
    lines 29 and 34, underline the second occurrence of "No. 1" and "No. 2";
    lines 30, 35 and 59, underline the second occurrence of "No. 3";
    line 45, underline the second occurrence of "No. 1", "No. 2", and "No 3";
    line 58, underline the second occurrence of "No. 2".

UNITED STATES PATENT AND TRADEMARK OFFICE
CERTIFICATE OF CORRECTION

PATENT NO. : 5,432,420
DATED : July 11, 1995
INVENTOR(S) : Itsuki BAHN

It is certified that error appears in the above-indentified patent and that said Letters Patent is hereby corrected as shown below:

Column 7, lines 24(first occurrence), 42,49, underline "No. 1";

lines 28, 47, and 60, underline "No. 2" and "No. 3";

lines 53 and 62, underline "No. 3";

lines 52 and 61, underline the second occurrences of "No. 1" and "No. 2"; and line 59, underline the second occurence of "No. 1 ".

Column 8, line 1, underline "No. 1" and "No. 2" and "No. 3";

lines 2, 8, 23, underline the second occurrences of "No. 1", "No.2", "No. 3";

line 12, underline the second occurrences of "No. 1" and "No. 2";

line 13, underline "No. 3";

lines 30 and 39, underline the second occurrence of "No. 1";

line 34, underline the second occurrences of "No. 2" and "No. 3";

line 40, underline the second occurrence of "No. 2"; and line 41, underline the second occurrence of "No. 3".

Column 11, line 30, delete "6" and insert --16--  ; and line 36, delete "7b" and insert --17b-- therein.

Column 13, line 9, delete "1.80" and insert --180--.

UNITED STATES PATENT AND TRADEMARK OFFICE
CERTIFICATE OF CORRECTION

PATENT NO. : 5,432,420
DATED : July 11, 1995
INVENTOR(S) : Itsuki BAHN

It is certified that error appears in the above-identified patent and that said Letters Patent is hereby corrected as shown below:

Column 16, lines 13 and 19, underline all occurrences of "16".
Column 17, line 13, delete "7a" and insert --27a--.
Column 21, line 64, underline "No. 1", "No. 2", and "No. 3"; and
      line 68, underline "No. 1".
Column 22, line 1, underline "No. 2" (second occurrence);
      line 2, underline "No. 3" second occurrence);
      lines 9 and 15, underline "No. 1", "No. 2", and "No. 3";
      line 17, underline the second occurrence of "No. 1";
      line 19, underline the second occurrence of "No. 2"; and
      line 20, underline the second occurrence of "No. 3".
Column 27, line 16, after "K and" insert --M--;
      lines 32 and 38, underline the second occurrences of "No. 1";
      lines 35 and 44, underline the second occurrences of "No. 2".
Column 28, line 29, delete "tile" and insert --the--.
Column 31, line 17, delete "36a37b," and insert --35a, 36b,--;
      line 21, delete "signals" and insert --signal--.

UNITED STATES PATENT AND TRADEMARK OFFICE
CERTIFICATE OF CORRECTION

PATENT NO. : 5,432,420
DATED : July 11, 1995
INVENTOR(S) : Itsuki BAHN

It is certified that error appears in the above-indentified patent and that said Letters Patent is hereby corrected as shown below:

Column 38, lines 33 and 46, underline "No. 1", "No. 2", and "No. 3";

lines 37, 56, and 59, underline "No. 1";

line 38, underline the second occurrence of "No. 2";

line 39, underline the second occurrence of "No. 3";

line 57, underline "No. 2" and "No. 3";

line 61, underline "No. 2" (second occurrence);

line 62, underline "No. 3" (first occurrence).

Column 43, line 11, after "by" delete "t," and insert --the--; and line 12, delete "he".

Column 47, lines 19 and 53, underline "No. 2" and "No. 3";

line 14, 21, 21, 23, 28, and 52, underline "No. 1";

lines 31 and 61, underline "No. 2" and second occurrence of "No. 3";

lines 43, 45, and 50, underline "No. 1", "No. 2", and "No. 3";

line 60, underline the second occurrence of "No. 1";

line 67, underline the second occurrences of "No. 1" and "No. 2"; and line 68, underline the second occurrence of "No. 3".

UNITED STATES PATENT AND TRADEMARK OFFICE
CERTIFICATE OF CORRECTION

PATENT NO. : 5,432,420
DATED : July 11, 1995
INVENTOR(S) : Itsuki BAHN

It is certified that error appears in the above-indentified patent and that said Letters Patent is hereby corrected as shown below:

Column 48, line 4, underline the second occurrences of "No. 1" and "No. 2";

line 5, underline the second occurrence of "No. 3";

line 15, underline "No. 1" and the second occurrences of "No. 2" and "No. 3";

line 27, underline the second occurrence of "No. 1";

line 28, underline the second occurrence of "No. 2";

line 29, underline the second occurrence of "No. 3";

line 61, underline "No. 1"; and line 66, underline "No. 2" and "No. 3".

Column 49, lines 12, 19, and 38, underline "No. 1";

line 17, 26, 39, and 48, underline "No. 2" and "No. 3";

line 23, underline both occurrences of "No. 1";

line 27, underline "No. 2";

line 28, underline "No. 2" and underline the first and second occurrence of "No. 3";

UNITED STATES PATENT AND TRADEMARK OFFICE
CERTIFICATE OF CORRECTION

PATENT NO. : 5,432,420

DATED : July 11, 1995

INVENTOR(S) : Itsuki BAHN

It is certified that error appears in the above-indentified patent and that said Letters Patent is hereby corrected as shown below:

lines 31 and 40, underline the second occurrences of "No. 1" and "No. 2";

lines 32 and 41, underline "No. 3";

lines 47 and 55, underline the second occurrence "No. 1"; and line 49, underline "No. 1" and underline the second occurrences of "No. 2" and "No. 3".

Column 50, line 1, underline "No. 2" and "No. 3";

line 5, underline "No. 2" and second occurrences of "No. 2" and "No. 3";

line 15, underline "No. 1" and second occurrences of "No. 2" and "No. 3";

line 22, underline the second occurrence of "No. 1";

line 26, underline the second occurrence of "No. 2";

line 27, underline "No. 3";

line 31, underline the second occurrence of "No. 1";

line 32, under the second occurrence of "No. 2";

UNITED STATES PATENT AND TRADEMARK OFFICE
CERTIFICATE OF CORRECTION

PATENT NO. : 5,432,420
DATED : July 11, 1995
INVENTOR(S) : Itsuki BAHN

It is certified that error appears in the above-indentified patent and that said Letters Patent is hereby corrected as shown below:

line 33, underline the second occurrence of "No. 3"; and
line 37, delete "sun" and insert --sum--.

Signed and Sealed this

Twentieth Day of August, 1996

Attest:

BRUCE LEHMAN

Attesting Officer

Commissioner of Patents and Trademarks